US012676700B2

(12) United States Patent
Shin et al.

(10) Patent No.: US 12,676,700 B2
(45) Date of Patent: Jul. 7, 2026

(54) METHOD FOR TRANSMITTING OR GENERATING A CODE USING ARTIFICIAL INTELLIGENCE (AI) / MACHINE LEARNING BASED ON CAPABILITY INFORMATION

(71) Applicant: LG ELECTRONICS INC., Seoul (KR)

(72) Inventors: Jongwoong Shin, Seoul (KR); Bonghoe Kim, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 823 days.

(21) Appl. No.: 18/002,170

(22) PCT Filed: Jun. 18, 2020

(86) PCT No.: PCT/KR2020/007899
§ 371 (c)(1),
(2) Date: Dec. 16, 2022

(87) PCT Pub. No.: WO2021/256584
PCT Pub. Date: Dec. 23, 2021

(65) Prior Publication Data
US 2023/0231653 A1     Jul. 20, 2023

(51) Int. Cl.
*H04L 1/00*          (2006.01)
*H04L 1/20*          (2006.01)
(Continued)

(52) U.S. Cl.
CPC ............ *H04L 1/0075* (2013.01); *H04L 1/203* (2013.01); *H04L 41/16* (2013.01); *H04W 8/24* (2013.01); *H04W 72/51* (2023.01)

(58) Field of Classification Search
CPC ....... H04L 1/0075; H04L 1/203; H04L 41/16; H04L 1/00; H04L 1/0009; H04L 1/0045;
(Continued)

(56) References Cited

U.S. PATENT DOCUMENTS

2016/0029211 A1     1/2016   Furuta
2018/0174050 A1     6/2018   Holt et al.
(Continued)

FOREIGN PATENT DOCUMENTS

KR     10-2017-0095275     8/2017
WO     2020-035685        2/2020

OTHER PUBLICATIONS

Korean Intellectual Property Office Application No. 10-2023-7000378, Office Action dated Feb. 18, 2025, 5 pages.
(Continued)

*Primary Examiner* — Ian N Moore
*Assistant Examiner* — Latresa A McCallum
(74) *Attorney, Agent, or Firm* — LEE, HONG, DEGERMAN, KANG & WAIMEY

(57)          ABSTRACT

A method of transmitting and receiving data in a wireless communication system and a device therefor are disclosed. Specifically, the method performed by a user equipment (UE) may comprise transmitting, to a base station, capability information including (i) first information indicating a decoding level of the UE and (ii) second information indicating whether a machine learning is possible, receiving decoding level information from the base station based on the first information, and receiving the downlink data from the base station based on the decoding level information and the second information.

13 Claims, 30 Drawing Sheets

(51) Int. Cl.
  *H04L 41/16* (2022.01)
  *H04W 8/24* (2009.01)
  *H04W 72/51* (2023.01)

(58) Field of Classification Search
  CPC ..... H04L 1/0057; H04L 25/02; H04L 1/1812;
      H04L 41/0853; H04W 72/51; H04W
      8/24; G06N 20/00; G06N 3/04; G06N
      3/09; G06N 3/098; H03M 13/036; H03M
      13/1102; H03M 13/13; H03M 13/353;
      H03M 13/6597; Y02D 30/70
  See application file for complete search history.

(56) References Cited

U.S. PATENT DOCUMENTS

| | | | |
|---|---|---|---|
| 2019/0079898 | A1 | 3/2019 | Xiong et al. |
| 2019/0305882 | A1* | 10/2019 | Wang ................. H03M 13/1128 |
| 2021/0110261 | A1* | 4/2021 | Lee ........................ H04L 5/0055 |
| 2021/0160149 | A1* | 5/2021 | Ma ......................... H04L 1/0041 |
| 2021/0399770 | A1* | 12/2021 | Xu .......................... H04B 7/026 |
| 2022/0104122 | A1* | 3/2022 | Maleki ................ H04W 52/028 |
| 2022/0360477 | A1* | 11/2022 | Sun ......................... H04L 69/22 |
| 2022/0393781 | A1* | 12/2022 | Kim ......................... G06N 3/08 |

OTHER PUBLICATIONS

PCT International Application No. PCT/KR2020/007899, International Search Report dated Mar. 8, 2021, 4 page.
Devamane et al., "Recurrent neural network based turbo decoding algorithms for different code rates," Journal of King Saud University—Computer and Information Sciences, Apr. 2020, 15 pages.

* cited by examiner

[FIG. 1]

[FIG. 2]
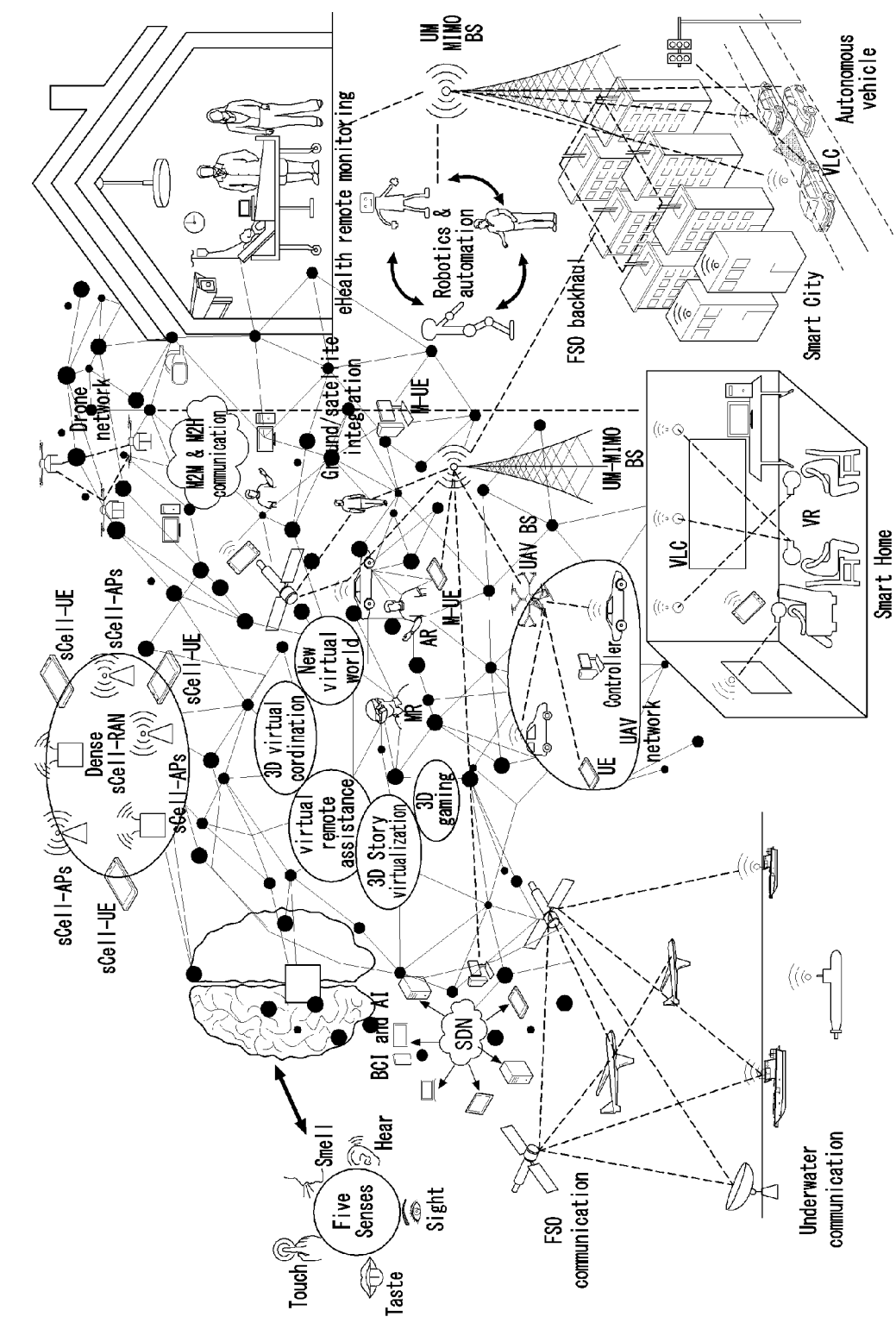

【FIG. 3】
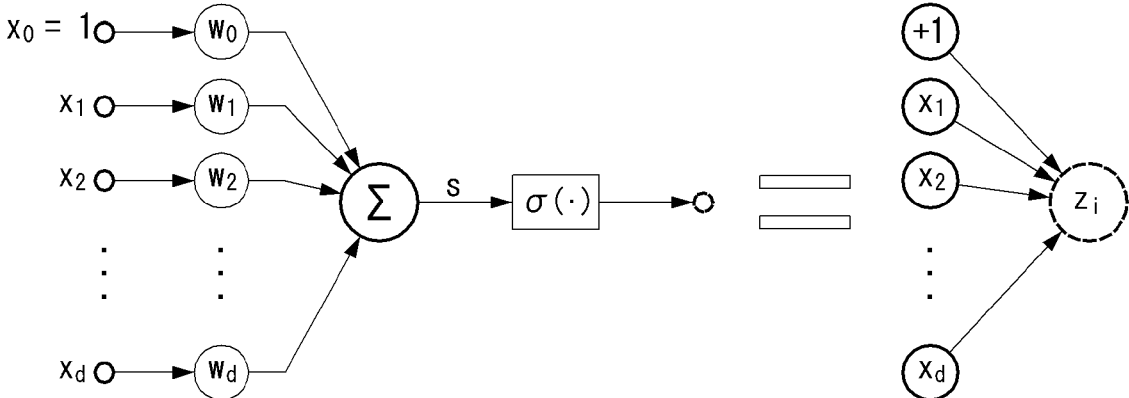
【FIG. 4】
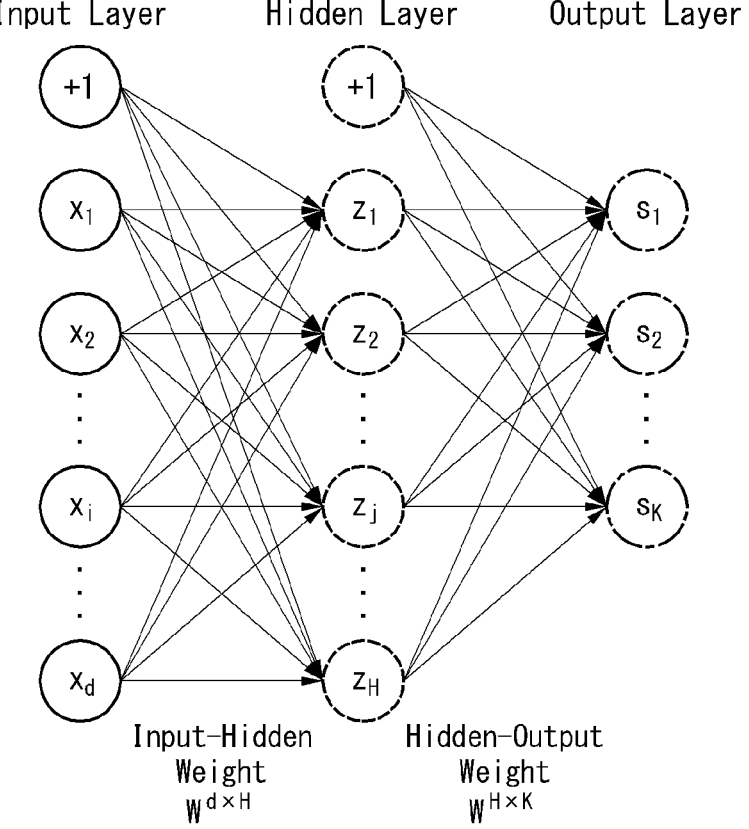
Input Layer     Hidden Layer     Output Layer
Input-Hidden
Weight
$W^{d \times H}$
Hidden-Output
Weight
$W^{H \times K}$ 【FIG. 5】
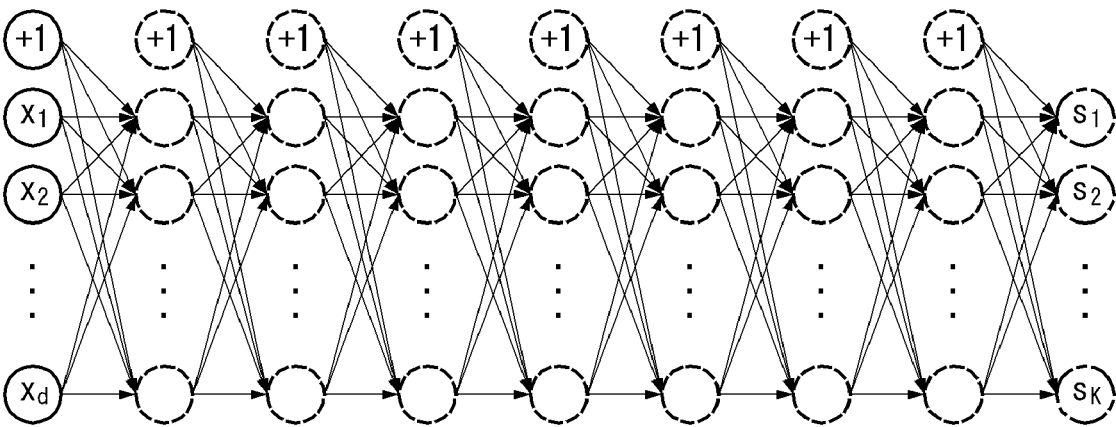
【FIG. 6】
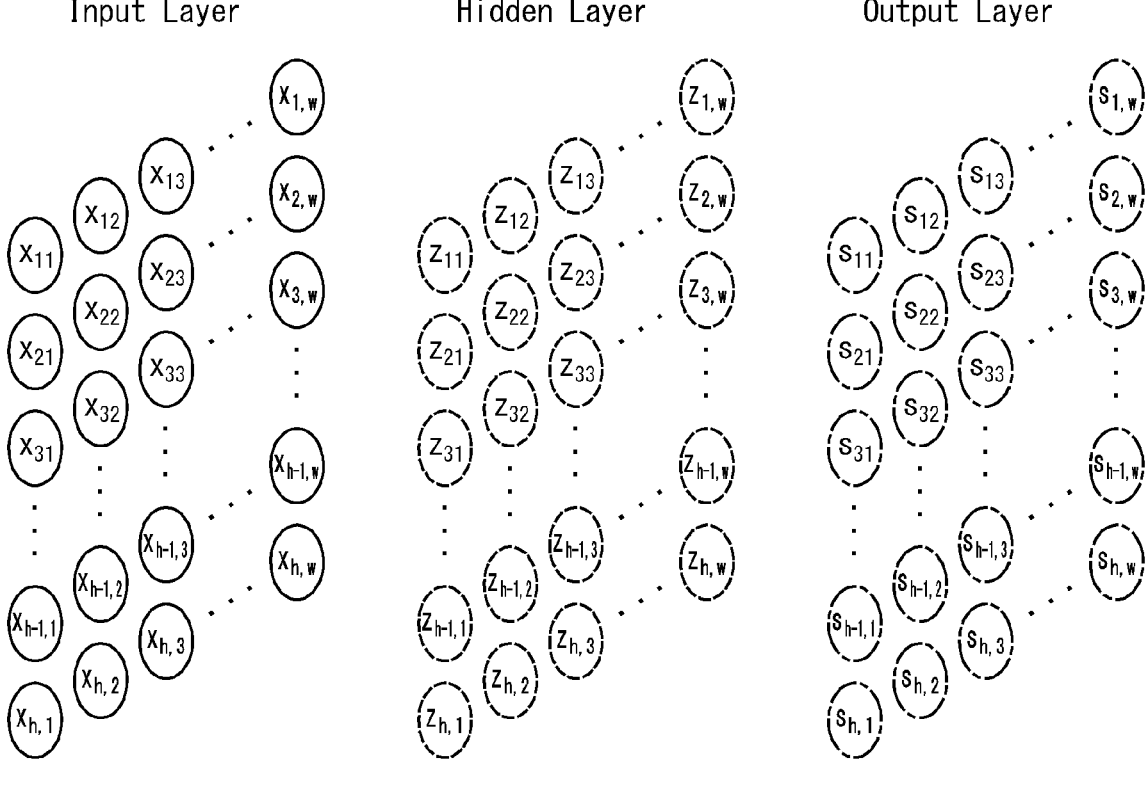

【FIG. 7】
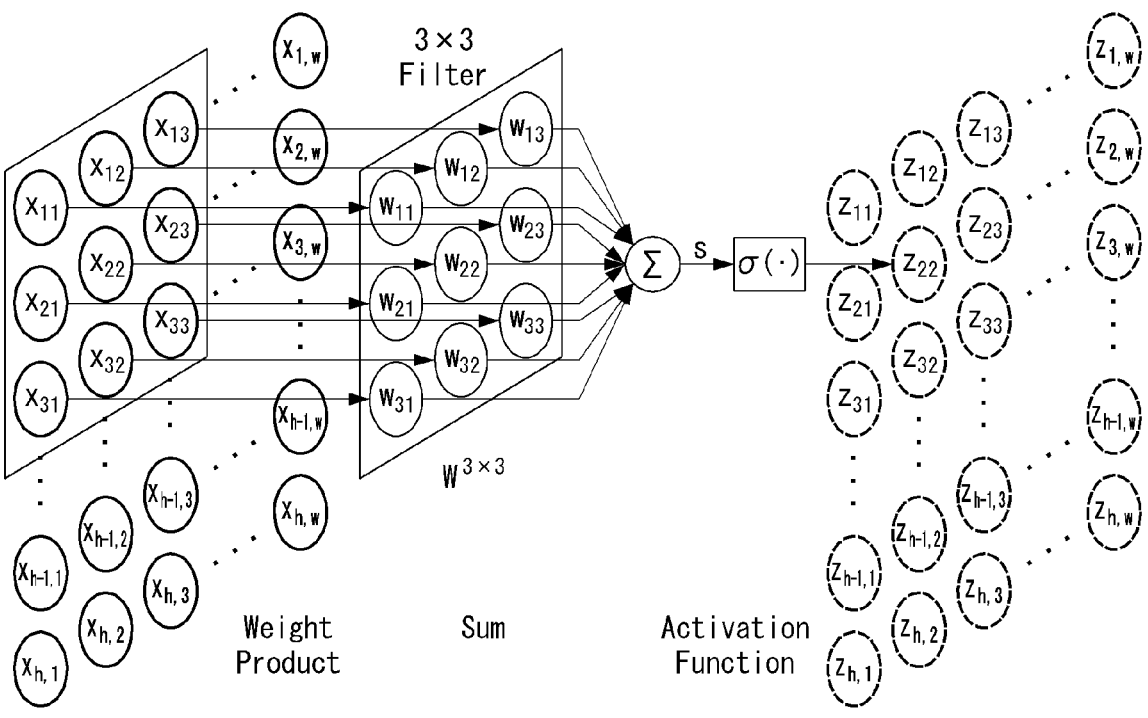
【FIG. 8】
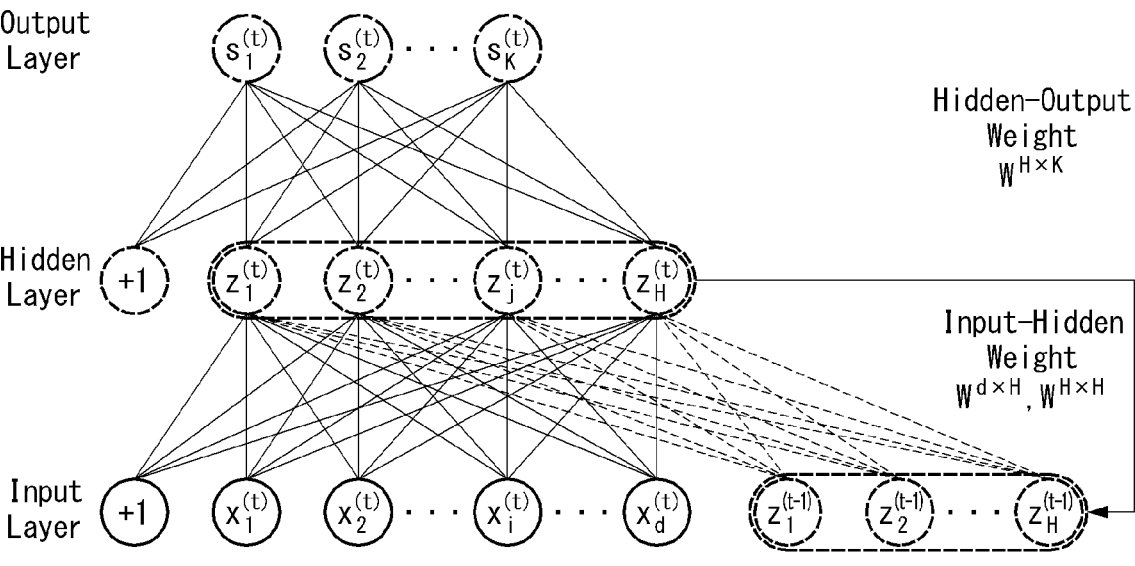

[FIG. 9]
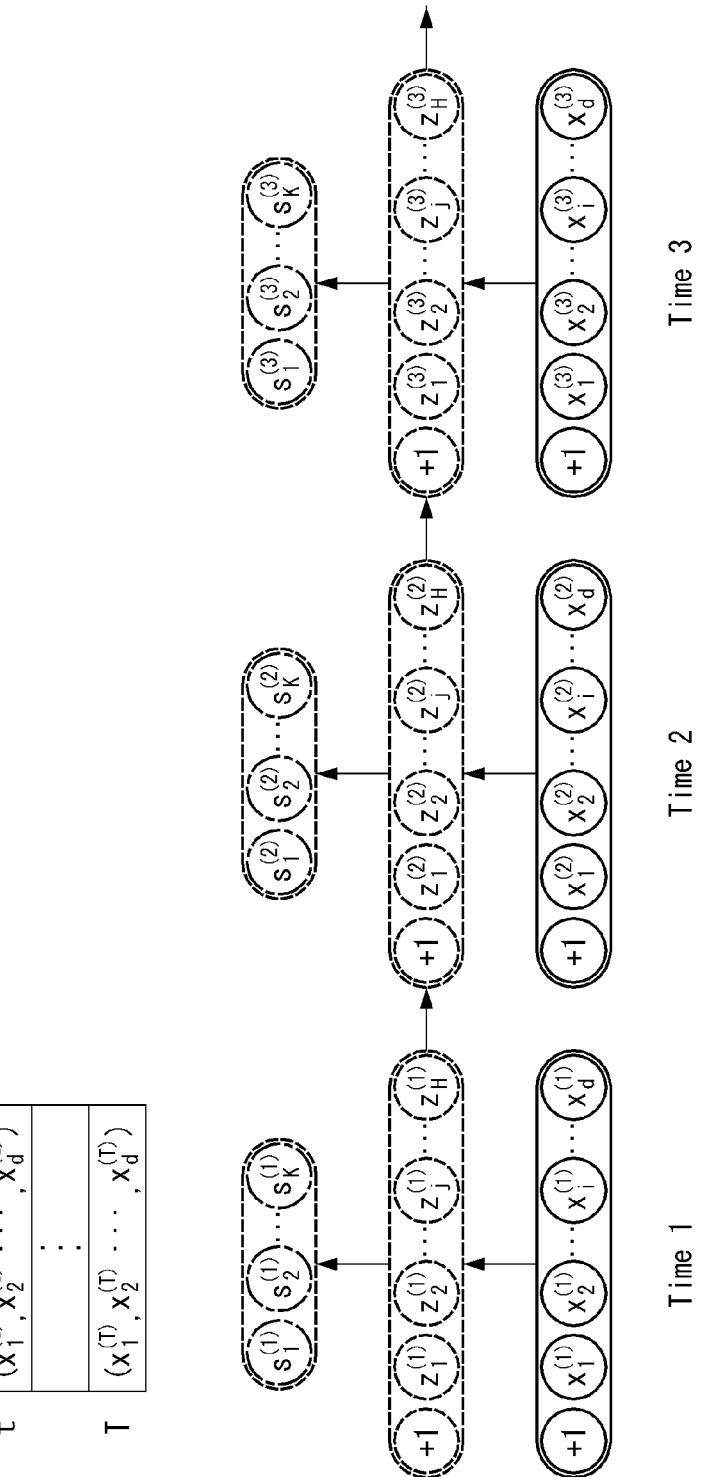

[FIG. 10]
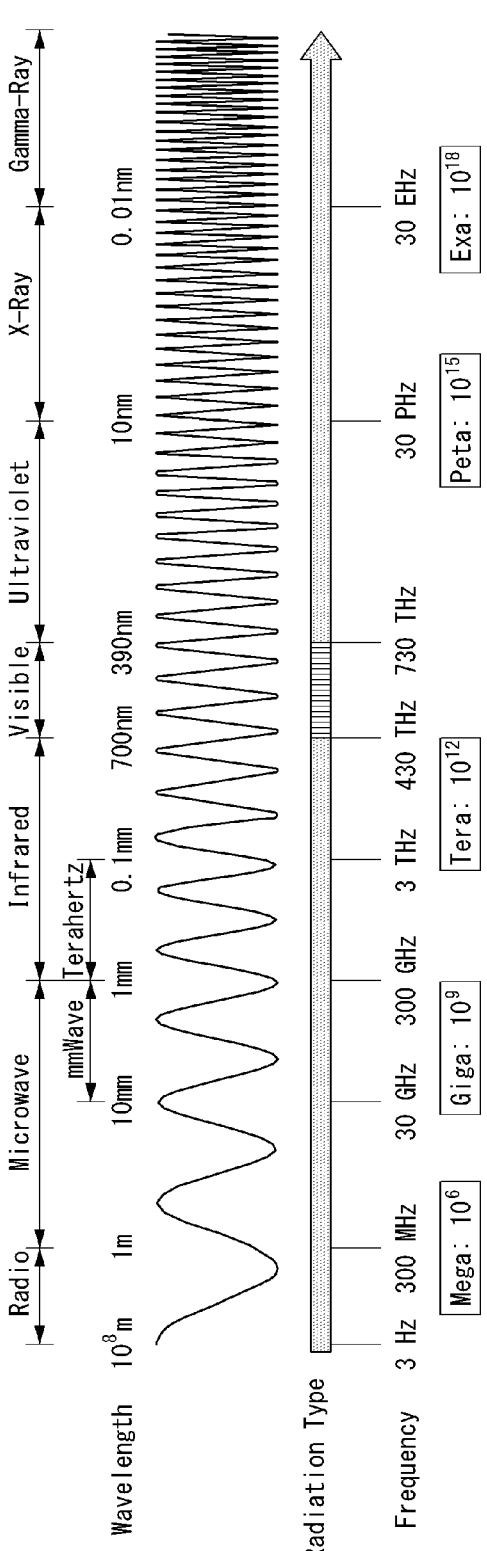

【FIG. 11】
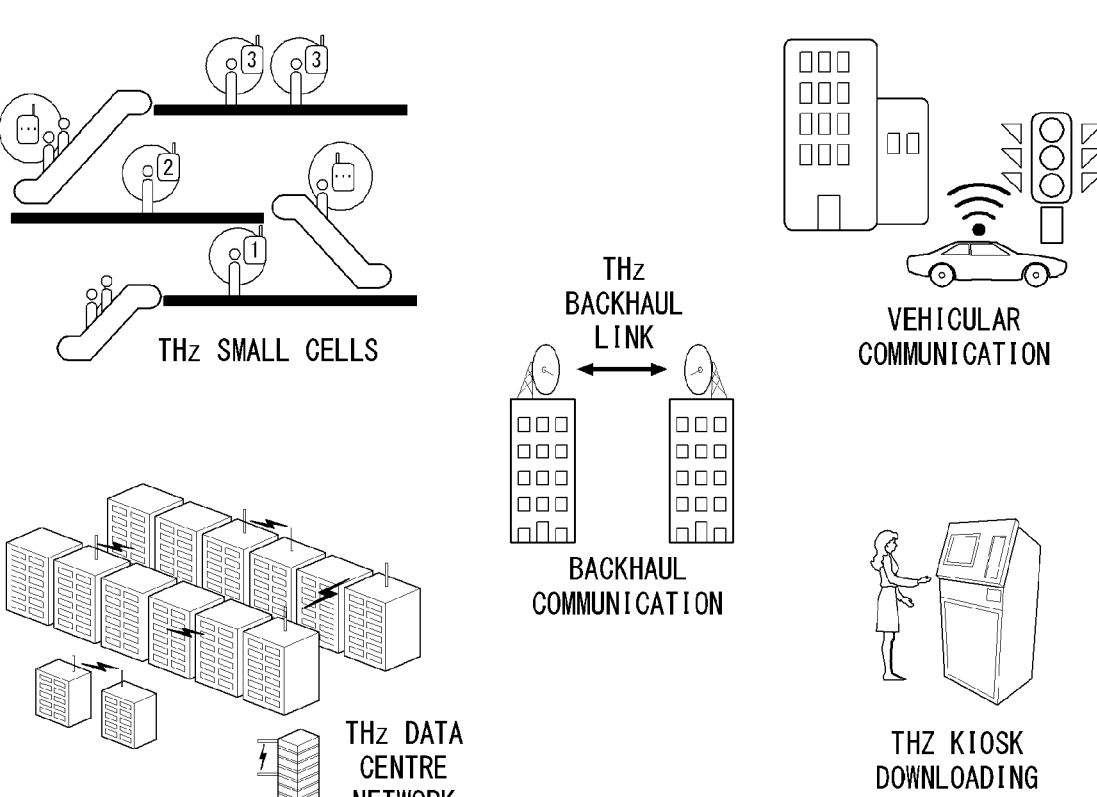
THz SMALL CELLS
THz BACKHAUL LINK
VEHICULAR COMMUNICATION
BACKHAUL COMMUNICATION
THz DATA CENTRE NETWORK
THZ KIOSK DOWNLOADING

[FIG. 12]
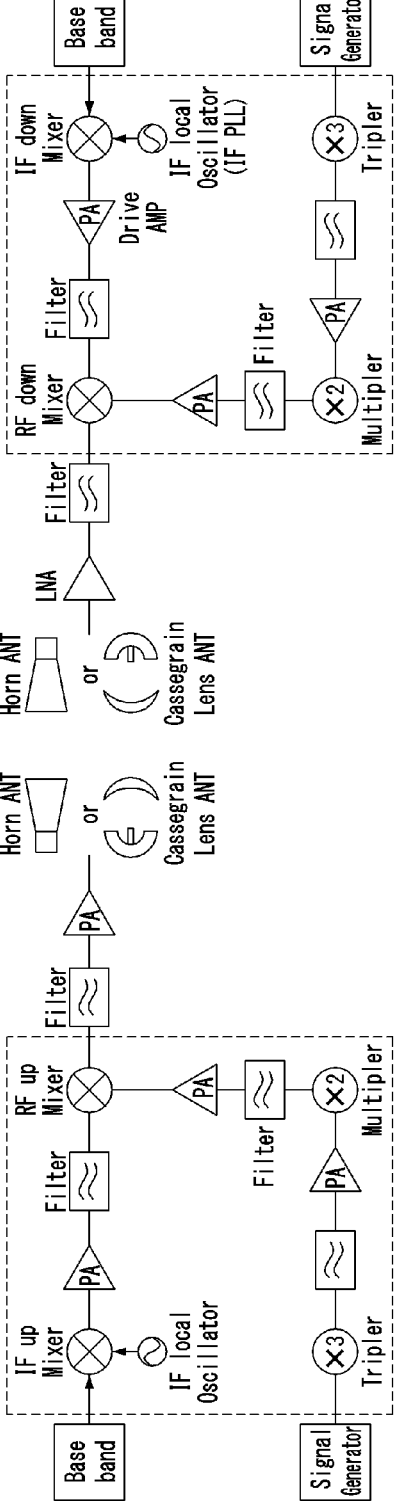

【FIG. 13】
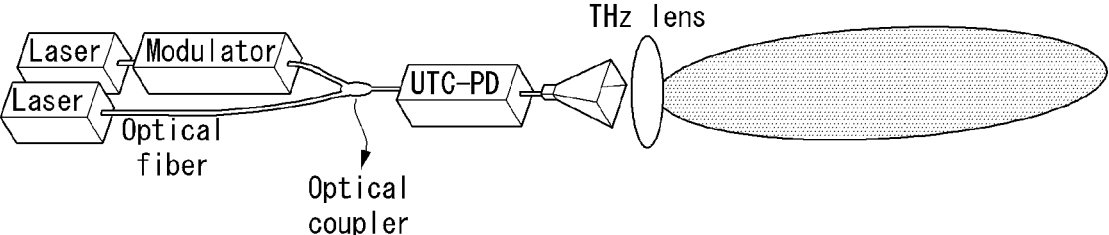

[FIG. 14]

[FIG. 15]
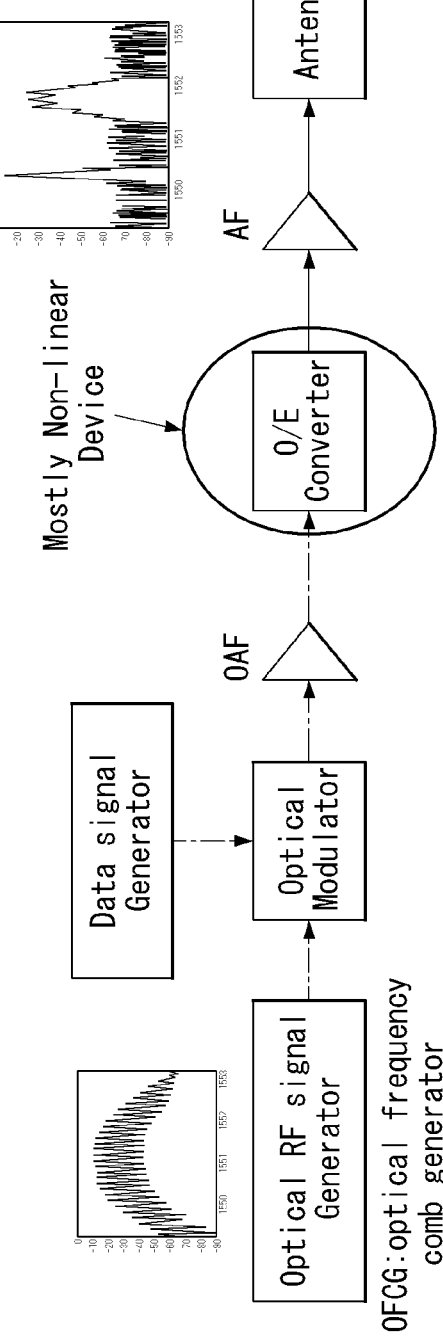

[FIG. 16]
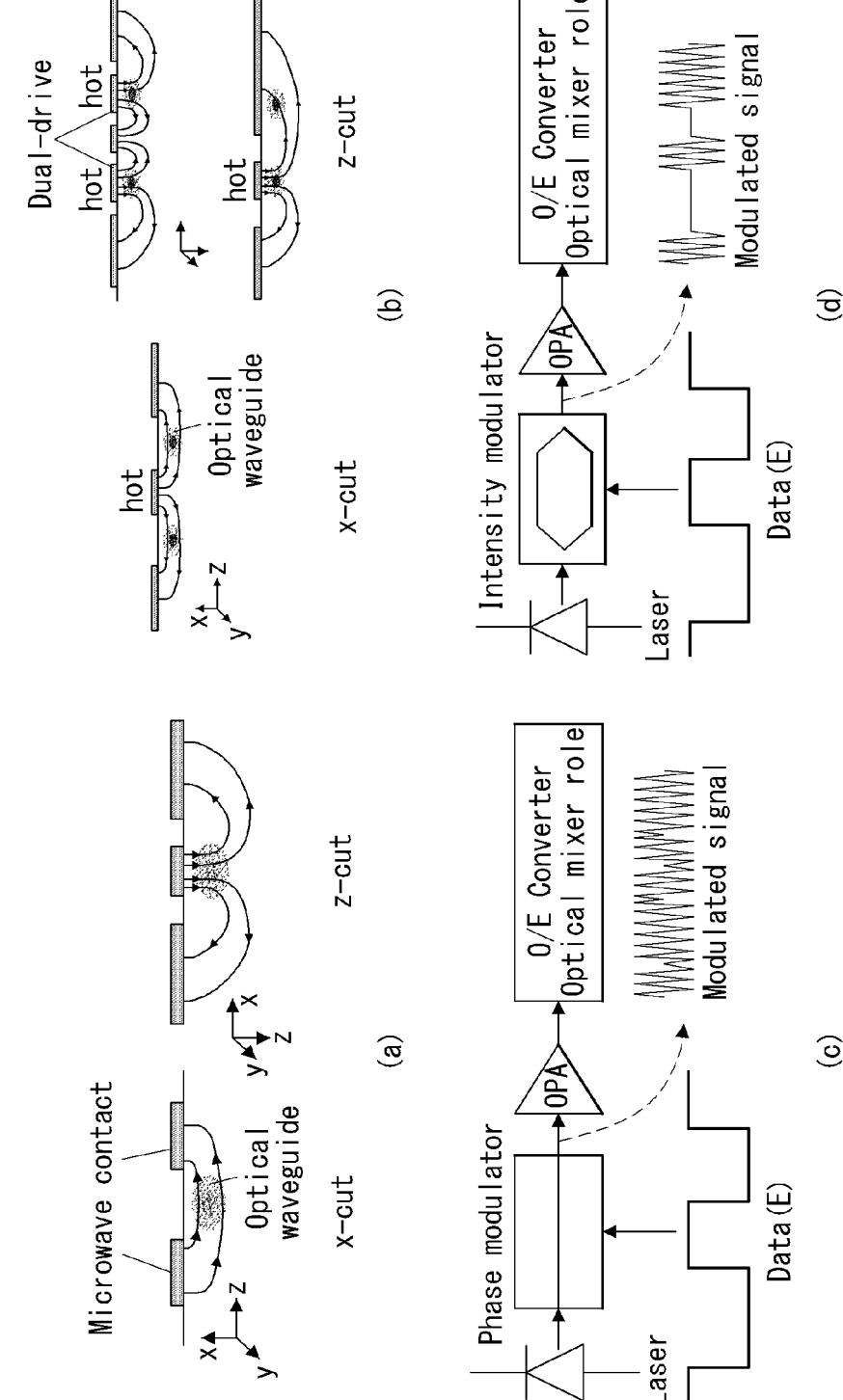

【FIG. 17】
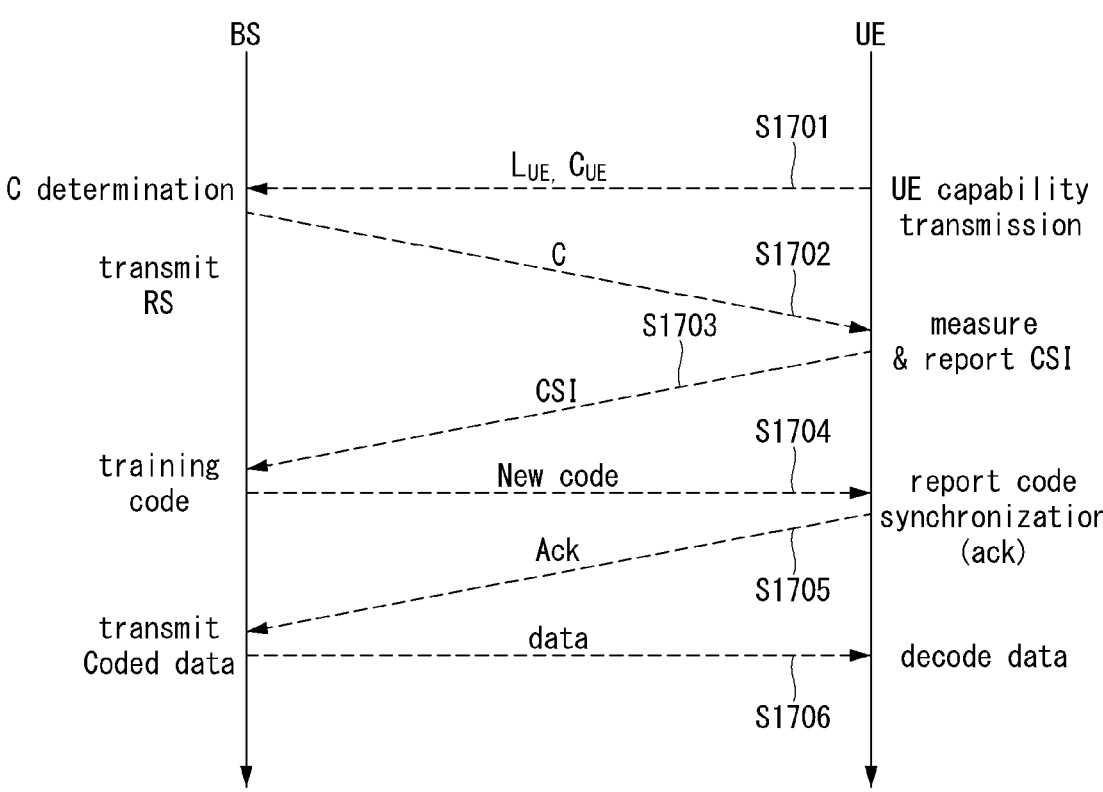

【FIG. 18】
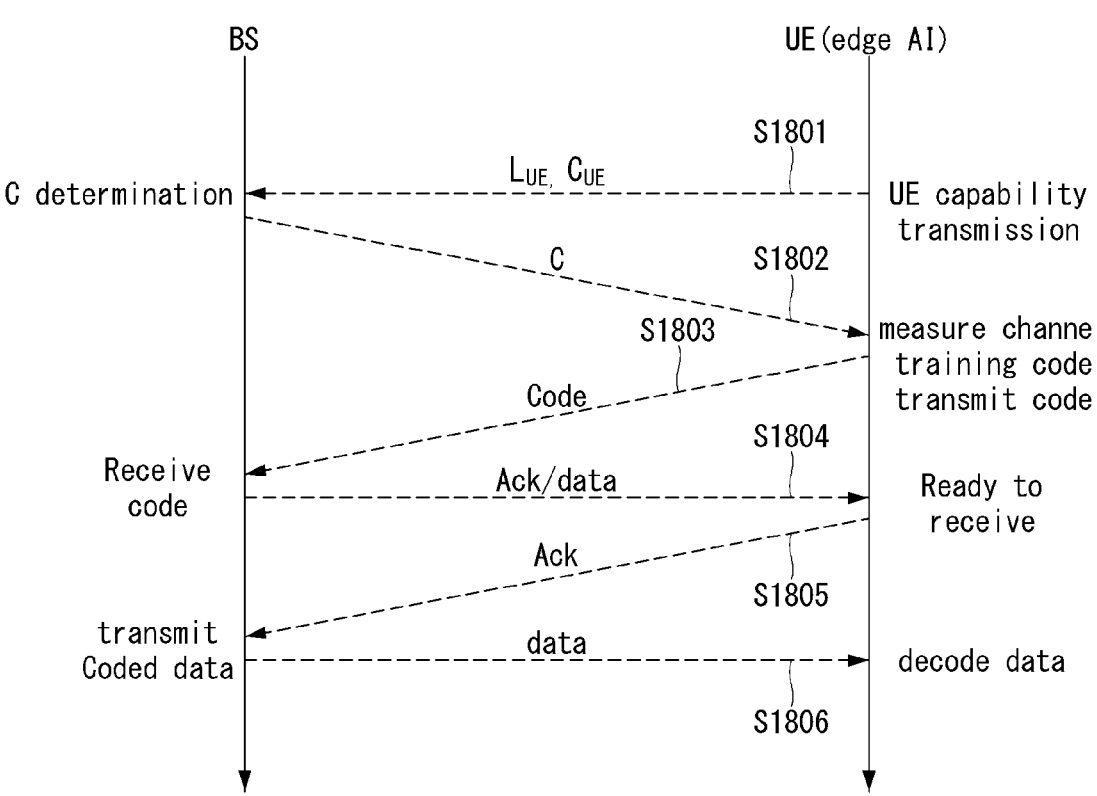

【FIG. 19】
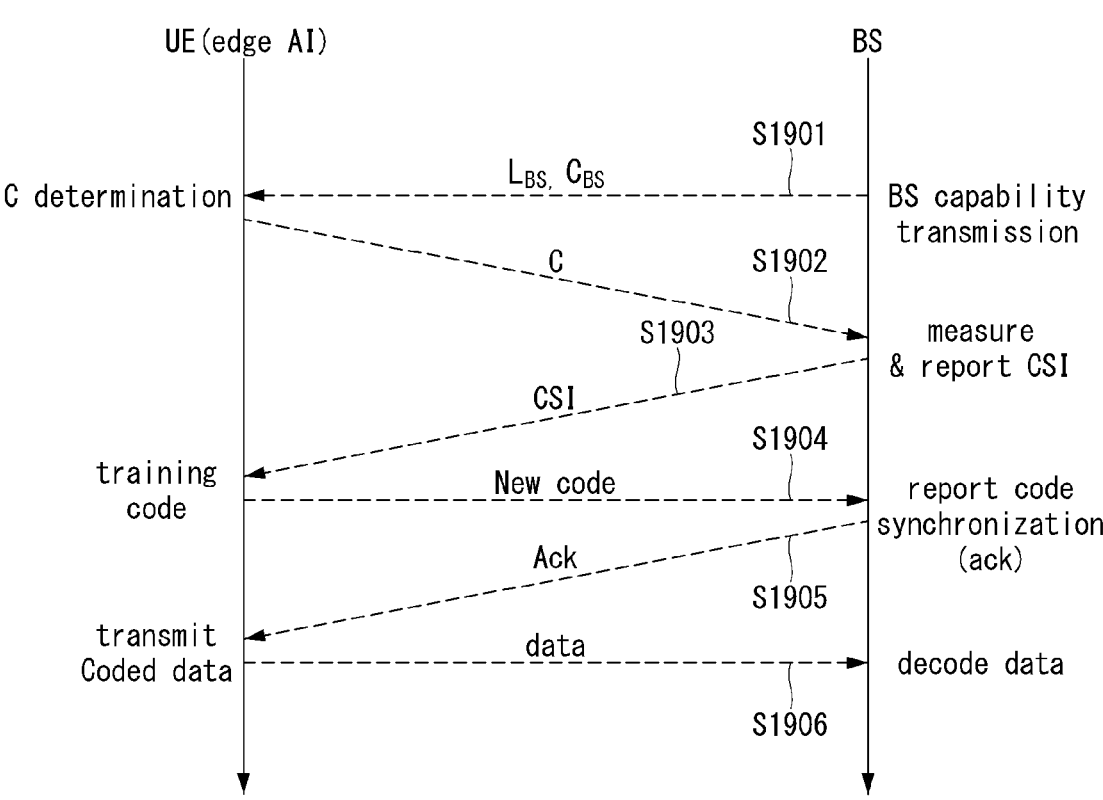

【FIG. 20】
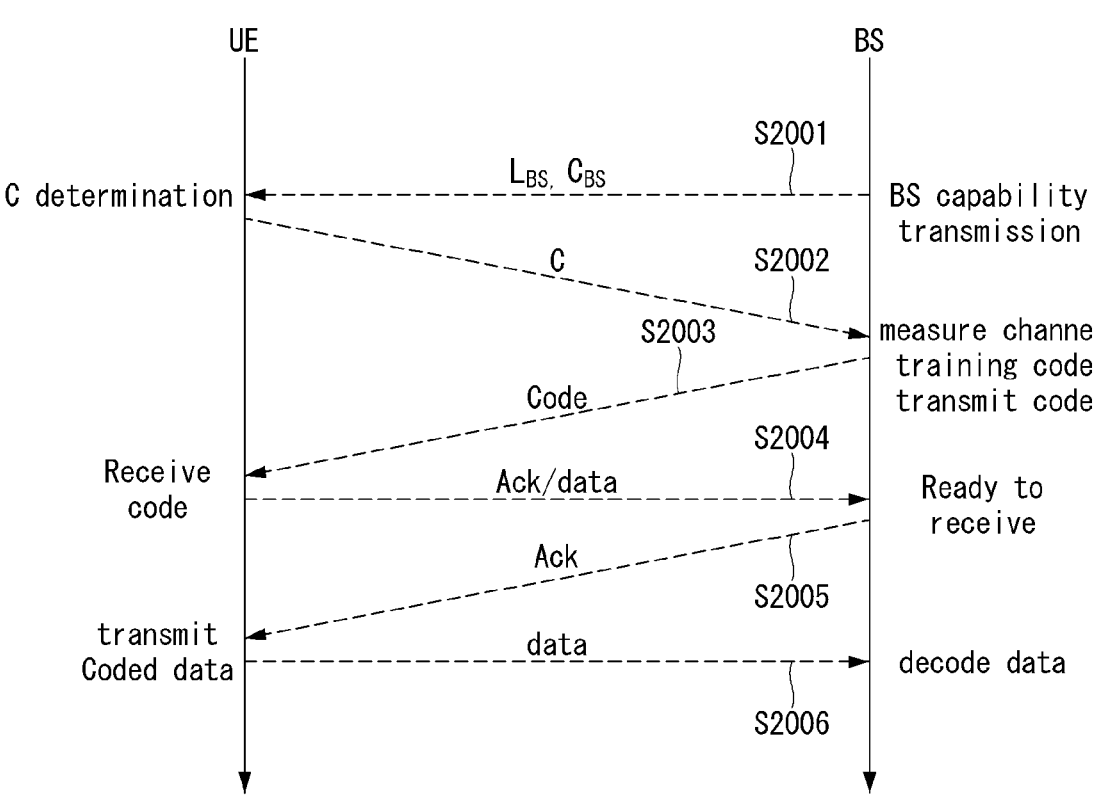

【FIG. 21】
AWGN-optimized code
S2101
Generate initial
parent code
```
  0      1
```
S2102
Select M
codes
Generate
offspring code
S2107
$I < I_{max}$
Y
N
Select
best code
S2108
Update
Parent code
S2106
M parallel processing
Encoding  →  Channel  →  Decoding
S2103        S2104        S2105
Channel state Information
【FIG. 22】
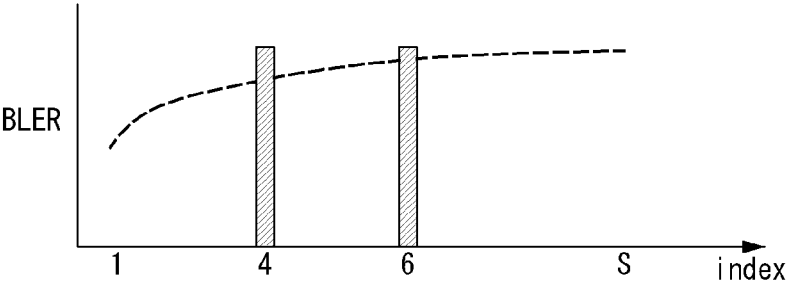

【FIG. 23】

| K | | | | M | | | |
|---|---|---|---|---|---|---|---|
| 6 | | 3 | 2 | 1 | 0 | | |
| | 2 | 0 | 7 | | 0 | 0 | |
| 1 | 5 | 4 | | 0 | | 0 | 0 |
| 4 | 1 | | 3 | 1 | | | 0 |

| K | | | | M | | | |
|---|---|---|---|---|---|---|---|
| 5 | | 3 | 2 | 1 | 0 | | |
| | 2 | 0 | 2 | | 0 | 0 | |
| 1 | 5 | 4 | | 0 | | 0 | 0 |
| 4 | 3 | | 3 | 1 | | | 0 |

(a)

| K | | | | M | | | |
|---|---|---|---|---|---|---|---|
| 6 | | 3 | 2 | 1 | 0 | | |
| | 2 | 0 | 7 | | 0 | 0 | |
| 1 | 5 | 4 | | 0 | | 0 | 0 |
| 4 | 1 | | 3 | 1 | | | 0 |

| K | | | | M | | | |
|---|---|---|---|---|---|---|---|
| 6 | 1 | | 4 | 1 | 0 | | |
| | 2 | 0 | 7 | | 0 | 0 | |
| 1 | 5 | 4 | | 0 | | 0 | 0 |
| 4 | | 2 | 3 | 1 | | | 0 |

(b)

【FIG. 24】
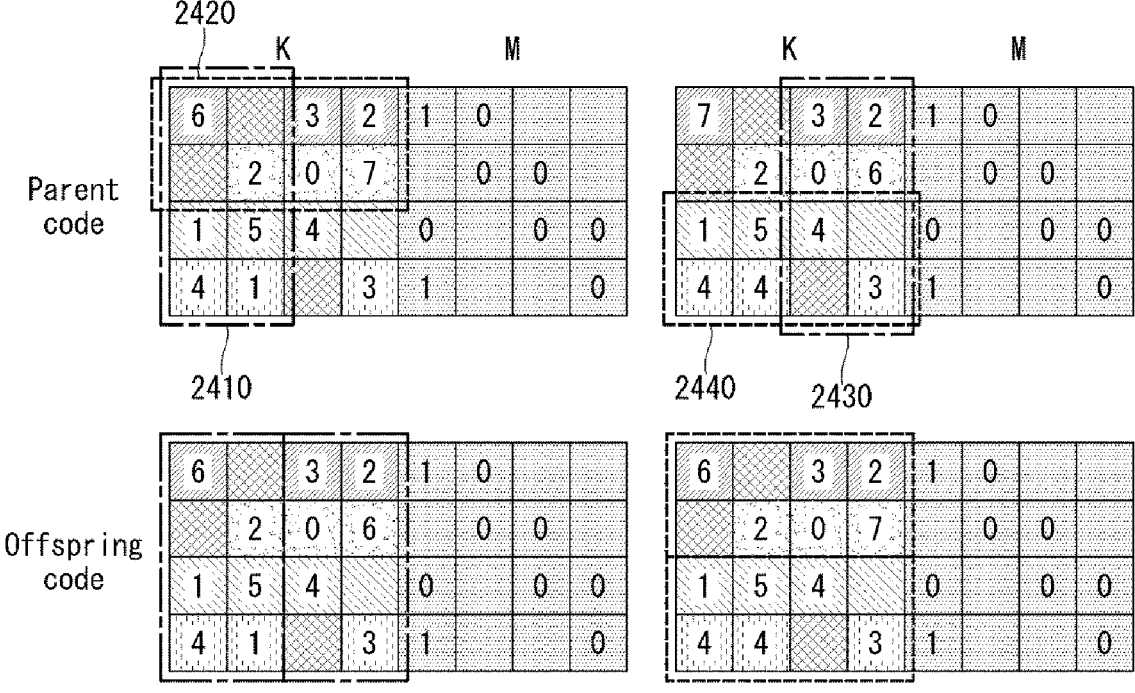

【FIG. 25】
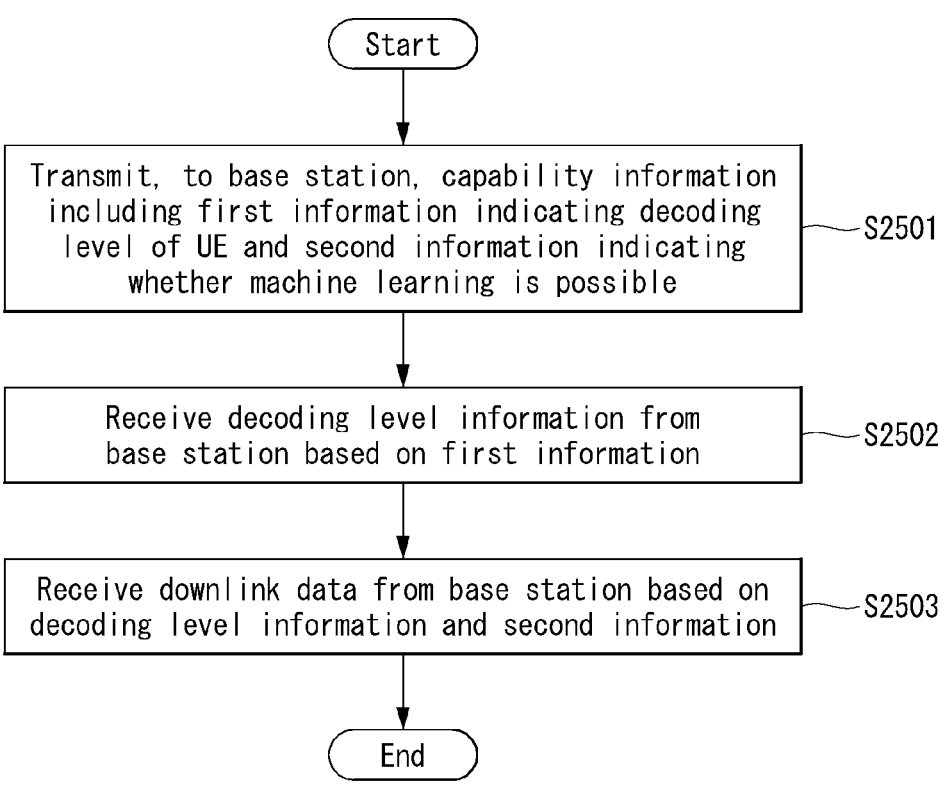

[FIG. 26]
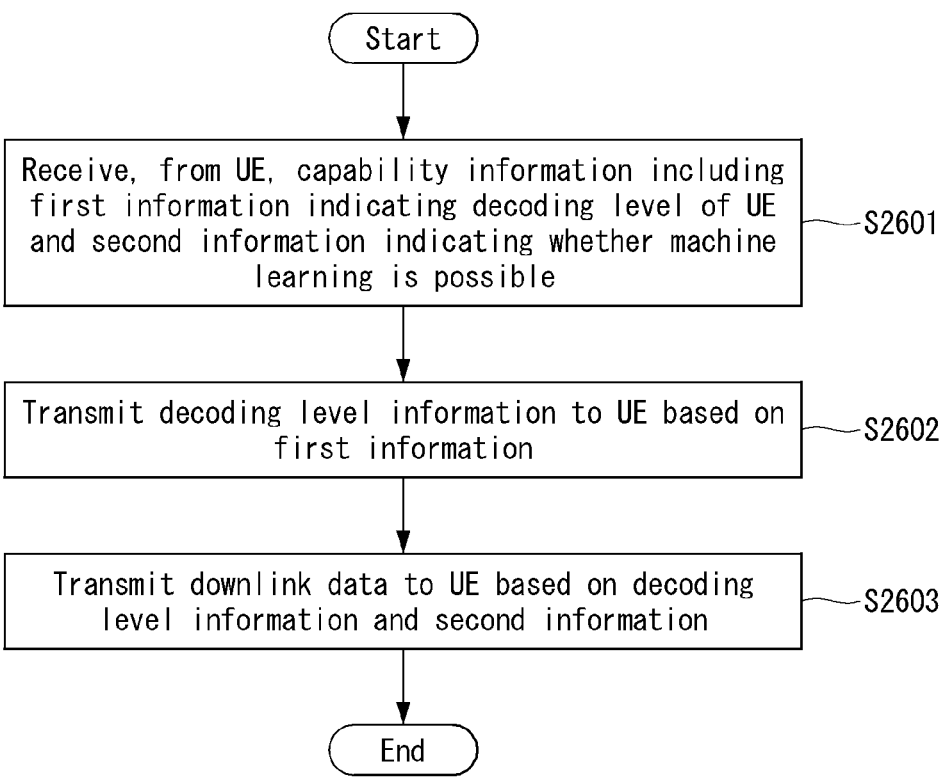

【FIG. 27】
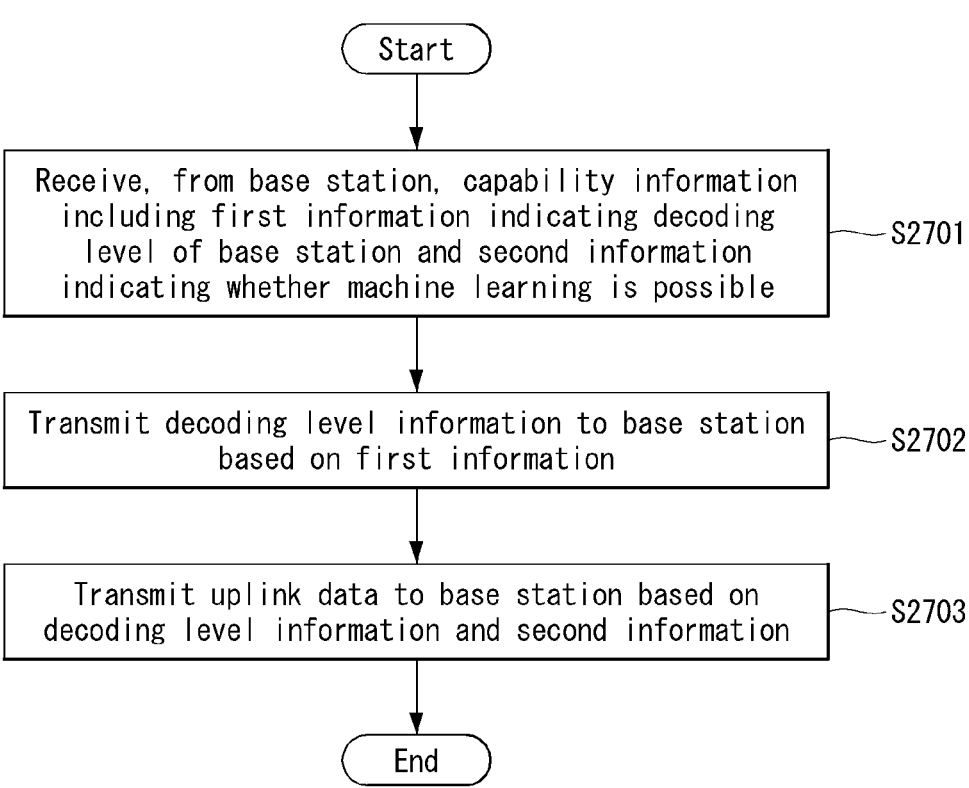

【FIG. 28】
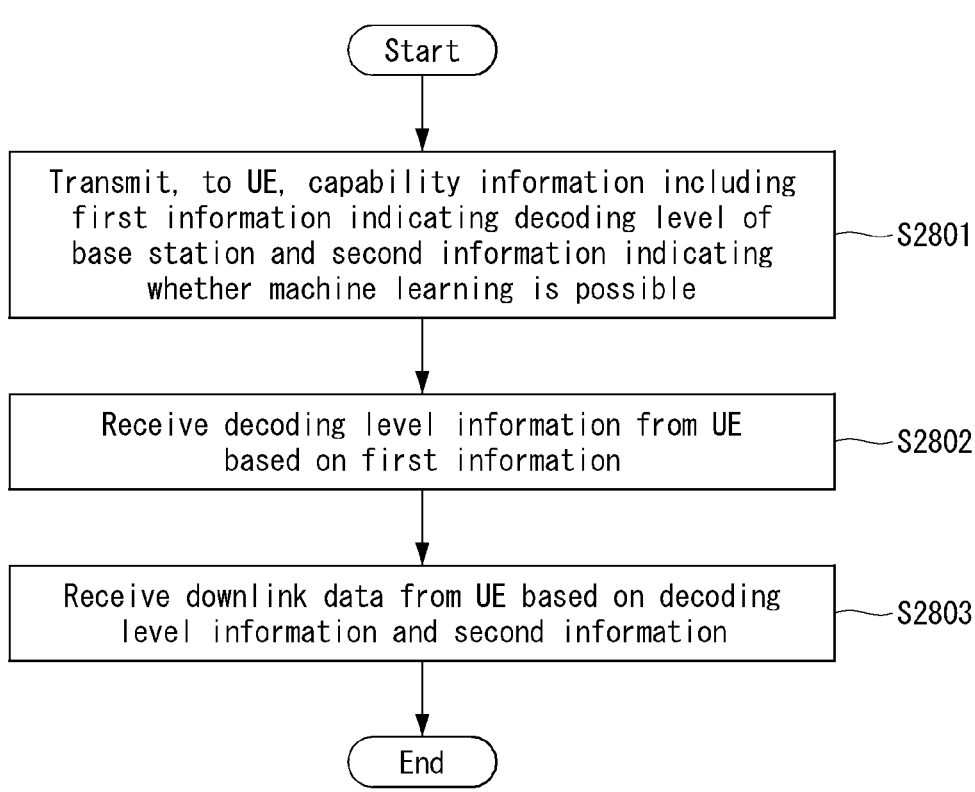

【FIG. 29】
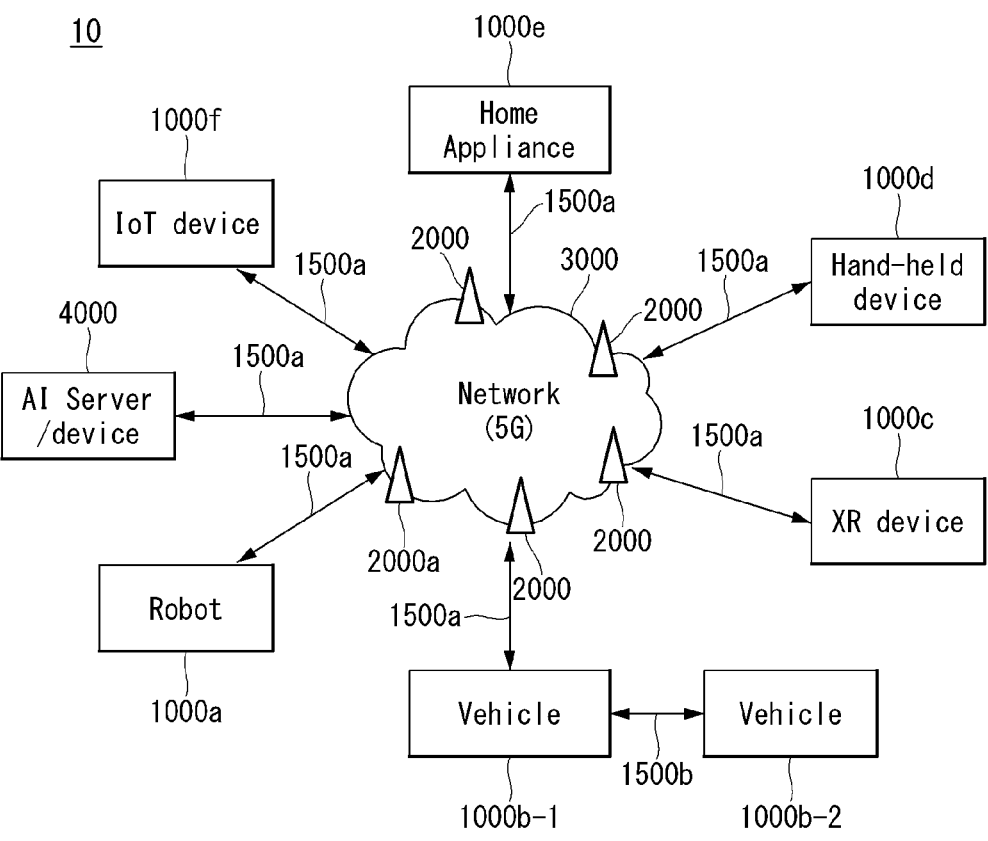
【FIG. 30】
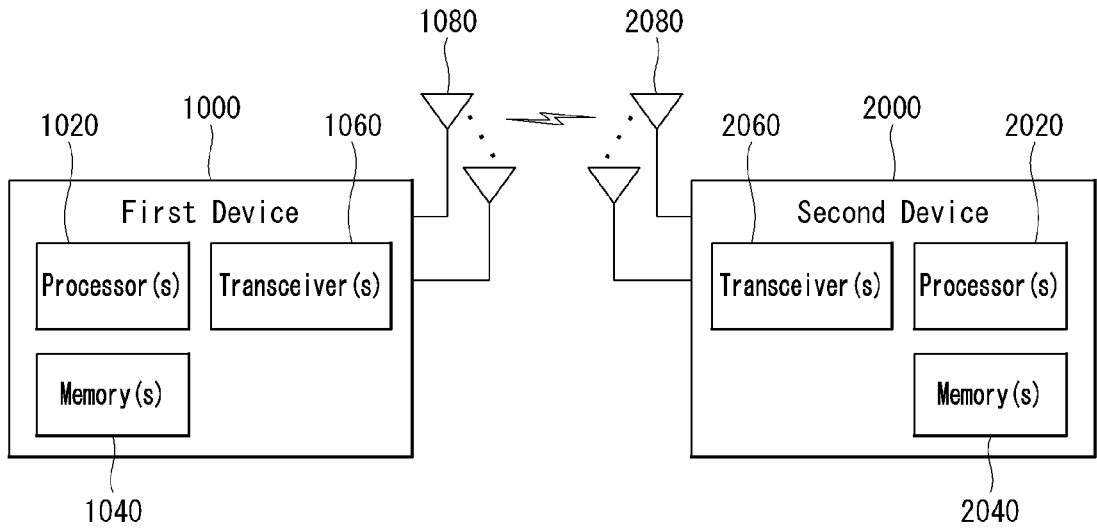

【FIG. 31】
10000 (1020/1060, 2020/2060)
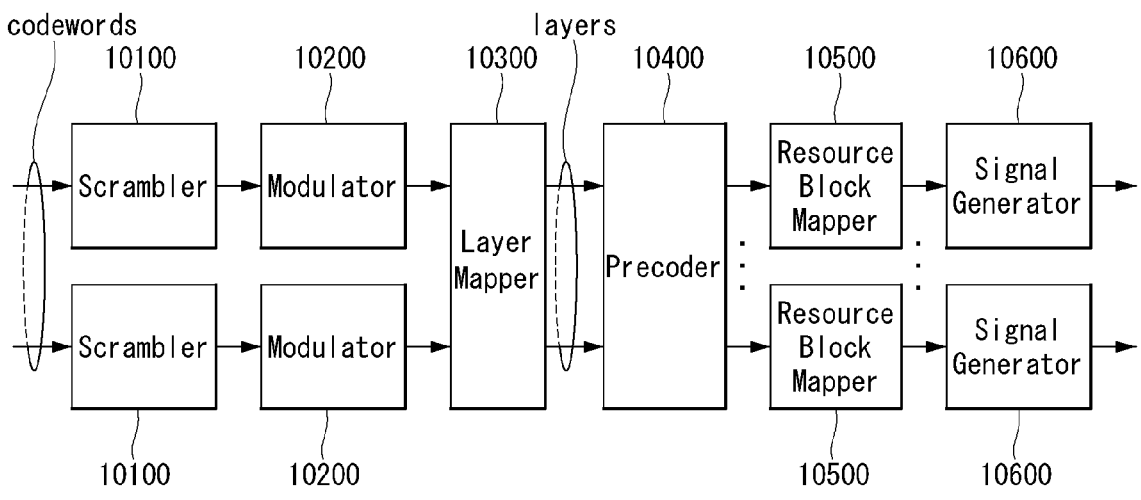
【FIG. 32】
Device (1000, 2000)
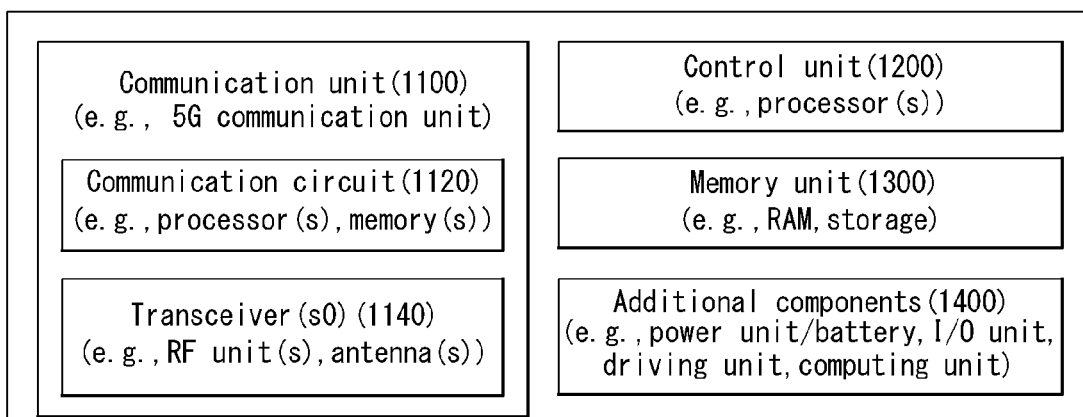

【FIG. 33】
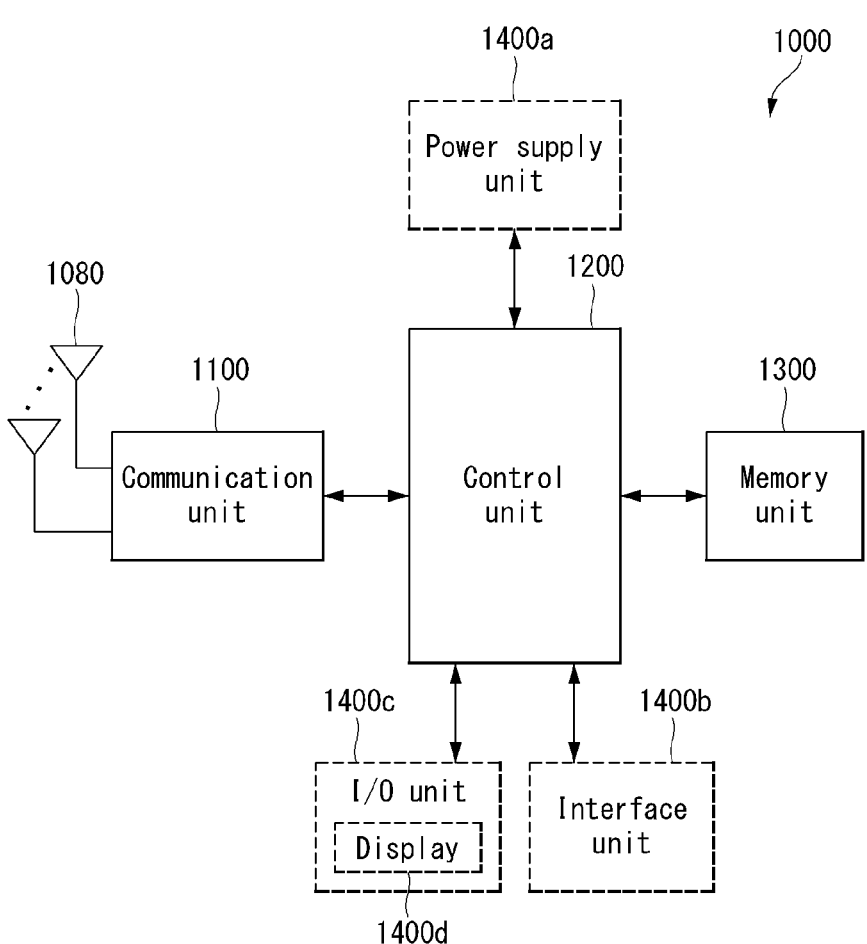

【FIG. 34】
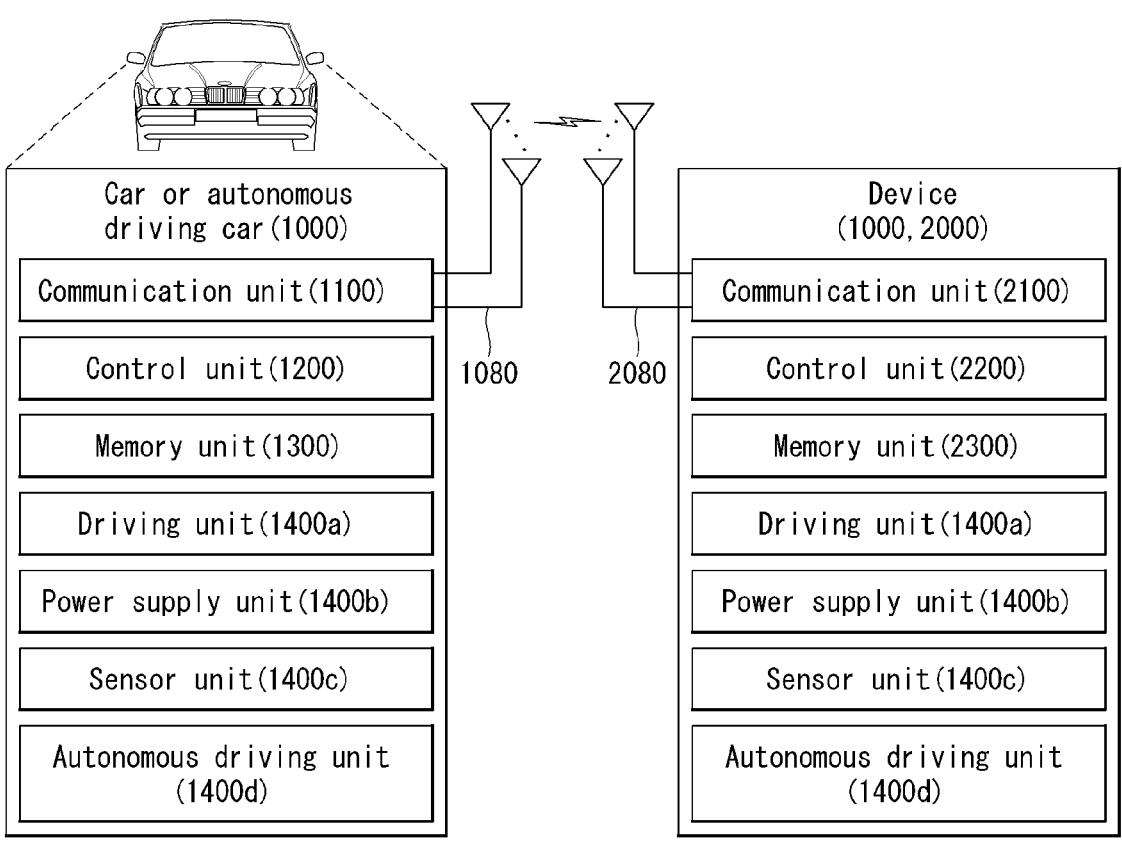

【FIG. 35】
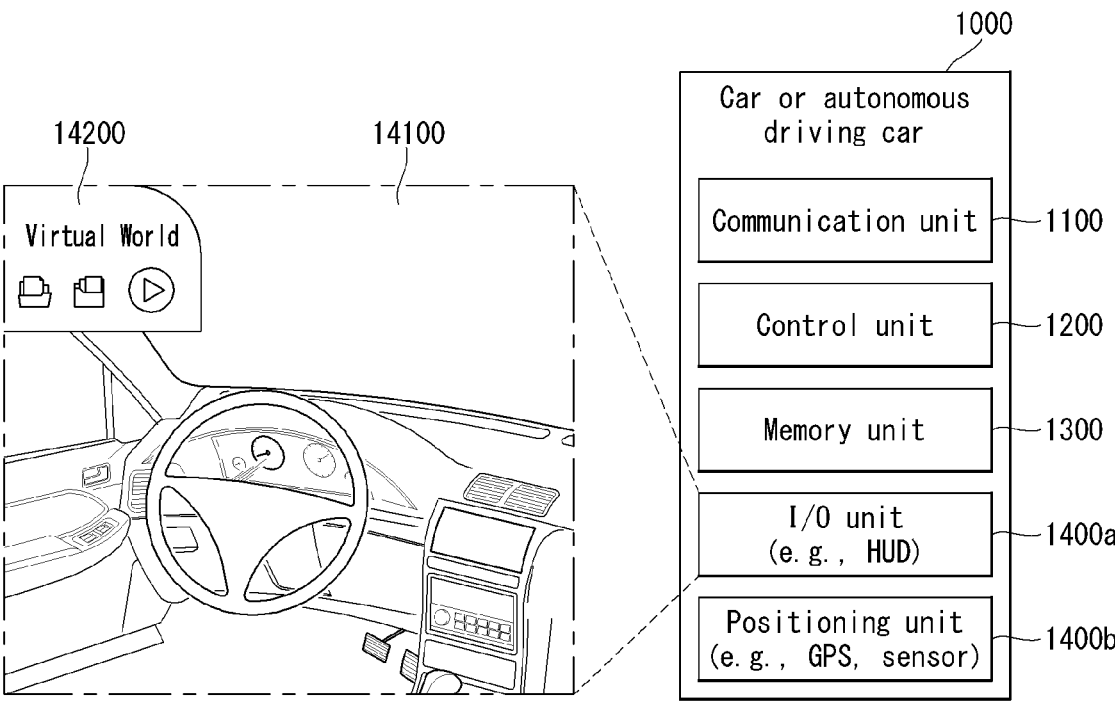
【FIG. 36】
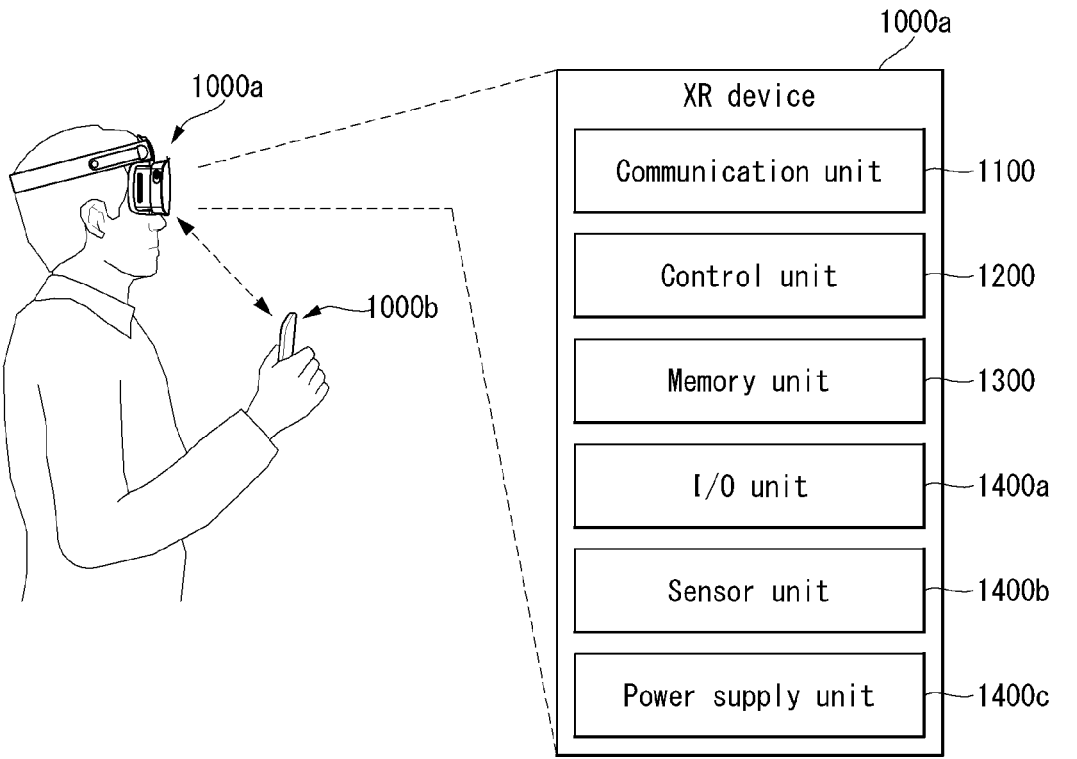

【FIG. 37】
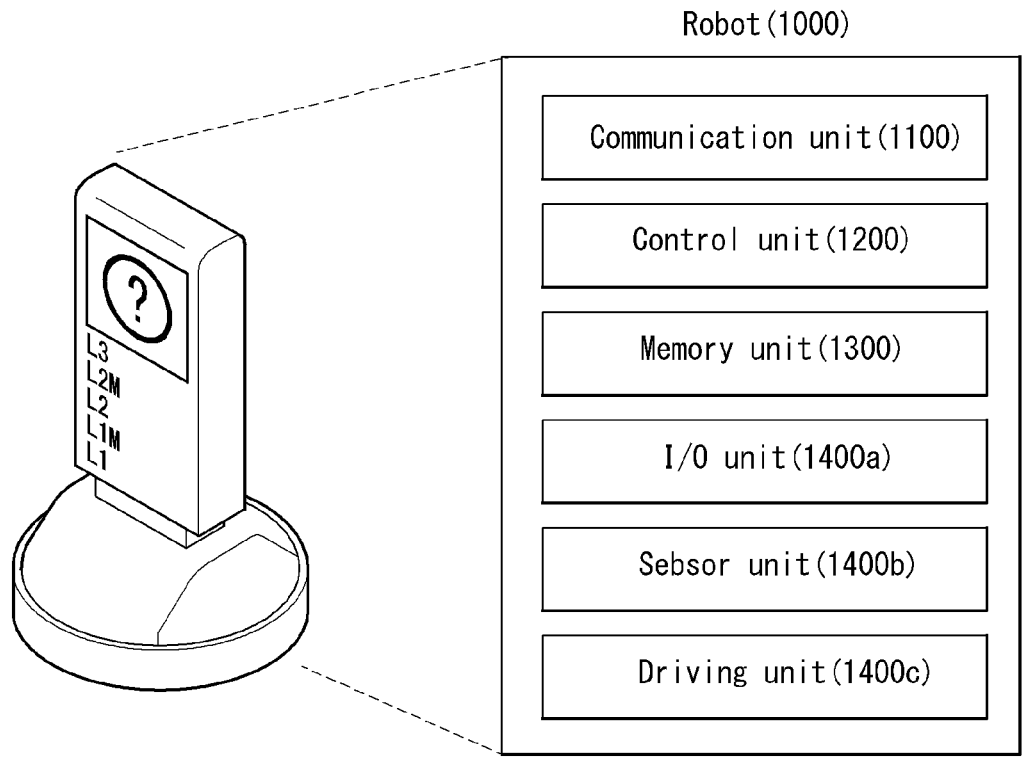
【FIG. 38】
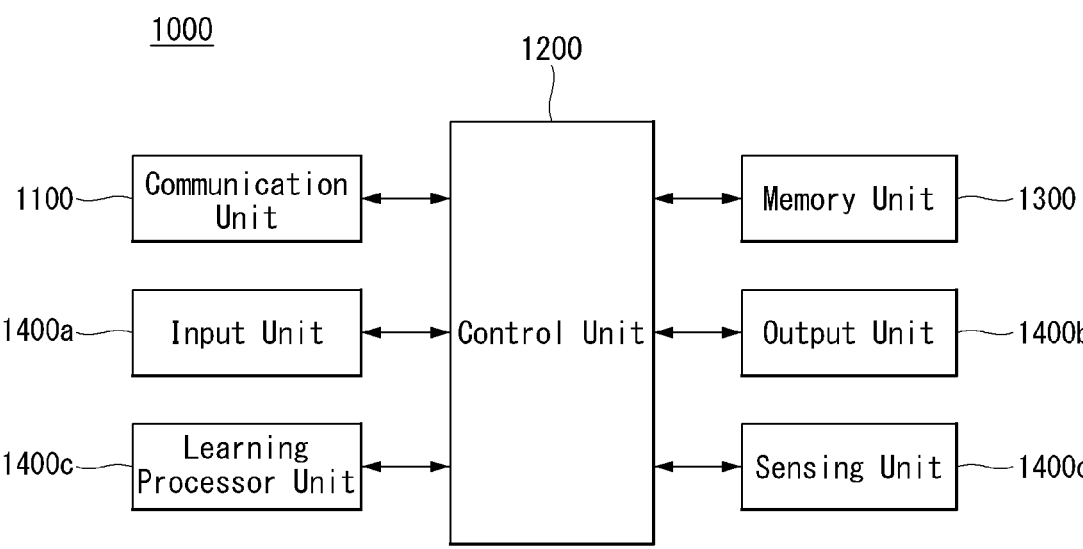

METHOD FOR TRANSMITTING OR GENERATING A CODE USING ARTIFICIAL INTELLIGENCE (AI) / MACHINE LEARNING BASED ON CAPABILITY INFORMATION

CROSS-REFERENCE TO RELATED APPLICATION(S)

This application is the National Stage filing under 35 U.S.C. 371 of International Application No. PCT/KR2020/007899, filed on Jun. 18, 2020, the contents of which is hereby incorporated by reference herein in its entirety.

TECHNICAL FIELD

The present disclosure relates to a wireless communication system, and more particularly to a method of transmitting and receiving data and a device supporting the same.

BACKGROUND ART

Wireless communication systems have been widely deployed to provide various types of communication services such as voice or data. In general, the wireless communication system is a multiple access system capable of supporting communication with multiple users by sharing available system resources (bandwidth, transmission power, etc.).

Examples of multiple access systems include a Code Division Multiple Access (CDMA) system, a Frequency Division Multiple Access (FDMA) system, a Time Division Multiple Access (TDMA) system, a Space Division Multiple Access (SDMA) system, an Orthogonal Frequency Division Multiple Access (OFDMA) system, a Single Carrier Frequency Division Multiple Access (SC-FDMA) system, and an Interleave Division Multiple Access (IDMA) system.

DISCLOSURE

Technical Problem

The present disclosure provides a method of generating a code optimized for an actual channel using AI/ML and channel information based on capability information and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect of the present disclosure, there is provided a method of receiving, by a user equipment (UE), downlink data in a wireless communication system, the method comprising, transmitting, to a base station, capability information including (i) first information indicating a decoding level of the UE and (ii) second information indicating whether a machine learning is possible, receiving decoding level information from the base station based on the first information, and receiving the downlink data from the base station based on the decoding level information and the second information.

Receiving the downlink data may comprise, based on the decoding level information indicating a use of a machine learning based code and the second information indicating that the machine learning is possible, generating the machine learning based code based on the machine learning and channel information, transmitting information on the machine learning based code to the base station, and receiving the downlink data from the base station based on the machine learning based code.

Generating the machine learning based code may comprise generating n codes based on the machine learning, generating n pieces of data based on the n codes and the channel information, and selecting the machine learning based code based on a block error rate (BLER) of the n pieces of data.

Receiving the downlink data may comprise, based on the decoding level information indicating a use of a machine learning based code and the second information indicating that the machine learning is not possible, transmitting channel information to the base station, receiving information on the machine learning based code from the base station, and receiving the downlink data from the base station based on the machine learning based code.

Receiving the downlink data may comprise, based on the decoding level information indicating a use of a non-machine learning based code, receiving the downlink data from the base station based on the non-machine learning based code.

The non-machine learning based code may be a low-density parity check (LDPC) code or a polar code.

The method may further comprise receiving a request for the capability information from the base station.

In another aspect of the present disclosure, there is provided a user equipment (UE) receiving downlink data in a wireless communication system, the UE comprising one or more transceivers, one or more processors operatively connected to the one or more transceivers, and one or more memories operatively connected to the one or more processors and configured to store instruction performing operations, wherein the operations comprise transmitting, to a base station, capability information including (i) first information indicating a decoding level of the UE and (ii) second information indicating whether a machine learning is possible, receiving decoding level information from the base station based on the first information, and receiving the downlink data from the base station based on the decoding level information and the second information.

In another aspect of the present disclosure, there is provided a method of receiving, by a base station, downlink data in a wireless communication system, the method comprising receiving, from a user equipment (UE), capability information including (i) first information indicating a decoding level of the UE and (ii) second information indicating whether a machine learning is possible, transmitting decoding level information to the UE based on the first information, and transmitting the downlink data to the UE based on the decoding level information and the second information.

In another aspect of the present disclosure, there is provided a method of transmitting, by a user equipment (UE), uplink data in a wireless communication system, the method comprising receiving, from a base station, capability information including (i) first information indicating a decoding level of the base station and (ii) second information indicating whether a machine learning is possible, transmitting decoding level information to the base station based on the first information, and transmitting the uplink data to the base station based on the decoding level information and the second information.

Transmitting the uplink data may comprise, based on the decoding level information indicating a use of a machine learning based code and the second information indicating that the machine learning is possible, receiving information on the machine learning based code from the base station, and transmitting the uplink data to the base station based on the machine learning based code.

The method may further comprise, based on the decoding level information indicating a use of a machine learning based code and the second information indicating that the machine learning is not possible, receiving channel information from the base station, generating the machine learning based code based on the machine learning and the channel information, transmitting information on the machine learning based code to the base station, and transmitting the uplink data to the base station based on the machine learning based code.

Generating the machine learning based code may comprise generating n codes based on the machine learning, generating n pieces of data based on the n codes and the channel information, and selecting the machine learning based code based on a block error rate (BLER) of the n pieces of data.

Transmitting the uplink data may comprise, based on the decoding level information indicating a use of a non-machine learning based code, transmitting the uplink data to the base station based on the non-machine learning based code.

The non-machine learning based code may be a low-density parity check (LDPC) code or a polar code.

The method may further comprise transmitting a request for the capability information to the base station.

In another aspect of the present disclosure, there is provided a user equipment (UE) transmitting uplink data in a wireless communication system, the UE comprising one or more transceivers, one or more processors operatively connected to the one or more transceivers, and one or more memories operatively connected to the one or more processors and configured to store instruction performing operations, wherein the operations comprise receiving, from a base station, capability information including (i) first information indicating a decoding level of the base station and (ii) second information indicating whether a machine learning is possible, transmitting decoding level information to the base station based on the first information, and transmitting the uplink data to the base station based on the decoding level information and the second information.

In another aspect of the present disclosure, there is provided a method of receiving, by a base station, uplink data in a wireless communication system, the method comprising transmitting, to a user equipment (UE), capability information including (i) first information indicating a decoding level of the base station and (ii) second information indicating whether a machine learning is possible, receiving decoding level information from the UE based on the first information, and receiving the uplink data from the UE based on the decoding level information and the second information.

Advantageous Effects

The present disclosure has an effect of improving a communication error in an ultra-high latency ultra-reliable communication system environment (e.g., 5G/6G) by generating a code optimized for an actual channel using AI/ML and channel information based on capability information.

The present disclosure has an effect of improving resource waste due to retransmission by generating a code optimized for an actual channel using AI/ML and channel information based on capability information.

The present disclosure has an effect of implementing an ultra-low latency ultra-reliable communication system by generating a code optimized for an actual channel using AI/ML and channel information based on capability information.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates physical channels and general signal transmission used in a 3GPP system.

FIG. 2 illustrates an example of a communication structure providable in a 6G system.

FIG. 3 illustrates an example of a structure of a perceptron.

FIG. 4 illustrates an example of a structure of a multilayer perceptron.

FIG. 5 illustrates an example of a deep neural network.

FIG. 6 illustrates an example of a convolutional neural network.

FIG. 7 illustrates an example of a filter operation in a convolutional neural network.

FIG. 8 illustrates an example of a neural network structure in which a circular loop exists.

FIG. 9 illustrates an example of an operation structure of a recurrent neural network.

FIG. 10 illustrates an example of an electromagnetic spectrum.

FIG. 11 illustrates an example of a THz communication application.

FIG. 12 illustrates an example of an electronic device-based THz wireless communication transceiver.

FIG. 13 illustrates an example of a method of generating an optical device-based THz signal.

FIG. 14 illustrates an example of an optical device-based THz wireless communication transceiver.

FIG. 15 illustrates a structure of a photoinc source based transmitter.

FIG. 16 illustrates a structure of an optical modulator.

FIG. 17 is a flow chart illustrating a method for a base station to generate an optimal code in a downlink transmission.

FIG. 18 is a flow chart illustrating a method for a UE to generate an optimal code in a downlink transmission.

FIG. 19 is a flow chart illustrating a method for a UE to generate an optimal code in an uplink transmission.

FIG. 20 is a flow chart illustrating a method for a base station to generate an optimal code in an uplink transmission.

FIG. 21 is a flow chart illustrating a method for a bass station (or UE) to search or generate an optimal code based on AI and/or ML.

FIG. 22 is a graph that arranges parent codes in ascending order by BLER.

FIG. 23 illustrates variants used in a genetic algorithm.

FIG. 24 illustrates a crossing (or mating) used in a genetic algorithm.

FIG. 25 is a flow chart illustrating an operation method of a UE in a downlink transmission described in the present disclosure.

FIG. 26 is a flow chart illustrating an operation method of a base station in a downlink transmission described in the present disclosure.

FIG. 27 is a flow chart illustrating an operation method of a UE in an uplink transmission described in the present disclosure.

FIG. 28 is a flow chart illustrating an operation method of a base station in an uplink transmission described in the present disclosure.

FIG. 29 illustrates a communication system 10 applied to the present disclosure.

FIG. 30 illustrates a wireless device applicable to the present disclosure.

FIG. 31 illustrates a signal processing circuit for a transmission signal.

FIG. 32 illustrates another example of a wireless device applied to the present disclosure.

FIG. 33 illustrates a hand-held device applied to the present disclosure.

FIG. 34 illustrates a vehicle or an autonomous vehicle applied to the present disclosure.

FIG. 35 illustrates a vehicle applied to the present disclosure.

FIG. 36 illustrates an XR device applied to the present disclosure.

FIG. 37 illustrates a robot applied to the present disclosure.

FIG. 38 illustrates an AI device applied to the present disclosure.

MODE FOR INVENTION

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

In the present disclosure, a base station means a terminal node of a network directly performing communication with a terminal. In the present disclosure, specific operations described to be performed by the base station may be performed by an upper node of the base station in some cases. That is, it is apparent that in a network constituted by multiple network nodes including the base station, various operations performed for communication with the terminal may be performed by the base station or other network nodes other than the base station. The 'base station (BS)' may be substituted with terms such as a fixed station, Node B, evolved-NodeB (eNB), a base transceiver system (BTS), an access point (AP), gNB (general NB, generation NB), and the like. Further, the 'terminal' may be fixed or movable and be substituted with terms such as a user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station.

Specific terms used in the following description are provided to help the understanding of the present disclosure and the use of the specific terms may be modified into other forms within the scope without departing from the technical spirit of the present disclosure.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro. 3GPP 6G may be an evolved version of 3GPP NR.

Embodiments of the present disclosure may be supported by standard documents disclosed in at least one of IEEE 802, 3GPP, and 3GPP2 that are wireless access systems. That is, steps or portions of the embodiments of the present disclosure which are not described in order to clearly illustrate the technical spirit of the present disclosure may be supported by the standard documents. Further, all terms disclosed in the present disclosure may be described by the standard documents.

For clarity in the description, the following description will mostly focus on 3GPP communication system (e.g. LTE-A or 5G NR). However, technical features according to an embodiment of the present disclosure will not be limited only to this. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR/6G may be collectively referred to as the 3GPP system. For terms and techniques not specifically described among terms and techniques used in the present disclosure, reference may be made to a wireless communication standard document published before the present disclosure is filed. For example, the following document may be referred to.

3GPP LTE 36.211: Physical channels and modulation 36.212: Multiplexing and channel coding 36.213: Physical layer procedures 36.300: Overall description 36.331: Radio Resource Control (RRC)

Figure 1:
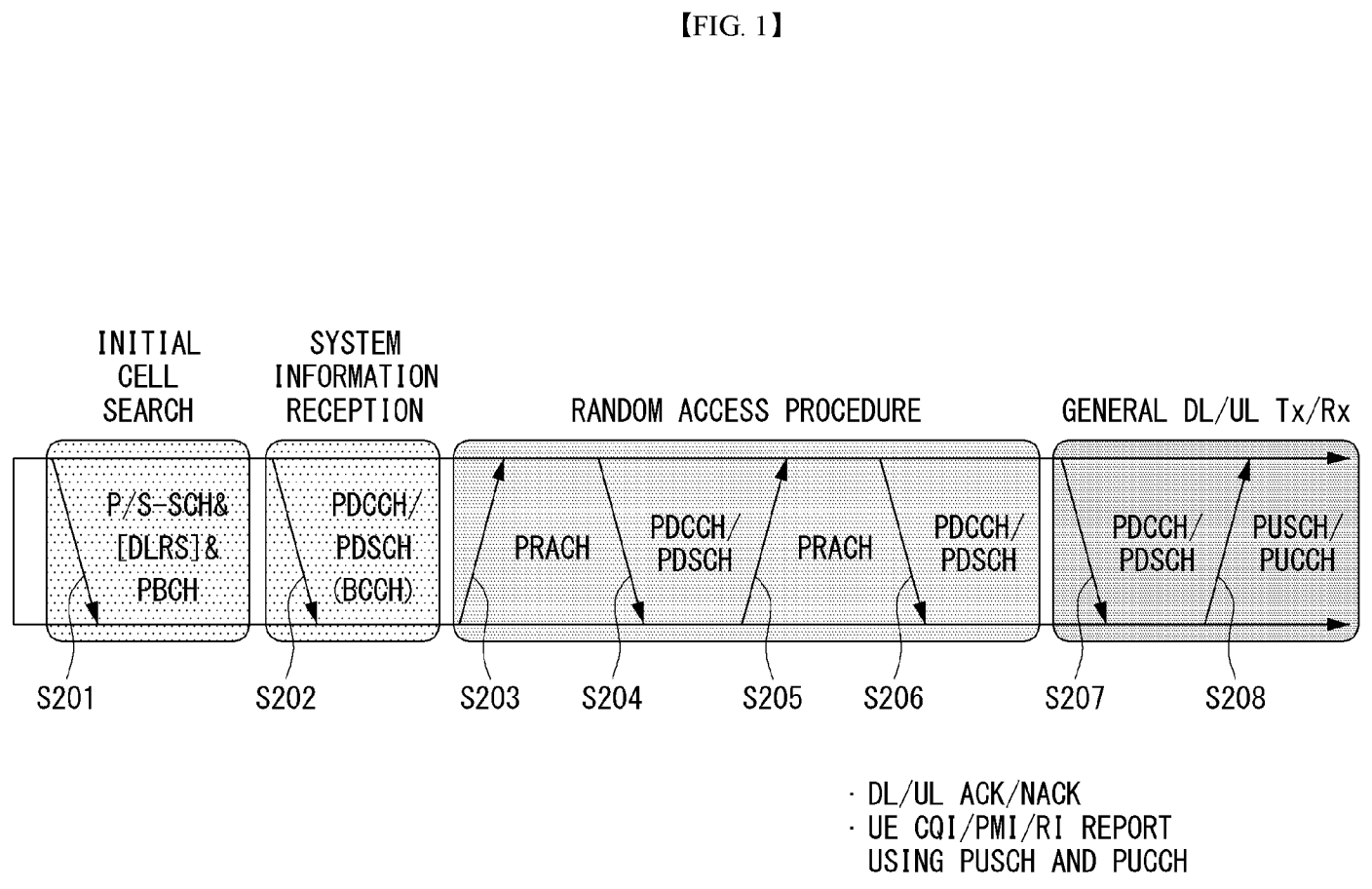

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification Physical Channel and Frame Structure Physical Channel and General Signal Transmission FIG. 1 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S12).

Meanwhile, when there is no radio resource first accessing the eNB or for signal transmission, the UE may perform a Random Access Procedure (RACH) to the eNB (S13 to S16). To this end, the UE may transmit a specific sequence to a preamble through a Physical Random Access Channel (PRACH) (S13 and S15) and receive a response message (Random Access Response (RAR) message) for the preamble through the PDCCH and a corresponding PDSCH. In the case of a contention based RACH, a Contention Resolution Procedure may be additionally performed (S16).

The UE that performs the above procedure may then perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

Structure of Uplink and Downlink Channels

Downlink Channel Structure

A base station transmits a related signal to a UE via a downlink channel to be described later, and the UE receives the related signal from the base station via the downlink channel to be described later.

(1) Physical Downlink Shared Channel (PDSCH)

A PDSCH carries downlink data (e.g., DL-shared channel transport block, DL-SCH TB) and is applied with a modulation method such as quadrature phase shift keying (QPSK), 16 quadrature amplitude modulation (QAM), 64 QAM, and 256 QAM. A codeword is generated by encoding TB. The PDSCH may carry multiple codewords. Scrambling and modulation mapping are performed for each codeword, and modulation symbols generated from each codeword are mapped to one or more layers (layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

A PDCCH carries downlink control information (DCI) and is applied with a QPSK modulation method, etc. One PDCCH consists of 1, 2, 4, 8, or 16 control channel elements (CCEs) based on an aggregation level (AL). One CCE consists of 6 resource element groups (REGs). One REG is defined by one OFDM symbol and one (P)RB.

The UE performs decoding (aka, blind decoding) on a set of PDCCH candidates to acquire DCI transmitted via the PDCCH. The set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

Uplink Channel Structure

A UE transmits a related signal to a base station via an uplink channel to be described later, and the base station receives the related signal from the UE via the uplink channel to be described later.

(1) Physical Uplink Shared Channel (PUSCH)

A PUSCH carries uplink data (e.g., UL-shared channel transport block, UL-SCH TB) and/or uplink control information (UCI) and is transmitted based on a CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, or the like. When the PUSCH is transmitted based on the DFT-s-OFDM waveform, the UE transmits the PUSCH by applying a transform precoding. For example, if the transform precoding is not possible (e.g., transform precoding is disabled), the UE may transmit the PUSCH based on the CP-OFDM waveform, and if the transform precoding is possible (e.g., transform precoding is enabled), the UE may transmit the PUSCH based on the CP-OFDM waveform or the DFT-s-OFDM waveform. The PUSCH transmission may be dynamically scheduled by an UL grant within DCI, or may be semi-statically scheduled based on high layer (e.g., RRC) signaling (and/or layer 1 (L1) signaling (e.g., PDCCH)) (configured grant). The PUSCH transmission may be performed based on a codebook or a non-codebook.

(2) Physical Uplink Control Channel (PUCCH)

A PUCCH carries uplink control information, HARQ-ACK, and/or scheduling request (SR), and may be divided into multiple PUCCHs based on a PUCCH transmission length.

6G System General

A 6G (wireless communication) system has purposes such as (i) a very high data rate per device, (ii) a very large number of connected devices, (iii) global connectivity, (iv) a very low latency, (v) a reduction in energy consumption of battery-free IoT devices, (vi) ultra-reliable connectivity, and (vii) connected intelligence with machine learning capability. The vision of the 6G system may include four aspects such as intelligent connectivity, deep connectivity, holographic connectivity, and ubiquitous connectivity, and the 6G system may satisfy the requirements shown in Table 1 below. That is, Table 1 shows an example of the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

The 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion, and enhanced data security.

FIG. 2 illustrates an example of a communication structure providable in a 6G system.

The 6G system is expected to have 50 times greater simultaneous wireless communication connectivity than a 5G wireless communication system. URLLC, which is the key feature of 5G, will become more important technology by providing an end-to-end latency less than 1 ms in 6G communication. The 6G system may have much better volumetric spectrum efficiency unlike frequently used domain spectrum efficiency. The 6G system can provide advanced battery technology for energy harvesting and very long battery life, and thus mobile devices may not need to be separately charged in the 6G system. In 6G, new network characteristics may be as follows.

Satellites integrated network: To provide a global mobile group, 6G will be integrated with satellite. Integration of terrestrial, satellite and public networks into one wireless communication system is critical for 6G.

Connected intelligence: Unlike the wireless communication systems of previous generations, 6G is innovative and may update wireless evolution from "connected things" to "connected intelligence". AI may be applied in each step (or each signal processing procedure to be described later) of a communication procedure.

Seamless integration of wireless information and energy transfer: A 6G wireless network may transfer power to charge batteries of devices such as smartphones and sensors. Therefore, wireless information and energy transfer (WIET) will be integrated.

Ubiquitous super 3D connectivity: Access to networks and core network functions of drone and very low earth orbit satellite will establish super 3D connectivity in 6G ubiquitous.

In the new network characteristics of 6G described above, several general requirements may be as follows.

Small cell networks: The idea of a small cell network has been introduced to improve received signal quality as a result of throughput, energy efficiency, and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network consisting of heterogeneous networks improves overall QoS and reduces costs.

High-capacity backhaul: Backhaul connectivity is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability. Further, billions of devices can be shared on a shared physical infrastructure.

Core Implementation Technology of 6G System

Artificial Intelligence (AI)

Technology which is most important in the 6G system and will be newly introduced is AI. AI was not involved in the 4G system. The 5G system will support partial or very limited AI. However, the 6G system will support AI for full automation. Advance in machine learning will create a more intelligent network for real-time communication in 6G. When AI is introduced to communication, real-time data transmission can be simplified and improved. AI may determine a method of performing complicated target tasks using countless analysis. That is, AI can increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, and in particular, deep learning has been focused on the wireless resource management and allocation field. However, such studies have been gradually developed to the MAC layer and the physical layer, and in particular, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. The machine learning may also be used for antenna selection, power control, symbol detection, etc. in the MIMO system.

However, application of a deep neutral network (DNN) for transmission in the physical layer may have the following problems.

A deep learning based AI algorithm requires a lot of training data in order to optimize training parameters. However, due to limitations in acquiring data in a specific channel environment as the training data, a lot of training data is used offline. Static training for the training data in the specific channel environment may cause a contradiction between the diversity and dynamic characteristics of a radio channel.

Currently, the deep learning mainly targets real signals. However, signals of the physical layer of wireless communication are complex signals. For matching of the characteristics of a wireless communication signal, studies on a neural network for detecting a complex domain signal are further required.

Hereinafter, machine learning is described in more detail.

Machine learning refers to a series of operations to train a machine in order to create a machine capable of doing tasks that people cannot do or are difficult for people to do. Machine learning requires data and learning models. In the machine learning, a data learning method may be roughly divided into three methods, that is, supervised learning, unsupervised learning and reinforcement learning.

Neural network learning is to minimize an output error. The neural network learning refers to a process of repeatedly inputting training data to a neural network, calculating an error of an output and a target of the neural network for the training data, backpropagating the error of the neural network from an output layer to an input layer of the neural network for the purpose of reducing the error, and updating a weight of each node of the neural network.

The supervised learning may use training data labeled with a correct answer, and the unsupervised learning may use training data which is not labeled with a correct answer. That is, for example, in supervised learning for data classification, training data may be data in which each training data is labeled with a category. The labeled training data may be input to the neural network, and the error may be calculated by comparing the output (category) of the neural network with the label of the training data. The calculated error is backpropagated in the neural network in the reverse direction (i.e., from the output layer to the input layer), and a connection weight of respective nodes of each layer of the neural network may be updated based on the backpropagation. Change in the updated connection weight of each node may be determined depending on a learning rate. The calculation of the neural network for input data and the backpropagation of the error may construct a learning cycle (epoch). The learning rate may be differently applied based on the number of repetitions of the learning cycle of the neural network. For example, in the early stage of learning of the neural network, efficiency can be increased by allowing the neural network to rapidly ensure a certain level of performance using a high learning rate, and in the late of learning, accuracy can be increased using a low learning rate.

The learning method may vary depending on the feature of data. For example, in order for a reception end to accurately predict data transmitted from a transmission end on a communication system, it is preferable that learning is performed using the supervised learning rather than the unsupervised learning or the reinforcement learning.

The learning model corresponds to the human brain and may be regarded as the most basic linear model. However, a paradigm of machine learning using, as the learning model, a neural network structure with high complexity, such as artificial neural networks, is referred to as deep learning.

Neural network cores used as the learning method may roughly include a deep neural network (DNN) method, a convolutional deep neural network (CNN) method, and a recurrent Boltzmann machine (RNN) method.

The artificial neural network is an example of connecting several perceptrons.

FIG. 3 illustrates an example of a structure of a perceptron.

Referring to FIG. 3, when an input vector x=(x1, x2, . . . , xd) is input, each component is multiplied by a weight (W1, W2, . . . , Wd), and all the results are summed. After that, the entire process of applying an activation function σ(•) is called a perceptron. The huge artificial neural network structure may extend the simplified perceptron structure illustrated in FIG. 3 to apply the input vector to different multidimensional perceptrons. For convenience of explanation, an input value or an output value is referred to as a node.

The perceptron structure illustrated in FIG. 3 may be described as consisting of a total of three layers based on the input value and the output value. FIG. 4 illustrates an artificial neural network in which the number of (d+1) dimensional perceptrons between a first layer and a second layer is H, and the number of (H+1) dimensional perceptrons between the second layer and a third layer is K, by way of example. FIG. 4 illustrates an example of a structure of a multilayer perceptron.

A layer where the input vector is located is called an input layer, a layer where a final output value is located is called an output layer, and all layers located between the input layer and the output layer are called a hidden layer. FIG. 4 illustrates three layers, by way of example. However, since the number of layers of the artificial neural network is counted excluding the input layer, it can be seen as a total of two layers. The artificial neural network is constructed by connecting the perceptrons of a basic block in two dimensions.

The above-described input layer, hidden layer, and output layer can be jointly applied in various artificial neural network structures, such as CNN and RNN to be described later, as well as the multilayer perceptron. The greater the number of hidden layers, the deeper the artificial neural network is, and a machine learning paradigm that uses the sufficiently deep artificial neural network as a learning model is called deep learning. In addition, the artificial neural network used for deep learning is called a deep neural network (DNN).

The deep neural network illustrated in FIG. 5 is a multilayer perceptron consisting of eight hidden layers+eight output layers. The multilayer perceptron structure is expressed as a fully connected neural network. In the fully connected neural network, a connection relationship does not exist between nodes located at the same layer, and a connection relationship exists only between nodes located at adjacent layers. The DNN has a fully connected neural network structure and is composed of a combination of multiple hidden layers and activation functions, so it can be usefully applied to understand correlation characteristics between input and output. The correlation characteristic may mean a joint probability of input and output.

Based on how the plurality of perceptrons are connected to each other, various artificial neural network structures different from the above-described DNN can be formed.

In the DNN, nodes located inside one layer are arranged in a one-dimensional longitudinal direction. However, in FIG. 6, it may be assumed that w nodes horizontally and h nodes vertically are arranged in two dimensions (convolutional neural network structure of FIG. 6). In this case, since in a connection process leading from one input node to the hidden layer, a weight is given for each connection, a total of h×w weights needs to be considered. Since there are h×w nodes in the input layer, a total of h2w2 weights are required between two adjacent layers.

The convolutional neural network of FIG. 6 has a problem in that the number of weights increases exponentially depending on the number of connections. Therefore, instead of considering the connections of all the nodes between adjacent layers, it is assumed that a small-sized filter exists, and a weighted sum and an activation function calculation are performed on an overlap portion of the filters as illustrated in FIG. 7.

One filter has a weight corresponding to the number as much as its size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and an activation function calculation for a corresponding node is stored in z22.

The filter performs the weighted sum and the activation function calculation while moving horizontally and vertically by a predetermined interval when scanning the input layer, and places the output value at a location of a current filter. This calculation method is similar to the convolution operation on images in the field of computer vision. Thus, a deep neural network with this structure is referred to as a convolutional neural network (CNN), and a hidden layer generated as a result of the convolution operation is referred to as a convolutional layer. In addition, a neural network in which a plurality of convolutional layers exists is referred to as a deep convolutional neural network (DCNN).

At the node where a current filter is located at the convolutional layer, the number of weights may be reduced by calculating a weighted sum including only nodes located in an area covered by the filter. Hence, one filter can be used to focus on features for a local area. Accordingly, the CNN can be effectively applied to image data processing in which a physical distance on the 2D area is an important criterion. In the CNN, a plurality of filters may be applied immediately before the convolution layer, and a plurality of output results may be generated through a convolution operation of each filter.

There may be data whose sequence characteristics are important depending on data attributes. A structure, in which a method of inputting one element on the data sequence at each time step considering a length variability and a relationship of the sequence data and inputting an output vector (hidden vector) of a hidden layer output at a specific time step together with a next element on the data sequence is applied to the artificial neural network, is referred to as a recurrent neural network structure.

FIG. 8 illustrates an example of a neural network structure in which a circular loop exists.

Referring to FIG. 8, a recurrent neural network (RNN) is a structure in which in a process of inputting elements (x1(t), x2(t), . . . , xd(t)) of any line of sight 't' on a data sequence to a fully connected neural network, hidden vectors (z1(t−1), z2(t−1), . . . , zH(t−1)) are input together at an immediately previous time step (t−1) to apply a weighted sum and an activation function. A reason for transferring the hidden vectors at a next time step is that information within the input vector in previous time steps is considered to be accumulated on the hidden vectors of a current time step.

FIG. 9 illustrates an example of an operation structure of a recurrent neural network.

Referring to FIG. 9, the recurrent neural network operates in a predetermined order of time with respect to an input data sequence.

Hidden vectors (z1(1), z2(1), . . . , zH(1)) when input vectors (x1(t), x2(t), . . . , xd(t)) at a time step 1 are input to the recurrent neural network, are input together with input vectors (x1(2), x2(2), . . . , xd(2)) at a time step 2 to determine vectors (z1(2), z2(2), . . . , zH(2)) of a hidden layer through a weighted sum and an activation function. This process is repeatedly performed at time steps 2, 3, . . . , T.

When a plurality of hidden layers are disposed in the recurrent neural network, this is referred to as a deep recurrent neural network (DRNN). The recurrent neural network is designed to be usefully applied to sequence data (e.g., natural language processing).

A neural network core used as a learning method includes various deep learning methods such as a restricted Boltzmann machine (RBM), a deep belief network (DBN), and a deep Q-network, in addition to the DNN, the CNN, and the RNN, and may be applied to fields such as computer vision, speech recognition, natural language processing, and voice/signal processing.

Recently, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver, rather than a traditional communication framework in the fundamental signal processing and communication mechanism. For example, deep learning-based channel coding and decoding, deep learning-based signal estimation and detection, deep learning-based MIMO mechanism, AI-based resource scheduling and allocation, and the like, nay be included.

Terahertz (THz) Communication

A data transfer rate can be increased by increasing the bandwidth. This can be performed by using sub-TH communication as a wide bandwidth and applying advanced massive MIMO technology. THz waves, which are known as sub-millimeter radiation, generally indicate a frequency band between 0.1 THz and 10 THz with the corresponding wavelengths in the range of 0.03 mm-3 mm. A band range of 100 GHz to 300 GHz (sub THz band) is regarded as a main part of the THz band for cellular communication. When the sub-THz band is added to the mmWave band, the 6G cellular communication capacity increases. 300 GHz-3 THz among the defined THz band is in a far infrared (IR) frequency band. Although the 300 GHz-3 THz band is part of the optical band, it is at the border of the optical band and is immediately after the RF band. Therefore, this 300 GHz-3 THz band shows similarity with RF. FIG. 10 illustrates an example of an electromagnetic spectrum.

The main characteristics of THz communication include (i) a bandwidth widely available to support a very high data transfer rate and (ii) a high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Through this, an advanced adaptive arrangement technology capable of overcoming a range limitation can be used.

Optical Wireless Technology

Optical wireless communication (OWC) technologies are envisioned for 6G communication in addition to RF based communications for all possible device-to-access networks. These networks access network-to-backhaul/fronthaul network connectivity. The OWC technologies have already been used since 4G communication systems, but will be used more widely to meet the demands of the 6G communication system. The OWC technologies, such as light fidelity, visible light communication, optical camera communication, and FSO communication based on the optical band, are already well-known technologies. Communications based on wireless optical technologies can provide very high data rates, low latencies, and secure communications. LiDAR, which is also based on the optical band, is a promising technology for very high-resolution 3D mapping in 6G communications.

FSO Backhaul Network

Characteristics of a transmitter and a receiver of the FSO system are similar to characteristics of an optical fiber network. Therefore, data transmission of the FSO system similar to that of the optical fiber system. Accordingly, FSO can be a good technology for providing backhaul connectivity in the 6G system along with the optical fiber network. If FSO is used, very long-distance communication is possible even at a distance of 10,000 km or more. FSO supports massive backhaul connectivity for remote and non-remote areas such as sea, space, underwater, and isolated islands. FSO also supports cellular BS connectivity.

Massive MIMO Technology

One of core technologies for improving spectral efficiency is to apply MIMO technology. When the MIMO technology is improved, the spectral efficiency is also improved. Therefore, massive MIMO technology will be important in the 6G system. Since the MIMO technology uses multiple paths, multiplexing technology and beam generation and management technology suitable for the THz band should be significantly considered so that data signals can be transmitted through one or more paths.

Block Chain

A block chain will be an important technology for managing large amounts of data in future communication systems. The block chain is a form of distributed ledger technology, and the distributed ledger is a database distributed across numerous nodes or computing devices. Each node duplicates and stores the same copy of the ledger. The block chain is managed by a P2P network. This may exist without being managed by a centralized institution or server. Block chain data is collected together and is organized into blocks. The blocks are connected to each other and protected using encryption. The block chain completely complements large-scale IoT through improved interoperability, security, privacy, stability, and scalability. Accordingly, the block chain technology provides several functions such as interoperability between devices, high-capacity data traceability, autonomous interaction of different IoT systems, and large-scale connection stability of 6G communication systems.

3D Networking

The 6G system integrates the ground and air networks to support communications for users in the vertical extension. The 3D BSs will be provided by low-orbit satellites and UAVs. The addition of new dimensions in terms of height and the associated degrees of freedom makes 3D connectivity significantly different from traditional 2D networks.

Quantum Communication

Unsupervised reinforcement learning in networks is promising in the context of 6G networks. Supervised learning approaches will not be practical for labeling large amounts of data generated in 6G. Unsupervised learning does not require labeling. Therefore, this technique can be used to create the representations of complex networks autonomously. By combining reinforcement learning and unsupervised learning, it is possible to operate the network truly autonomously.

Unmanned Aerial Vehicle

An unmanned aerial vehicle (UAV) or drone will be an important factor in 6G wireless communication. In most cases, a high-speed data wireless connection is provided using UAV technology. A BS entity is installed in the UAV to provide cellular connectivity. The UAVs have specific features, which are not found in fixed BS infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC, and mMTC. The UAV can also support a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and different communication technologies is very important in 6G systems. As a result, the user can move seamlessly from one network to another network without the need for making any manual configurations in the device. The best network is automatically selected from the available communication technology. This will break the limits of the concept of cells in wireless communications. Currently, the user's movement from one cell to another cell causes too many handovers in dense networks, and also causes handover failures, handover delays, data losses, and the ping-pong effect. The 6G cell-free communications will overcome all these and provide better QoS. Cell-free communication will be achieved through multi-connectivity and multi-tier hybrid techniques and by different and heterogeneous radios in the devices.

Integration of Wireless Information and Energy Transfer (WIET)

US 12,676,700 B2

17
18

WIET uses the same field and wave as a wireless communication system. In particular, a sensor and a smartphone will be charged using wireless power transfer during communication. WIET is a promising technology for extending the life of battery charging wireless systems. Therefore, devices without battery will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connectivity such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface(LIS)

In the THz band signal, since the straightness is strong, there may be many shaded areas due to obstacles. By installing the LIS near these shaded areas, LIS technology, that expands a communication area, enhances communication stability, and enables additional optional services, becomes important. The LIS is an artificial surface made of electromagnetic materials, and can change propagation of incoming and outgoing radio waves. The LIS can be viewed as an extension of massive MIMO, but is different from the massive MIMO in an array structure and an operating mechanism. Further, the LIS has an advantage such as low power consumption, because this operates as a reconfigurable reflector with passive elements, that is, signals are only passively reflected without using active RF chains. In addition, since each of the passive reflectors of the LIS has to independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communication General

THz wireless communication uses wireless communication using a THz wave having a frequency of approximately 0.1 to 10 THz (1 THz=1012 Hz) and may refer to THz band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays, has a shorter wavelength than the RF/millimeter wave to have high straightness, and is capable of beam convergence. In addition, the photon energy of the THz wave is only a few meV and thus is harmless to the human body. A frequency band which is expected to be used for THz wireless communication may be D-band (110 GHz to 170 GHz) or H-band (220 GHz to 325 GHz) band with a low propagation loss due to molecular absorption in air. Standardization discussion on THz wireless communication is being discussed mainly in IEEE 802.15 THz working group in addition to 3GPP, and standard documents issued by a task group of IEEE 802.15 (e.g., TG3d, TG3e) can specify and supplement the description of the present disclosure. The THz wireless communication may be applied to wireless cognition, sensing, imaging, wireless communication, THz navigation, etc. FIG. 11 illustrates an example of a THz communication application.

As illustrated in FIG. 11, a THz wireless communication scenario may be classified into a macro network, a micro network, and a nanoscale network. In the macro network, THz wireless communication may be applied to vehicle-to-vehicle connectivity and backhaul/fronthaul connectivity. In the micro network, THz wireless communication may be applied to near-field communication such as indoor small cells, fixed point-to-point or multi-point connection such as wireless connection in a data center, and kiosk downloading.

Table 2 below shows an example of technology which can be used in the THz wave.

TABLE 2

| Transceivers Device | Available immature: UTC-PD, RTD and SBD |
|---|---|
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The method of generating THz can be classified as an optical device or an electronic device-based technology. FIG. 12 illustrates an example of an electronic device-based THz wireless communication transceiver. The method of generating THz using an electronic device includes a method using a semiconductor device such as a resonant tunneling diode (RTD), a method using a local oscillator and a multiplier, a monolithic microwave integrated circuit (MMIC) method using a compound semiconductor high electron mobility transistor (HEMT) based integrated circuit, a method using a Si-CMOS based integrated circuit, and the like. In FIG. 12, a multiplier (e.g., doubler, tripler) is applied to increase the frequency, and radiation is performed by an antenna via a subharmonic mixer. Since the THz band forms a high frequency, the multiplier is essential. Here, the multiplier is a circuit that allows the frequency to have an output frequency which is N times an input frequency, and the multiplier matches a desired harmonic frequency and filters out all the remaining frequencies. In addition, beamforming may be implemented by applying an array antenna or the like to the antenna of FIG. 12. In FIG. 12, IF denotes an intermediate frequency, a tripler and a multiplier denote a multiplier, PA denotes a power amplifier, LNA denotes a low noise amplifier, and PLL denotes a phase-locked loop.

Figure 14:
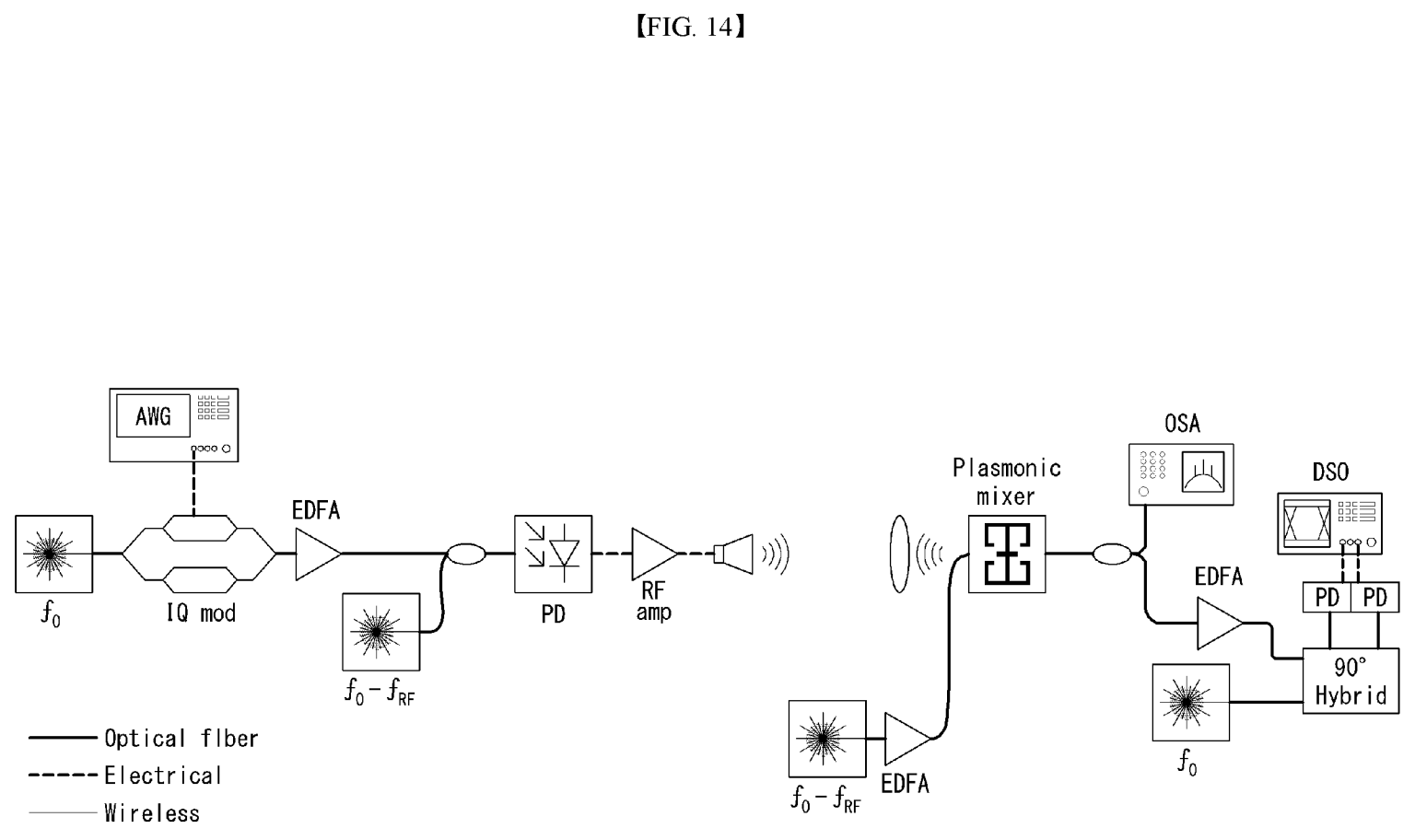

FIG. 13 illustrates an example of a method of generating an optical device-based THz signal. FIG. 14 illustrates an example of an optical device-based THz wireless communication transceiver.

The optical device-based THz wireless communication technology refers to a method of generating and modulating a THz signal using an optical device. The optical device-based THz signal generation technology refers to a technology that generates an ultrahigh-speed optical signal using a laser and an optical modulator and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the optical device-based THz signal, as illustrated in FIG. 13, a laser diode, a broadband optical modulator, and an ultrahigh-speed photodetector are required. In FIG. 13, light signals of two lasers having different wavelengths are combined to generate a THz signal corresponding to difference in a wavelength between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) denotes an optical fiber amplifier to which erbium is added, a photo detector (PD) denotes a semiconductor device capable of converting an optical signal into an electrical signal, and OSA denotes an optical sub assembly in which various optical communication functions (e.g., photoelectric conversion, electrophotic conversion, etc.) are modularized as one component, and DSO denotes a digital storage oscilloscope.

A structure of a photoelectric converter is described with reference to FIGS. 15 and 16. FIG. 15 illustrates a structure of a photoinc source-based transmitter. FIG. 16 illustrates a structure of an optical modulator.

Generally, an optical source of a laser may change a phase of a signal by passing through an optical wave guide. In this instance, data is carried by changing electrical characteristics through a microwave contact, or the like. Thus, an optical modulator output is formed in the form of a modulated waveform. A photoelectric modulator (O/E converter) may generate THz pulses based on an optical rectification operation by a nonlinear crystal, a photoelectric conversion (O/E conversion) by a photoconductive antenna, and emission from a bunch of relativistic electrons. The THz pulse generated in the above manner may have a length of a unit from femto second to pico second. The photoelectric converter (O/E converter) performs down-conversion using non-linearity of the device.

Considering THz spectrum usage, multiple contiguous GHz bands are likely to be used as fixed or mobile service usage for the terahertz system. According to outdoor scenario criteria, an available bandwidth may be classified based on oxygen attenuation 10^2 dB/km in the spectrum of up to 1 THz. Hence, a framework in which the available bandwidth consists of several band chunks may be considered. As an example of the framework, if the length of the THz pulse for one carrier is set to 50 ps, the bandwidth (BW) is about 20 GHz.

The effective down-conversion from the infrared (IR) band to the THz band depends on how to utilize the nonlinearity of the photoelectric converter (O/E converter). That is, for down-conversion into a desired THz band, design of the photoelectric converter (O/E converter) having the most ideal non-linearity to move to the corresponding THz band is required. If a photoelectric converter (O/E converter) which is not suitable for a target frequency band is used, there is a high possibility that an error occurs with respect to an amplitude and a phase of the corresponding pulse.

In a single carrier system, a THz transmission/reception system may be implemented using one photoelectric converter. In a multi-carrier system, as many photoelectric converters as the number of carriers may be required, which may vary depending on the channel environment. Particularly, in a multi-carrier system using multiple broadbands according to the plan related to the above-described spectrum usage, the phenomenon will be prominent. In this regard, a frame structure for the multi-carrier system may be considered. A down-frequency-converted signal based on the photoelectric converter may be transmitted in a specific resource area (e.g., a specific frame). The frequency domain of the specific resource area may include a plurality of chunks. Each chunk may consist of at least one component carrier (CC).

With the recent development of deep learning technology, many areas are replaced by artificial intelligence (AI) and/or machine learning (ML). In particular, AI and/or ML are very effective when they are applied to work that requires repetitive and continuous work.

5G has introduced a new channel coding technology called a low density parity check (LDPC) code and a polar code (or non-machine learning based code). The corresponding code shows performance that exceeds the existing turbo code or a tail-biting convolutional code (TBCC). However, when these codes are developed and reflected in standards, they have been designed to be optimized for additive white Gaussian noise (AWGN) channels.

Unlike this, in communication, there are the following disadvantages when using a code that is not optimized for the channel. If a code that is not optimized for the base station and the UE is used, an error may occur during transmission, and retransmission (e.g., HARQ, automatic repeat request (ARQ)) is required to correct the error. If hybrid automatic repeat request (HARQ) is used, the base station shall store data to be retransmitted, and the UE shall store previously transmitted data in order to combine the previously transmitted data with the retransmitted data. To this end, a large amount of memory may be necessary. If robust modulation coding scheme (MCS) is used in order not to use the HARQ, a waste of resources may occur. Further, retransmission of erroneous data reduces throughput of data and wastes resources for retransmission. In particular, if the HARQ is used for Tera bps (bits per seconds) transmission, a waste of memory and resources used for retransmission may relatively greatly increase.

Designing the code from scratch requires a lot of computing power. In addition, this is subject to many restrictions in on-line design in real-time communication.

A method may be proposed to search an AWGN optimized code (e.g., LDPC code, polar code) from off-line using the adaptability of AI and generate an optimal code in a short time based on this in on-line. In this instance, codes generated in on-line can achieve code synchronization through a synchronization procedure between the base station and the UE. Further, if a more optimized code is used for a channel between the base station and the UE before communication between the base station and the UE, errors occurring during communication can be reduced.

This is necessary to reduce resources and improve communication quality in communication for ultra high throughput required in beyond 5G/6G in the future.

Accordingly, the present disclosure proposes a method of generating an optimal code for applying to a non-AWGN channel (or actual channel) as a code optimized for an AWGN channel based on AL/ML and channel information. Through this, the present disclosure can increase code performance and also improve throughput of the system and efficiency of resources.

For example, AI/ML operation for code update may be performed by a base station (BS) (e.g., gNB), and may also be performed by a user equipment (UE).

For example, the UE may estimate a channel using a reference symbol (RS) (or reference signal) transmitted by the base station, and the base station or the UE may generate a code optimized for channels of the base station and the UE using this. Information on the generated code may be synchronized with the base station and the UE, and then the base station and the UE may perform data communication.

For example, channel information transmitted by the UE (and/or the base station) may be provided in the form of information required for training of the base station (and/or the UE). For example, the channel information may be a signal-to-noise ratio (SNR), channel power, max channel delay, and/or a channel profile, etc. The channel information may also be provided after being processed and/or compressed. And/or, the base station and/or the UE may update a code, that is optimized for channel using the channel information and the AWGN optimized code, based on AI and/or ML. And/or, the base station (and/or the UE) may inform the UE (and/or the base station) of the updated code and perform code synchronization. After the code synchronization, the base station and the UE may perform communication based on a new code.

Hereinafter, the proposed method is described in detail by being divided into (i) a capability, (ii) a method of synchronizing an optimal code, (iii) a method of searching or generating an optimal code based on AI and/or ML, and (iv) a method of generating an offspring code.

Embodiments of the present disclosure to be described below are merely distinguished for convenience of explanation. Thus, it is obvious that a partial method and/or partial configuration of any embodiment can be substituted or combined with a method and/or configuration of another embodiment.

In the present disclosure, 'A/B' may be interpreted as 'A and B', 'A or B', and/or 'A and/or B'.

Capability

A UE and a base station may have to synchronize (i) a decoder capability (C) and/or (ii) a learning capability (L) before code synchronization. In the present disclosure, information including the decoder capability and the learning capability may be referred to as capability information.

For the decoder capability and/or the learning capability, a delivery subject may be determined depending on whether it is uplink (UL) or downlink (DL).

For example, in the downlink, the UE may have to deliver the decoder capability and/or the learning capability to the base station, and in the uplink, the base station may have to deliver the decoder capability and/or the learning capability to the UE. And/or, the decoder capability and/or the learning capability may be delivered by a request. For example, in the downlink, if there is downlink data to be transmitted, the base station may request the capability from the UE. In the uplink, if there is uplink data to be transmitted, the UE may request the capability from the base station.

For example, the decoder capability may represent a decoder level, or may be information indicating whether to use the existing AWGN optimized code or an optimal code based on machine learning.

The decoder capability of the UE may be roughly divided into three levels.

(1) Level-1 UE ($C_{UE}$=0)

$C_{UE}$=0 may represent when a receiver structure of the UE is hard-wired. For example, if the base station determines a final C value to be zero, the existing AWGN optimized code (e.g., LDPC code, polar code) may be used as it is.

(2) Level-2 UE ($C_{UE}$=1)

$C_{UE}$=1 may represent when the receiver structure of the UE is partially flexible. For example, even if the UE transmits $C_{UE}$=1 to the base station, the base station may determine the final C value to be zero based on a pre-configured appointment. In this case, the UE and the base station may use the AWGN optimized code as it is.

For example, if the base station determines the final C value to be 1, the UE may maintain a base matrix of the LDPC code, and change a circulant permutation matrix (CPM) to generate an offspring code. In other words, the offspring code may be generated based on variant 1 to be described later.

(3) Level-3 UE ($C_{UE}$=2)

$C_{UE}$=2 may represent when the receiver structure of the UE is fully flexible. And/or, if it is the same as a software defined radio (SDR), a new code of the LDPC code is applicable to a decoder. For example, if the base station determines the final C value to be 2, the UE may change both the base matrix of the LDPC code and the CPM to generate an offspring code. In other words, the offspring code may be generated based on variant 2 and/or crossover, etc. to be described later.

The learning capability of the UE may be a value that indicates whether a code search is available or not. For example, the learning capability having a value of zero may represent that the UE cannot perform the machine learning or the code search, and the learning capability having a value of 1 may represent that the UE can perform the machine learning or the code search. For example, if the learning capability has the value of 1 and a final decoder capability is determined to be 1 or 2, the UE may generate an optimal code based on the machine learning or channel information.

And/or, the code and/or the learning capability of the UE and the base station may be determined in an initial connection step.

For example, the decoder capability and the learning capability of the UE may be information that the UE transmits to the base station in the downlink transmission.

A decoder capability of the base station ($C_{BS}$) may have to consider more variables than the UE. Unlike the UE, this is because the base station has large computing power but needs to process many UEs at the same time. Thus, the base station cannot unconditionally support the capability desired by the UE even though the computing power is large. The base station may also have to consider the computing power and the number of UEs to be currently serviced by the base station. For example, if all the UEs to be serviced support C=2, the computing power may be insufficient.

The base station may determine 'C' that the base station can support for each UE and may synchronize it with the UE. In other words, the base station may independently synchronize the capability for each UE.

A code capability (or capability) of the base station may be roughly divided into three levels in the same manner as the UE.

(1) Level-1 BS ($C_{BS}$=0)

$C_{BS}$=0 may represent when a receiver structure of the base station is hard-wired. For example, if a final C value is determined to be zero, the base station and the UE may use the existing AWGN optimized code as it is.

(2) Level-2 BS ($C_{BS}$=1)

$C_{BS}$=1 may represent when the receiver structure of the base station is partially flexible. For example, if the final C value is determined to be 1, the base station may maintain a base matrix of the LDPC code and update only a shifting-value (or CPM) to generate an offspring code. And/or, all the CPM or the changed CPM only may be synchronized.

(3) Level-3 BS ($C_{BS}$=2)

$C_{BS}$=2 may represent when the receiver structure of the base station is fully flexible. For example, if the final C value is determined to be 2, the base station may update or change a base matrix of the LDPC code and all the CPM to generate an offspring code.

For example, the decoder capability and the learning capability of the base station may be information that the base station transmits to the UE in the uplink transmission.

The learning capability (L) of the UE and/or the base station may be roughly divided into two parts. For example, L=0 may indicate or represent that learning cannot be performed, and L=1 may indicate or represent that learning can be performed.

Next, a method of synchronizing an optimal code is described in detail.

Method of Synchronizing an Optimal Code

A method of synchronizing an optimal code between a UE and a base station may be roughly divided into (i) when generating an optimal code for downlink and/or (ii) when generating an optimal code for uplink.

When generating the optimal code for downlink may be divided into when the base station generates the optimal code and when the UE generates the optimal code. When generating the optimal code for uplink may be divided into when the UE generates the optimal code and when the base station generates the optimal code.

When a Base Station Generates an Optimal Code for Downlink

FIG. 17 is a flow chart illustrating a method for a base station to generate an optimal code in a downlink transmission.

A method illustrated in FIG. 17 to be described below describes an example where a UE transmits $L_{UE}$=0 and $C_{UE}$=1 or 2 and a base station generates an optimal code based on channel information and/or machine learning. For example, when the UE transmits $C_{UE}$=0, the base station and/or the UE may transmit and receive data using the existing LDPC code or polar code, etc. without generating an optimal code based on channel information and/or machine learning.

Referring to FIG. 17, the UE may transmit a capability ($L_{UE}$ and/or $C_{UE}$) to the base station, in step S1701. For example, because the UE generates a code, the UE may transmit $L_{UE}$=0. Alternatively, because the UE cannot perform the machine learning, the UE may transmit $L_{UE}$=0.

And/or, the base station may determine C (or decoding level information) based on the capability ($L_{UE}$ and/or $C_{UE}$)

transmitted by the UE, in step S1702, where C may be $C \leq C_{UE}$. And/or, C may be $C_{UE}$ determined based on a pre-configured method within a range of $C \leq C_{UE}$. For example, even if the UE transmits $C_{UE}$=1, the base station may determine a final C value to be zero based on a pre-configured method.

And/or, the determined C may be transmitted to the UE. The UE may know whether a final code is updated or not based on this information.

And/or, the UE may acquire channel information (e.g., channel state information (CSI)) using a reference signal (RS) (e.g., CSI-RS) and transmit the channel information to the base station, in step S1703. The base station may generate an optimal code based on the channel information and/or the machine learning.

And/or, the base station may transmit information on the optimal code (or new code information) for code synchronization with the UE, in step S1704. The information on the optimal code may mean the generated optimal code itself or an index of the optimal code. In other words, the UE and the base station may be pre-configured with a set of optimal codes that can be generated, and the base station may transmit only an index of a specific optimal code to the UE to perform the code synchronization.

And/or, the UE may transmit Ack (acknowledgement) or Nack (negative acknowledgement) for the information on the optimal code (or new code information), in step S1705.

And/or, the base station may transmit data to the UE based on the optimal code, and the UE may receive and/or decode the corresponding data based on the optimal code, in step S1706.

When a UE Generates an Optimal Code for Downlink

FIG. 18 is a flow chart illustrating a method for a UE to generate an optimal code in a downlink transmission.

A method illustrated in FIG. 18 to be described below describes an example where a UE transmits $L_{UE}$=1 and $C_{UE}$=1 or 2 and generates an optimal code based on channel information and/or machine learning. For example, when the UE transmits $C_{UE}$=0, the base station and/or the UE may transmit and receive data using the existing LDPC code or polar code, etc. without generating an optimal code based on channel information and/or machine learning.

Referring to FIG. 18, the UE may transmit a capability ($L_{UE}$ and/or $C_{UE}$), in step S1801. The UE may transmit $L_{UE}$=1 and perform a procedure of synchronizing with the base station based on this. And/or, the base station may determine 'C' (or decoding level information) based on the capability ($L_{UE}$ and/or $C_{U}E$) transmitted by the UE, where C may be $C \leq C_{UE}$.

And/or, the base station may transmit the determined C to the UE, in step S1802. And/or, C may be $C_{UE}$ determined based on a pre-configured method within a range of $C \leq C_{UE}$. For example, the UE may perform a code search based on this information.

And/or, the UE may acquire channel information (e.g., CSI) using a RS (e.g., CSI-RS), generate an optimal code based on this, and transmit information on the optimal code, in step S1803. The information on the optimal code may mean the generated optimal code itself or an index of the optimal code. In other words, the UE and the base station may be pre-configured with a set of optimal codes that can be generated, and the UE may transmit only an index of a specific optimal code to the base station to perform code synchronization.

And/or, the base station may transmit Ack and/or transmit data after the code synchronization, in step S1804.

And/or, if the UE transmits the Ack, the UE may inform the base station to transmit data, in step S1805.

And/or, the base station may transmit data using the optimal code, in step S1806. The UE may decode the received data using the optimal code.

When a UE Generates an Optimal Code for Uplink

The code optimization, the signaling, and/or the code synchronization procedure described above can also be applied to uplink.

FIG. 19 is a flow chart illustrating a method for a UE to generate an optimal code in an uplink transmission.

A method illustrated in FIG. 19 to be described below describes an example where a base station transmits $L_{BS}$=0 and $C_{BS}$=1 or 2 and a UE generates an optimal code based on channel information and/or machine learning. For example, when the base station transmits $C_{BS}$=0, the base station and/or the UE may transmit and receive data using the existing LDPC code or polar code, etc. without generating an optimal code based on channel information and/or machine learning.

Referring to FIG. 19, the base station may transmit a capability ($C_{BS}$ and/or $L_{BS}$), in step S1901. In this instance, $L_{BS}$ may be zero ($L_{BS}$=0).

And/or, the UE may determine and/or transmit a final capability C (or decoding level information) based on the capability received from the base station, in step S1902.

And/or, the base station may acquire channel information (e.g., CSI) using an RS (e.g., SRS) and/or transmit the channel information to the UE, in step S1903. The UE may generate the optimal code based on the channel information and the machine learning.

A method for the UE of the step S1903 to obtain channel information may include two methods (method A and method B).

The method A is a method of estimating an uplink channel based on downlink CSI using channel reciprocal characteristics without receiving estimated channel information from the base station. In the method A, the channel information that the base station transmits to the UE may be downlink CSI. And/or, in the method A, because the UE generates the downlink CSI, the base station may omit an operation of transmitting the channel information to the UE.

The method B is a method of receiving a channel measured and estimated by the base station via a control channel (CCH) and/or a shared channel (SCH) to acquire channel information. And/or, the method A can be used only in time division multiplexing (TDM), and the method B can be used in both TDM and frequency division multiplexing (FDM).

And/or, the UE may transmit information on the optimal code (or new code information) for code synchronization with the base station, in step S1904. Information on the optimal code (or new code information) for code synchronization with the UE may be transmitted. The information on the optimal code may mean the generated optimal code itself or an index of the optimal code. In other words, the UE and the base station may be pre-configured with a set of optimal codes that can be generated, and the UE may transmit only an index of a specific optimal code to the base station to perform the code synchronization.

And/or, the base station may transmit Ack or Nack for the information on the optimal code (or new code information), in step S1905.

And/or, the UE may code data based on the optimal code and transmit the corresponding data to the base station, in step S1906. The base station may receive and/or decode the corresponding data based on the optimal code.

When a Base Station Generates an Optimal Code for Uplink

The code optimization, the signaling, and/or the code synchronization procedure described above can also be applied to uplink.

FIG. 20 is a flow chart illustrating a method for a base station to generate an optimal code in an uplink transmission.

A method illustrated in FIG. 20 to be described below describes an example where a base station transmits $L_{BS}$=1 and $C_{BS}$=1 or 2 and generates an optimal code based on channel information and/or machine learning. For example, when the base station transmits $C_{BS}$=0, the base station and/or the UE may transmit and receive data using the existing LDPC code or polar code, etc. without generating an optimal code based on channel information and/or machine learning.

Referring to FIG. 20, the base station may transmit a capability ($C_{BS}$ and/or $L_{BS}$), in step S2001. In this instance, $L_{BS}$ may be 1 ($L_{BS}$=1).

The UE may determine 'C' (or decoding level information) based on the capability ($C_{BS}$ and/or $L_{BS}$) transmitted by the base station and transmit the determined C to the base station, in step S2002. In this instance, C may be $C \leq C_{BS}$. The base station may perform a code search based on the C.

And/or, the base station may acquire channel information using an RS (e.g., SRS) and generate and/or transmit the optimal code based on this, in step S2003.

And/or, the UE may synchronize the codes, and then may transmit Ack and/or transmit data, in step S2004.

And/or, if the base station receives the Ack, the base station may inform the UE to transmit data, in step S2005.

And/or, the UE may code data based on the optimal code and transmit the corresponding data to the base station, in step S2006. The base station may receive and/or decode the corresponding data based on the optimal code.

In the examples of the method illustrated in FIGS. 17 to 20, the optimal code generated by the base station or the UE may be synchronized by the following method (method 1 and method 2).

The method 1 is a method in which the base station and the UE pre-generate and have an optimal code corresponding to a final capability and synchronize code indexes corresponding to channel conditions during an actual operation. In this case, signaling overhead is small, but flexibility of code may be relatively reduced. A method of transmitting code indexes to each other may be performed via RRC, CCH, or SCH.

The method 2 is a method in which the base station and the UE generate an optimal code corresponding to a final capability and synchronize all the codes through communication.

Because there are many values (e.g., base matrix and CPM value) to be transmitted, all the codes may be transmitted via a control channel (CCH) or a shared channel (SCH).

Next, a method of searching or generating an optimal code based on AI and/or ML is described in detail.

Method of Searching or Generating an Optimal Code Based on AI and/or ML

FIG. 21 is a flow chart illustrating a method for a bass station (or UE) to search or generate an optimal code (or new code, machine learning based code) based on AI and/or ML. The following operation (or embodiment) may be performed by the bass station or the UE. In the present disclosure, AI and/or ML may be referred to as machine learning, For example, FIG. 21 may be a procedure of the bass station or the UE to perform code search or code generation in the procedure of FIG. 17 and/or FIG. 20. Alternatively, FIG. 21 may be a procedure of the UE or the bass station to perform code search or code generation in the procedure of FIG. 18 and/or FIG. 20. In FIG. 21, "channel state information" may refer to channel information acquired by the UE or the bass station.

Specifically, referring to FIG. 21, first, the bass station or the UE may generate an initial parent code based on an AWGN optimized code (e.g., LDPC code or polar code), in step S2101. The AWGN optimized code may be a code that the base station and the UE have in advance. For example, operations of steps S2103 to S2107 may be performed using one LDPC code as the initial parent code. Through this, M or more offspring codes may be generated. For example, the step S2101 only works for a first cycle and may not work for cycles after the first cycle.

Hereinafter, steps S2102 to S2108 are described assuming operations after the M or more offspring codes are generated in the first cycle as above.

And/or, the base station or the UE may randomly select M offspring codes among the generated offspring codes, in step S2102. M is a number that can be simultaneously verified and may be controllable based on the computing power of the base station.

Hereinafter, steps S2103 to S2105 may be a step or operation that is processed in parallel for the M codes.

And/or, the base station or the UE may encode the M codes, in step S2103. In other words, the base station or the UE may encode specific data into each of the M codes, in step S2103.

And/or, the base station or the UE may pass the M encoded codes through the channel, in step S2104. In this instance, the channel may be a channel that reflects channel information received from the base station or the UE. In other words, the base station or the UE may apply or reflect channel information (e.g., CSI) to data encoded using the M selected codes, in step S2104. For example, each of the encoded data may have the same effect as if the channel information was reflected and transmitted/received via a channel corresponding to the channel information. The channel information may be information received from the base station or the UE.

And/or, the base station or the UE may be encoded by the selected codes and may decode each of the M data, to which the channel information is reflected, to measure a block error rate (BLER), in step S2105.

And/or, the base station or the UE may update a parent code set based on the measured BLER, in step S2106.

For example, the base station or the UE may generate a parent code set including S+M codes based on a parent code set including the selected M codes (or M results) and existing S codes. And/or, the base station or the UE may arrange the S+M codes in ascending order based on the BLER, and then may select S codes with a low index (a good BLER performance) among the codes to generate a new parent code set.

FIG. 22 is a graph that arranges parent codes in ascending order by BLER.

For example, the S+M codes may be arranged in order of best BLER performance. The UE or the base station may select S codes from among the codes in order of best BLER performance and generate a parent code set including the corresponding codes. For example, the S codes may be indexed in order of best BLER performance. For example, the code with the best BLER performance may be indexed to 1. Here, each of the S codes constituting the parent code set may be referred to as a parent code.

And/or, two codes of the S codes may be selected by Equation 1 below.

And/or, the base station or the UE may select any parent code from among the parent code set and generate offspring codes based on this, in the step S2107. For example, any two parent codes may be selected. For example, the offspring codes may be generated through a parent code with an index of 4 and a parent code with an index of 6 among the parent codes of FIG. 22 in a method of a genetic algorithm illustrated in FIGS. 23 and 24. For example, any parent code (two parent codes) may be selected by a probability value of Equation 1 below.

A method of selecting any parent code may apply an exploitation scheme and/or an exploration scheme.

Equation 1 is an equation representing the probability that an i-th parent code will be selected in the step S2107.

$$\text{Parent code}(i) = \frac{e^{a \cdot i}}{\sum_{i=1}^{M} e^{a \cdot i}} \qquad \text{[Equation 1]}$$

It is possible to adjust the probability of selecting the i-th parent code depending on a value of "a". For example, a (a≤0) may decrease as a cycle of operation described with reference to FIG. 21 increases due to AL/ML.

And/or, when the value of "a" is small (e.g., −3, −2), exploitation may be performed. When the value of "a" is relatively large (e.g., −0.5, −1), the exploration may be performed.

On search iteration, a beginning of the iteration may be performed closely to the exploration, and a second half of the iteration may perform the exploitation. That is, a value of "a" may decrease as the iteration increases.

And/or, after the base station or the UE repeatedly performs an operation of the steps S2102 to S2107 until Imax, the base station or the UE may select a code with the best BLER performance from among the parent code set, in step S2108. That is, the base station or the UE may select a code of Index=1 as the optimal code. The number of iterations may be the number including the first cycle.

M and Imax may be selected and/or preset considering the computing power of the UE and a code search time. And/or, M and Imax may be selected and/or preset based on application. For example, when latency is important as in URLLC, M and Imax may be set to be small, thereby reducing a code optimization time. Alternatively, when it is insensitive to latency and requires high throughput, M and Imax may be set to be large, thereby generating the optimal code and transmitting data without possible errors.

Next, a method of generating an offspring code is described in detail.

A Method of Generating Offspring Code

For a method of generating an offspring code from a parent code, a genetic algorithm of AI may be used.

A method used in the genetic algorithm may include two types of variant and crossing.

For example, the generation (step S2107) of an offspring code described with reference to FIG. 21 may be generated by variant and/or crossing. For example, the variant and/or the crossing may be performed several times in the step S2107.

Variant

A variant in the LDPC code is to randomly change an edge in an H matrix. A method of changing the edge may be roughly divided into two types (variant 1 and variant 2).

FIG. 23 illustrates variants used in a genetic algorithm.

In the variant 1, as illustrated in (a) of FIG. 23, the code optimization or the generation of an offspring code may be performed by maintaining a base matrix and changing only a CPM.

As illustrated in (b) of FIG. 23, the variant 2 may be to change a CPM as well as an edge of a base matrix. For example, in the variant 2, the code optimization or the generation of an offspring code may be performed by changing both the base matrix and the CPM.

(a) of FIG. 23 illustrates an example of the variant 1. In an AWGN optimized code, the variant may be performed by changing a CPM on a column of a variable node affected by CSI with reference to the CSI to a random value. As illustrated in (a) of FIG. 23, values of H(0,0), H(1,3) and H(3,1) may be changed from 6, 7 and 1 to 5, 2 and 3. During the change, only an information part (K part) may be changed, and a parity part (M part) may not be changed.

For example, the variant 1 may be performed when $C_{UE}$ or $C_{BS}$ is 1, and the variant 2 may be performed when $C_{UE}$ or $C_{BS}$ is 2. And/or, the crossing may be performed when $C_{UE}$ or $C_{BS}$ is 2. And/or, a combination of the variant and the crossing may be performed when $C_{UE}$ or $C_{BS}$ is 2.

Crossing (or Mating)

FIG. 24 illustrates a crossing (or mating) used in a genetic algorithm.

As illustrated in FIG. 24, the crossing (or mating) is a method of generating a new code by combining parts of parent codes with each other. In this case, a parity part (M part) may not be changed.

The crossing (or mating) is a method of generating a new code by combining parts of two or more parent codes with each other. In this case, a parity may not be changed. FIG. 24 illustrates an example where a left offspring code and a right offspring code generate new offspring codes by crossing rows-columns of a parent-A code and a parent-B code with each other. For example, the left offspring code may be a code generated by combining a part 2410 of the parent-A code and a part 2430 of the parent-B code. The right offspring code may be a code generated by combining a part 2420 of the parent-A code and a part 2440 of the parent-B code.

Combination of Variant and Crossing (or Mating)

An offspring code may also be generated by a combination of variant and crossing.

A proposed method described in the present disclosure may have the following features.

(1) A base station and a UE may determine two capability levels. One capability level may be a level (e.g., $L_{UE}$, $L_{BS}$) for determining which of the UE and the base station to perform code optimization, and the other capability level may be a level (e.g., $C_{UE}$, $C_{BS}$) for determining what to do with a code optimization level. Through this, the present disclosure has an effect of improving latency performance and reliability of overall communication.

A code optimization level of the UE may be determined by flexibility of a receiver of the UE, but a code optimization level of the base station may be determined considering the number of UEs to be serviced as well as flexibility of a receiver of the base station. The capability may be transmitted via a radio resource control (RRC) signal, a control channel (CCH), a master information block (MIB) and/or a system information block (SIB).

(2) A code synchronization procedure may be performed in order to communicate at an optimal code in both uplink and/or downlink.

(3) A parameter for code search may be selected considering computing power. The exploitation and the exploration may be adjusted through changes in the value "a". And/or, performance and search time may be adjusted through the proper selection of M and Imax.

FIG. 25 is a flow chart illustrating an operation method of a UE in a downlink transmission described in the present disclosure.

Referring to FIG. 25, first, a UE (1000/2000 of FIGS. 29 to 38) may transmit, to a base station, capability information (e.g., $L_{UE}$) including (i) first information (e.g., $C_{UE}$) indicating a decoding level of the UE and (ii) second information indicating whether machine learning is possible, in step S2501.

For example, the decoding level may be divided into three levels.

First information indicating a decoding level 1 may be transmitted when a receiver structure of the UE is hardwired. And/or, for example, when the base station finally transmits decoding level information indicating the decoding level 1 to the UE, the base station may transmit/receive data based on a non-machine learning based code (e.g., LDPC code or polar code).

First information indicating a decoding level 2 may be transmitted when the receiver structure of the UE is partially flexible. And/or, for example, when the base station finally transmits decoding level information indicating the decoding level 2 to the UE, the base station may transmit/receive data based on a machine learning based code. For example, if the non-machine learning based code used when generating the machine learning based code is the LDPC code, the machine learning based code may be generated based on AI/ML by maintaining an existing matrix of the LDPC code and changing only a CPM (e.g., variant 1).

First information indicating a decoding level 3 may be transmitted when the receiver structure of the UE is fully flexible. And/or, for example, when the base station finally transmits decoding level information indicating the decoding level 3 to the UE, the base station may transmit/receive data based on the machine learning based code. For example, if the non-machine learning based code used when generating the machine learning based code is the LDPC code, the machine learning based code may be generated based on AI/ML by changing both the existing matrix of the LDPC code and the CPM (e.g., variant 2, crossing).

The second information may be information indicating whether the UE can perform the code search based on machine learning. For example, if the UE transmits the second information indicating that machine learning is possible, it may be determined that the UE generates the machine learning based code when the base station and the UE need to generate the machine learning based code.

If the UE transmits the second information indicating that machine learning is not possible, and the base station is capable of machine learning, it may be determined that the base station generates the machine learning based code when the base station and the UE need to generate the machine learning based code. In this instance, the base station assumes that machine learning is possible.

For example, an operation of the UE in the step S2501 to transmit the capability information may be implemented by a device of FIGS. 29 to 38 to be described later. For example, referring to FIG. 30, one or more processors 1020 may control one or more memories 1040 and/or one or more RF units 1060, etc. so as to transmit the capability information, and the one or more RF units 1060 may transmit the capability information.

And/or, the UE (1000/2000 of FIGS. 29 to 38) may receive decoding level information from the base station based on the first information, in step S2502.

The decoding level information may be information indicating a final decoding level determined by the base station based on the first information received from the UE.

For example, an operation of the UE in the step S2502 to receive the decoding level information may be implemented by the device of FIGS. 29 to 38 to be described later. For example, referring to FIG. 30, one or more processors 1020 may control one or more memories 1040 and/or one or more RF units 1060, etc. so as to receive the decoding level information, and the one or more RF units 1060 may receive the decoding level information.

And/or, the UE (1000/2000 of FIGS. 29 to 38) may receive downlink data from the base station based on the decoding level information and the second information, in step S2503.

For example, an operation (step S2503) of receiving the downlink data may include an operation of generating the machine learning based code using machine learning and channel information, an operation of transmitting information about the machine learning based code to the base station, and an operation of receiving the downlink data from the base station based on the machine learning based code, based on the decoding level information indicating the use of the machine learning based code and the second information indicating that machine learning is possible. For example, transmitting/receiving the downlink data based on the machine learning based code may mean encoding and/or decoding the downlink data based on the machine learning based code.

And/or, the operation of generating the machine learning based code may include an operation of generating n codes based on the machine learning, an operation of generating n pieces of data based on the n codes and the channel information, and an operation of selecting the machine learning based code based on a block error rate (BLER) of the n pieces of data.

And/or, the operation (step S2503) of receiving the downlink data may include an operation of an operation of transmitting the channel information to the base station, an operation of receiving information about the machine learning based code from the base station, and an operation of receiving the downlink data from the base station based on the machine learning based code, based on the decoding level information indicating the use of the machine learning based code and the second information indicating that machine learning is not possible.

And/or, the operation (step S2503) of receiving the downlink data may include an operation of receiving the downlink data from the base station using the non-machine learning based code, based on the decoding level information indicating the use of the non-machine learning based code. For example, using the non-machine learning based code may mean encoding and/or decoding the downlink data using the non-machine learning based code.

For example, the non-machine learning based code may be a low-density parity check (LDPC) code or a polar code.

For example, an operation of the UE in the step S2503 to receive the downlink data may be implemented by the device of FIGS. 29 to 38 to be described later. For example, referring to FIG. 30, one or more processors 1020 may control one or more memories 1040 and/or one or more RF units 1060, etc. so as to receive the downlink data, and the one or more RF units 1060 may receive the downlink data.

And/or, the UE (1000/2000 of FIGS. 29 to 38) may receive a request for the capability information from the base station. For example, if there is downlink data to be transmitted, the base station may request the capability information from the UE.

For example, an operation of the UE to receive the request for the capability information may be implemented by the device of FIGS. 29 to 38 to be described later. For example, referring to FIG. 30, one or more processors 1020 may control one or more memories 1040 and/or one or more RF units 1060, etc. so as to receive the request for the capability information, and the one or more RF units 1060 may receive the request for the capability information.

The operation of the UE described with reference to FIG. 25 is the same as the operation of the UE described with reference to FIGS. 1 to 24, and thus other detailed descriptions are omitted.

The above-described signaling and operations may be implemented by a device to be described later (e.g., FIGS. 29 to 38). For example, the above-described signaling and operations may be processed by one or more processors 1010 and 2020 of FIGS. 29 to 38. The above-described signaling and operations may also be stored in a memory (e.g., memories 1040 and 2040) in the form of commands/programs (e.g., instructions, executable codes) for running at least one processor (e.g., processors 1010 and 2020) of FIGS. 29 to 38.

For example, in a device comprising one or more memories and one or more processors operatively connected to the one or more memories, the one or more processors may be configured to allow the device to transmit, to a base station, capability information including (i) first information indicating a decoding level and (ii) second information indicating whether machine learning is possible, receive decoding level information from the base station based on the first information, and receive downlink data from the base station based on the decoding level information and the second information.

As another example, in a non-transitory computer readable medium (CRM) storing one or more instructions, the one or more instructions executable by one or more processors may allow a UE to transmit, to a base station, capability information including (i) first information indicating a decoding level of the UE and (ii) second information indicating whether machine learning is possible, receive decoding level information from the base station based on the first information, and receive downlink data from the base station based on the decoding level information and the second information.

FIG. 26 is a flow chart illustrating an operation method of a base station in a downlink transmission described in the present disclosure.

Referring to FIG. 26, first, a base station (1000/2000 of FIGS. 29 to 38) may receive, from a UE, capability information (e.g., $L_{UE}$) including (i) first information (e.g., $C_{UE}$) indicating a decoding level of the UE and (ii) second information indicating whether machine learning is possible, in step S2601.

For example, the decoding level may be divided into three levels.

First information indicating a decoding level 1 may be transmitted when a receiver structure of the UE is hardwired. And/or, for example, when the base station finally transmits decoding level information indicating the decoding level 1 to the UE, the base station may transmit/receive data based on a non-machine learning based code (e.g., LDPC code or polar code).

First information indicating a decoding level 2 may be transmitted when the receiver structure of the UE is partially flexible. And/or, for example, when the base station finally transmits decoding level information indicating the decoding level 2 to the UE, the base station may transmit/receive data based on a machine learning based code. For example, if the non-machine learning based code used when generating the machine learning based code is the LDPC code, the machine learning based code may be generated based on AI/ML by maintaining an existing matrix of the LDPC code and changing only a CPM (e.g., variant 1).

First information indicating a decoding level 3 may be transmitted when the receiver structure of the UE is fully flexible. And/or, for example, when the base station finally transmits decoding level information indicating the decoding level 3 to the UE, the base station may transmit/receive data based on the machine learning based code. For example, if the non-machine learning based code used when generating the machine learning based code is the LDPC code, the machine learning based code may be generated based on AI/ML by changing both the existing matrix of the LDPC code and the CPM (e.g., variant 2, crossing).

The second information may be information indicating whether the UE can perform the code search based on machine learning. For example, if the UE transmits the second information indicating that machine learning is possible, it may be determined that the UE generates the machine learning based code when the base station and the UE need to generate the machine learning based code.

If the UE transmits the second information indicating that machine learning is not possible, and the base station is capable of machine learning, it may be determined that the base station generates the machine learning based code when the base station and the UE need to generate the machine learning based code. In this instance, the base station assumes that machine learning is possible.

For example, an operation of the base station in the step S2601 to receive the capability information may be implemented by the device of FIGS. 29 to 38 to be described later. For example, referring to FIG. 30, one or more processors 1020 may control one or more memories 1040 and/or one or more RF units 1060, etc. so as to receive the capability information, and the one or more RF units 1060 may receive the capability information.

And/or, the base station (1000/2000 of FIGS. 29 to 38) may transmit decoding level information to the UE based on the first information, in step S2602.

The decoding level information may be information indicating a final decoding level determined by the base station based on the first information received from the UE.

For example, an operation of the base station in the step S2602 to transmit the decoding level information may be implemented by the device of FIGS. 29 to 38 to be described later. For example, referring to FIG. 30, one or more processors 1020 may control one or more memories 1040 and/or one or more RF units 1060, etc. so as to transmit the decoding level information, and the one or more RF units 1060 may transmit the decoding level information.

And/or, the base station (1000/2000 of FIGS. 29 to 38) may transmit downlink data to the UE based on the decoding level information and the second information, in step S2603.

For example, an operation (step S2603) of transmitting the downlink data may include an operation of receiving information about the machine learning based code from the UE, and an operation of transmitting the downlink data to the UE based on the machine learning based code, based on the decoding level information indicating the use of the machine learning based code and the second information indicating that machine learning is possible. For example, transmitting/receiving the downlink data based on the machine learning based code may mean encoding and/or decoding the downlink data based on the machine learning based code.

And/or, the operation (step S2603) of transmitting the downlink data may include an operation of receiving channel information from the UE, an operation of generating the machine learning based code based on machine learning and the channel information, an operation of transmitting information about the machine learning based code to the UE, and an operation of transmitting the downlink data to the UE based on the machine learning based code, based on the decoding level information indicating the use of the machine learning based code and the second information indicating that machine learning is not possible.

And/or, the operation of generating the machine learning based code may include an operation of generating n codes based on the machine learning, an operation of generating n pieces of data based on the n codes and the channel information, and an operation of selecting the machine learning based code based on a block error rate (BLER) of the n pieces of data.

And/or, the operation (step S2603) of transmitting the downlink data may include an operation of transmitting the downlink data to the UE using the non-machine learning based code, based on the decoding level information indicating the use of the non-machine learning based code. For example, using the non-machine learning based code may mean encoding and/or decoding the downlink data using the non-machine learning based code.

For example, the non-machine learning based code may be a low-density parity check (LDPC) code or a polar code.

For example, an operation of the base station in the step S2603 to transmit the downlink data may be implemented by the device of FIGS. 29 to 38 to be described later. For example, referring to FIG. 30, one or more processors 1020 may control one or more memories 1040 and/or one or more RF units 1060, etc. so as to transmit the downlink data, and the one or more RF units 1060 may transmit the downlink data.

And/or, the base station (1000/2000 of FIGS. 29 to 38) may transmit a request for the capability information to the UE. For example, if there is downlink data to be transmitted, the base station may request the capability information from the UE.

For example, an operation of the base station to transmit the request for the capability information may be implemented by the device of FIGS. 29 to 38 to be described later. For example, referring to FIG. 30, one or more processors 1020 may control one or more memories 1040 and/or one or more RF units 1060, etc. so as to transmit the request for the capability information, and the one or more RF units 1060 may transmit the request for the capability information.

The operation of the base station described with reference to FIG. 26 is the same as the operation of the base station described with reference to FIGS. 1 to 25, and thus other detailed descriptions are omitted.

The above-described signaling and operations may be implemented by a device to be described later (e.g., FIGS. 29 to 38). For example, the above-described signaling and operations may be processed by one or more processors 1010 and 2020 of FIGS. 29 to 38. The above-described signaling and operations may also be stored in a memory (e.g., memories 1040 and 2040) in the form of commands/ programs (e.g., instructions, executable codes) for running at least one processor (e.g., processors 1010 and 2020) of FIGS. 29 to 38.

For example, in a device comprising one or more memories and one or more processors operatively connected to the one or more memories, the one or more processors may be configured to allow the device to receive, from a UE, capability information including (i) first information indicating a decoding level and (ii) second information indicating whether machine learning is possible, transmit decoding level information to the UE based on the first information, and transmit downlink data to the UE based on the decoding level information and the second information.

As another example, in a non-transitory computer readable medium (CRM) storing one or more instructions, the one or more instructions executable by one or more processors may allow a base station to receive, from a UE, capability information including (i) first information indicating a decoding level of the UE and (ii) second information indicating whether machine learning is possible, transmit decoding level information to the UE based on the first information, and transmit downlink data to the UE based on the decoding level information and the second information.

FIG. 27 is a flow chart illustrating an operation method of a UE in an uplink transmission described in the present disclosure.

Referring to FIG. 27, first, a UE (1000/2000 of FIGS. 29 to 38) may receive, from a base station, capability information (e.g., $L_{BS}$) including (i) first information (e.g., $C_{BS}$) indicating a decoding level of the UE and (ii) second information indicating whether machine learning is possible, in step S2701.

For example, the decoding level may be divided into three levels.

First information indicating a decoding level 1 may be received when a receiver structure of the base station is hard-wired. And/or, for example, when the UE finally transmits decoding level information indicating the decoding level 1 to the base station, the UE may transmit/receive data based on a non-machine learning based code (e.g., LDPC code or polar code).

First information indicating a decoding level 2 may be received when the receiver structure of the base station is partially flexible. And/or, for example, when the UE finally transmits decoding level information indicating the decoding level 2 to the base station, the UE may transmit/receive data based on a machine learning based code. For example, if the non-machine learning based code used when generating the machine learning based code is the LDPC code, the machine learning based code may be generated based on AI/ML by maintaining an existing matrix of the LDPC code and changing only a CPM (e.g., variant 1).

First information indicating a decoding level 3 may be received when the receiver structure of the base station is fully flexible. And/or, for example, when the UE finally transmits decoding level information indicating the decoding level 3 to the base station, the UE may transmit/receive data based on the machine learning based code. For example, if the non-machine learning based code used when generating the machine learning based code is the LDPC code, the machine learning based code may be generated based on AI/ML by changing both the existing matrix of the LDPC code and the CPM (e.g., variant 2, crossing).

The second information may be information indicating whether the base station can perform the code search based on machine learning. For example, if the base station transmits the second information indicating that machine learning is possible, it may be determined that the base station generates the machine learning based code when the base station and the UE need to generate the machine learning based code.

If the base station transmits the second information indicating that machine learning is not possible, and the UE is capable of machine learning, it may be determined that the UE generates the machine learning based code when the base station and the UE need to generate the machine learning based code. In this instance, the UE assumes that machine learning is possible.

For example, an operation of the UE in the step S2701 to receive the capability information may be implemented by a device of FIGS. 29 to 38 to be described later. For example, referring to FIG. 30, one or more processors 1020 may control one or more memories 1040 and/or one or more RF units 1060, etc. so as to receive the capability information, and the one or more RF units 1060 may receive the capability information.

And/or, the UE (1000/2000 of FIGS. 29 to 38) may transmit decoding level information to the base station based on the first information, in step S2702.

The decoding level information may be information indicating a final decoding level determined by the UE based on the first information received from the base station.

For example, an operation of the UE in the step S2702 to transmit the decoding level information may be implemented by the device of FIGS. 29 to 38 to be described later. For example, referring to FIG. 30, one or more processors 1020 may control one or more memories 1040 and/or one or more RF units 1060, etc. so as to transmit the decoding level information, and the one or more RF units 1060 may transmit the decoding level information.

And/or, the UE (1000/2000 of FIGS. 29 to 38) may transmit uplink data to the base station based on the decoding level information and the second information, in step S2703.

For example, an operation (step S2703) of transmitting the uplink data may include an operation of receiving information about the machine learning based code from the base station, and an operation of transmitting the uplink data to the base station based on the machine learning based code, based on the decoding level information indicating the use of the machine learning based code and the second information indicating that machine learning is possible. For example, transmitting/receiving the uplink data based on the machine learning based code may mean encoding and/or decoding the uplink data based on the machine learning based code.

And/or, the operation (step S2703) of transmitting the uplink data may include an operation of receiving channel information from the base station, an operation of generating the machine learning based code based on machine learning and the channel information, an operation of transmitting information about the machine learning based code to the base station, and an operation of transmitting the uplink data to the base station based on the machine learning based code, based on the decoding level information indicating the use of the machine learning based code and the second information indicating that machine learning is not possible.

And/or, the operation of generating the machine learning based code may include an operation of generating n codes based on the machine learning, an operation of generating n pieces of data based on the n codes and the channel information, and an operation of selecting the machine learning based code based on a block error rate (BLER) of the n pieces of data.

And/or, the operation (step S2703) of transmitting the uplink data may include an operation of transmitting the uplink data to the base station using the non-machine learning based code, based on the decoding level information indicating the use of the non-machine learning based code. For example, the non-machine learning based code may be a low-density parity check (LDPC) code or a polar code.

For example, an operation of the UE in the step S2703 to transmit the uplink data may be implemented by the device of FIGS. 29 to 38 to be described later. For example, referring to FIG. 30, one or more processors 1020 may control one or more memories 1040 and/or one or more RF units 1060, etc. so as to transmit the uplink data, and the one or more RF units 1060 may transmit the uplink data.

And/or, the UE (1000/2000 of FIGS. 29 to 38) may transmit a request for the capability information to the base station. For example, if there is uplink data to be transmitted, the UE may request the capability information from the base station.

For example, an operation of the UE to transmit the request for the capability information may be implemented by the device of FIGS. 29 to 38 to be described later. For example, referring to FIG. 30, one or more processors 1020 may control one or more memories 1040 and/or one or more RF units 1060, etc. so as to transmit the request for the capability information, and the one or more RF units 1060 may transmit the request for the capability information.

The operation of the UE described with reference to FIG. 27 is the same as the operation of the UE described with reference to FIGS. 1 to 26, and thus other detailed descriptions are omitted.

The above-described signaling and operations may be implemented by a device to be described later (e.g., FIGS. 29 to 38). For example, the above-described signaling and operations may be processed by one or more processors 1010 and 2020 of FIGS. 29 to 38. The above-described signaling and operations may also be stored in a memory (e.g., memories 1040 and 2040) in the form of commands/programs (e.g., instructions, executable codes) for running at least one processor (e.g., processors 1010 and 2020) of FIGS. 29 to 38.

For example, in a device comprising one or more memories and one or more processors operatively connected to the one or more memories, the one or more processors may be configured to allow the device to receive, from a base station, capability information including (i) first information indicating a decoding level and (ii) second information indicating whether machine learning is possible, transmit decoding level information to the base station based on the first information, and transmit uplink data to the base station based on the decoding level information and the second information.

As another example, in a non-transitory computer readable medium (CRM) storing one or more instructions, the one or more instructions executable by one or more processors may allow a UE to receive, from a base station, capability information including (i) first information indicating a decoding level of the base station and (ii) second information indicating whether machine learning is possible, transmit decoding level information to the base station based on the first information, and transmit uplink data to the base station based on the decoding level information and the second information.

FIG. 28 is a flow chart illustrating an operation method of a base station in an uplink transmission described in the present disclosure.

Referring to FIG. 28, first, a base station (1000/2000 of FIGS. 29 to 38) may transmit, to a UE, capability information (e.g., $L_{BS}$) including (i) first information (e.g., $C_{BS}$) indicating a decoding level of the UE and (ii) second information indicating whether machine learning is possible, in step S2801.

For example, the decoding level may be divided into three levels.

First information indicating a decoding level 1 may be transmitted when a receiver structure of the base station is hard-wired. And/or, for example, when the UE finally transmits decoding level information indicating the decoding level 1 to the base station, the UE may transmit/receive data based on a non-machine learning based code (e.g., LDPC code or polar code).

First information indicating a decoding level 2 may be transmitted when the receiver structure of the base station is partially flexible. And/or, for example, when the UE finally transmits decoding level information indicating the decoding level 2 to the base station, the UE may transmit/receive data based on a machine learning based code. For example, if the non-machine learning based code used when generating the machine learning based code is the LDPC code, the machine learning based code may be generated based on AI/ML by maintaining an existing matrix of the LDPC code and changing only a CPM (e.g., variant 1).

First information indicating a decoding level 3 may be transmitted when the receiver structure of the base station is fully flexible. And/or, for example, when the UE finally transmits decoding level information indicating the decoding level 3 to the base station, the UE may transmit/receive data based on the machine learning based code. For example, if the non-machine learning based code used when generating the machine learning based code is the LDPC code, the machine learning based code may be generated based on AI/ML by changing both the existing matrix of the LDPC code and the CPM (e.g., variant 2, crossing).

The second information may be information indicating whether the base station can perform the code search based on machine learning. For example, if the base station transmits the second information indicating that machine learning is possible, it may be determined that the base station generates the machine learning based code when the base station and the UE need to generate the machine learning based code.

If the base station transmits the second information indicating that machine learning is not possible, and the UE is capable of machine learning, it may be determined that the UE generates the machine learning based code when the base station and the UE need to generate the machine learning based code. In this instance, the UE assumes that machine learning is possible.

For example, an operation of the base station in the step S2801 to transmit the capability information may be implemented by a device of FIGS. 29 to 38 to be described later. For example, referring to FIG. 30, one or more processors 1020 may control one or more memories 1040 and/or one or more RF units 1060, etc. so as to transmit the capability information, and the one or more RF units 1060 may transmit the capability information.

And/or, the base station (1000/2000 of FIGS. 29 to 38) may receive decoding level information from the UE based on the first information, in step S2802.

The decoding level information may be information indicating a final decoding level determined by the UE based on the first information received from the base station.

For example, an operation of the base station in the step S2802 to receive the decoding level information may be implemented by the device of FIGS. 29 to 38 to be described later. For example, referring to FIG. 30, one or more processors 1020 may control one or more memories 1040 and/or one or more RF units 1060, etc. so as to receive the decoding level information, and the one or more RF units 1060 may receive the decoding level information.

And/or, the base station (1000/2000 of FIGS. 29 to 38) may receive uplink data from the UE based on the decoding level information and the second information, in step S2803.

For example, an operation (step S2803) of receiving the uplink data may include an operation of generating the machine learning based code, an operation of transmitting information about the machine learning based code to the UE, and an operation of receiving the uplink data from the UE based on the machine learning based code, based on the decoding level information indicating the use of the machine learning based code and the second information indicating that machine learning is possible. For example, transmitting/receiving the uplink data based on the machine learning based code may mean encoding and/or decoding the uplink data based on the machine learning based code.

And/or, the operation of generating the machine learning based code may include an operation of generating n codes based on the machine learning, an operation of generating n pieces of data based on the n codes and the channel information, and an operation of selecting the machine learning based code based on a block error rate (BLER) of the n pieces of data.

And/or, the operation (step S2803) of receiving the uplink data may include an operation of transmitting channel information to the UE, an operation of receiving information about the machine learning based code from the UE, and an operation of receiving the uplink data from the UE based on the machine learning based code, based on the decoding level information indicating the use of the machine learning based code and the second information indicating that machine learning is not possible.

And/or, the operation (step S2803) of receiving the uplink data may include an operation of receiving the uplink data from the UE using the non-machine learning based code, based on the decoding level information indicating the use of the non-machine learning based code. For example, using the non-machine learning based code may mean encoding and/or decoding the uplink data using the non-machine learning based code.

For example, the non-machine learning based code may be a low-density parity check (LDPC) code or a polar code.

For example, an operation of the base station in the step S2803 to receive the uplink data may be implemented by the device of FIGS. 29 to 38 to be described later. For example, referring to FIG. 30, one or more processors 1020 may control one or more memories 1040 and/or one or more RF units 1060, etc. so as to receive the uplink data, and the one or more RF units 1060 may receive the uplink data.

And/or, the base station (1000/2000 of FIGS. 29 to 38) may receive a request for the capability information from the UE. For example, if there is uplink data to be transmitted, the UE may request the capability information from the base station.

For example, an operation of the base station to receive the request for the capability information may be implemented by the device of FIGS. 29 to 38 to be described later. For example, referring to FIG. 30, one or more processors 1020 may control one or more memories 1040 and/or one or more RF units 1060, etc. so as to receive the request for the capability information, and the one or more RF units 1060 may receive the request for the capability information.

The operation of the base station described with reference to FIG. 28 is the same as the operation of the base station described with reference to FIGS. 1 to 27, and thus other detailed descriptions are omitted.

The above-described signaling and operations may be implemented by a device to be described later (e.g., FIGS. 29 to 38). For example, the above-described signaling and operations may be processed by one or more processors 1010 and 2020 of FIGS. 29 to 38. The above-described signaling and operations may also be stored in a memory (e.g., memories 1040 and 2040) in the form of commands/programs (e.g., instructions, executable codes) for running at least one processor (e.g., processors 1010 and 2020) of FIGS. 29 to 38.

For example, in a device comprising one or more memories and one or more processors operatively connected to the one or more memories, the one or more processors may be configured to allow the device to transmit, to a UE, capability information including (i) first information indicating a decoding level of the base station and (ii) second information indicating whether machine learning is possible, receive decoding level information from the UE based on the first information, and receive uplink data from the UE based on the decoding level information and the second information.

As another example, in a non-transitory computer readable medium (CRM) storing one or more instructions, the one or more instructions executable by one or more processors may allow a base station to transmit, to a UE, capability information including (i) first information indicating a decoding level of the base station and (ii) second information indicating whether machine learning is possible, receive decoding level information from the UE based on the first information, and receive uplink data from the UE based on the decoding level information and the second information.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 29 shows a communication system 10 based on an embodiment of the present disclosure.

Referring to FIG. 29, a communication system 10 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1000a, vehicles 1000b-1 and 1000b-2, an eXtended Reality (XR) device 1000c, a hand-held device 1000d, a home appliance 1000e, an Internet of Things (IoT) device 1000f, and an Artificial Intelligence (AI) device/server 4000. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone).

The XR device may include an Augmented Reality (AR)/ Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 2000a may operate as a BS/network node with respect to other wireless devices.

The wireless devices 1000a to 1000f may be connected to the network 3000 via the BSs 2000. An AI technology may be applied to the wireless devices 1000a to 1000f and the wireless devices 1000a to 1000f may be connected to the AI server 4000 via the network 3000. The network 3000 may be configured using a 3G network, a 4G (e.g., LTE) network, or a 5G (e.g., NR) network. Although the wireless devices 1000a to 1000f may communicate with each other through the BSs 2000/network 3000, the wireless devices 1000a to 1000f may perform direct communication (e.g., sidelink communication) with each other without passing through the BSs/network. For example, the vehicles 1000b-1 and 1000b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1000a to 1000f.

Wireless communication/connections 1500a, 1500b, or 1500c may be established between the wireless devices 1000a to 1000f/BS 2000, or BS 2000/BS 2000. Herein, the wireless communication/connections may be established through various RATs (e.g., 5G NR) such as uplink/down-link communication 1500a, sidelink communication 1500b (or, D2D communication), or inter BS communication (e.g. relay, Integrated Access Backhaul (IAB)). The wireless devices and the BSs/the wireless devices may transmit/ receive radio signals to/from each other through the wireless communication/connections 1500a and 1500b. For example, the wireless communication/connections 1500a and 1500b may transmit/receive signals through various physical chan-nels. To this end, at least a part of various configuration information configuring processes, various signal process-ing processes (e.g., channel encoding/decoding, modulation/ demodulation, and resource mapping/demapping), and resource allocating processes, for transmitting/receiving radio signals, may be performed based on the various proposals of the present disclosure.

Example of Wireless Device to which the Present Disclosure is Applied

FIG. 30 shows wireless devices based on an embodiment of the present disclosure.

Referring to FIG. 16, a first wireless device 1000 and a second wireless device 2000 may transmit radio signals through a variety of RATs (e.g., LTE and NR). Herein, {the first wireless device 1000 and the second wireless device 2000} may correspond to {the wireless device 1000x and the BS 2000} and/or {the wireless device 1000x and the wire-less device 1000x} of FIG. 32.

The first wireless device 1000 may include one or more processors 1020 and one or more memories 1040 and additionally further include one or more transceivers 1060 and/or one or more antennas 1080. The processor(s) 1020 may control the memory(s) 1040 and/or the transceiver(s) 1060 and may be configured to implement the descriptions, functions, procedures, proposals, methods, and/or opera-tional flowcharts disclosed in this document. For example, the processor(s) 1020 may process information within the memory(s) 1040 to generate first information/signals and then transmit radio signals including the first information/ signals through the transceiver(s) 1060. The processor(s) 1020 may receive radio signals including second informa-tion/signals through the transceiver 1060 and then store information obtained by processing the second information/ signals in the memory(s) 1040. The memory(s) 1040 may be connected to the processor(s) 1020 and may store a variety of information related to operations of the processor(s) 1020. For example, the memory(s) 1040 may store software code including commands for performing a part or the entirety of processes controlled by the processor(s) 1020 or for performing the descriptions, functions, procedures, pro-posals, methods, and/or operational flowcharts disclosed in this document. Herein, the processor(s) 1020 and the memo-ry(s) 1040 may be a part of a communication modem/circuit/ chip designed to implement RAT (e.g., LTE or NR). The transceiver(s) 1060 may be connected to the processor(s) 1020 and transmit and/or receive radio signals through one or more antennas 1080. Each of the transceiver(s) 1060 may include a transmitter and/or a receiver. The transceiver(s) 1060 may be interchangeably used with Radio Frequency (RF) unit(s). In the present disclosure, the wireless device may represent a communication modem/circuit/chip.

The second wireless device 2000 may include one or more processors 2020 and one or more memories 2040 and additionally further include one or more transceivers 2060 and/or one or more antennas 2080. The processor(s) 2020 may control the memory(s) 2040 and/or the transceiver(s) 2060 and may be configured to implement the descriptions, functions, procedures, proposals, methods, and/or opera-tional flowcharts disclosed in this document. For example, the processor(s) 2020 may process information within the memory(s) 2040 to generate third information/signals and then transmit radio signals including the third information/ signals through the transceiver(s) 2060. The processor(s) 2020 may receive radio signals including fourth informa-tion/signals through the transceiver(s) 1060 and then store information obtained by processing the fourth information/ signals in the memory(s) 2040. The memory(s) 2040 may be connected to the processor(s) 2020 and may store a variety of information related to operations of the processor(s) 2020. For example, the memory(s) 2040 may store software code including commands for performing a part or the entirety of processes controlled by the processor(s) 2020 or for performing the descriptions, functions, procedures, pro-posals, methods, and/or operational flowcharts disclosed in this document. Herein, the processor(s) 2020 and the memo-ry(s) 2040 may be a part of a communication modem/circuit/ chip designed to implement RAT (e.g., LTE or NR). The transceiver(s) 206 may be connected to the processor(s) 2020 and transmit and/or receive radio signals through one or more antennas 2080. Each of the transceiver(s) 2060 may include a transmitter and/or a receiver. The transceiver(s) 2060 may be interchangeably used with RF unit(s). In the present disclosure, the wireless device may represent a communication modem/circuit/chip.

Hereinafter, hardware elements of the wireless devices 1000 and 2000 will be described more specifically. One or more protocol layers may be implemented by, without being limited to, one or more processors 1020 and 2020. For example, the one or more processors 1020 and 2020 may implement one or more layers (e.g., functional layers such as PHY, MAC, RLC, PDCP, RRC, and SDAP). The one or more processors 1020 and 2020 may generate one or more Protocol Data Units (PDUs) and/or one or more Service Data Unit (SDUs) based on the descriptions, functions, procedures, proposals, methods, and/or operational flowcharts disclosed in this document. The one or more processors 1020 and 2020 may generate messages, control information, data, or information based on the descriptions, functions, procedures, proposals, methods, and/or operational flowcharts disclosed in this document. The one or more processors 1020 and 2020 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 1020 and 2020 may receive the signals (e.g., baseband signals) from the one or more transceivers 1060 and 2060 and acquire the PDUs, SDUs, messages, control information, data, or information based on the descriptions, functions, procedures, proposals, methods, and/or operational flowcharts disclosed in this document.

The one or more processors 1020 and 2020 may be referred to as controllers, microcontrollers, microprocessors, or microcomputers. The one or more processors 1020 and 2020 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 1020 and 2020. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 1020 and 2020 or stored in the one or more memories 1040 and 2040 so as to be driven by the one or more processors 1020 and 2020. The descriptions, functions, procedures, proposals, methods, and/or operational flowcharts disclosed in this document may be implemented using firmware or software in the form of code, commands, and/or a set of commands.

The one or more memories 1040 and 2040 may be connected to the one or more processors 1020 and 2020 and store various types of data, signals, messages, information, programs, code, instructions, and/or commands. The one or more memories 1040 and 2040 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 1040 and 2040 may be located at the interior and/or exterior of the one or more processors 1020 and 2020. The one or more memories 1040 and 2040 may be connected to the one or more processors 1020 and 2020 through various technologies such as wired or wireless connection.

The one or more transceivers 1060 and 2060 may transmit user data, control information, and/or radio signals/channels, mentioned in the methods and/or operational flowcharts of this document, to one or more other devices. The one or more transceivers 1060 and 2060 may receive user data, control information, and/or radio signals/channels, mentioned in the descriptions, functions, procedures, proposals, methods, and/or operational flowcharts disclosed in this document, from one or more other devices. For example, the one or more transceivers 1060 and 2060 may be connected to the one or more processors 1020 and 2020 and transmit and receive radio signals. For example, the one or more processors 1020 and 2020 may perform control so that the one or more transceivers 1060 and 2060 may transmit user data, control information, or radio signals to one or more other devices. The one or more processors 1020 and 2020 may perform control so that the one or more transceivers 1060 and 2060 may receive user data, control information, or radio signals from one or more other devices. The one or more transceivers 1060 and 2060 may be connected to the one or more antennas 1080 and 2080 and the one or more transceivers 1060 and 2060 may be configured to transmit and receive user data, control information, and/or radio signals/channels, mentioned in the descriptions, functions, procedures, proposals, methods, and/or operational flowcharts disclosed in this document, through the one or more antennas 1080 and 2080. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 1020 and 2020. The one or more transceivers 1060 and 2060 may convert the user data, control information, radio signals/channels, etc. processed using the one or more processors 1020 and 2020 from the base band signals into the RF band signals. To this end, the one or more transceivers 1060 and 2060 may include (analog) oscillators and/or filters.

Example of Signal Processing Circuit to which the Present Disclosure is Applied

FIG. 31 shows a signal process circuit for a transmission signal based on an embodiment of the present disclosure.

Referring to FIG. 31, a signal processing circuit 10000 may include scramblers 10100, modulators 10200, a layer mapper 10300, a precoder 10400, resource mappers 10500, and signal generators 10600. An operation/function of FIG. 27 may be performed, without being limited to, the processors 1020 and 2020 and/or the transceivers 1060 and 2060 of FIG. 30. Hardware elements of FIG. 31 may be implemented by the processors 102 and 202 and/or the transceivers 1060 and 2060 of FIG. 30. For example, blocks 10100 to 10600 may be implemented by the processors 1020 and 2020 of FIG. 30. Alternatively, the blocks 10100 to 10500 may be implemented by the processors 1020 and 2020 of FIG. 30 and the block 10600 may be implemented by the transceivers 1060 and 2060 of FIG. 30.

Codewords may be converted into radio signals via the signal processing circuit 10000 of FIG. 31. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 10100. Scramble sequences used for scrambling may be generated based on an initialization value, and the initialization value may include ID information of a wireless device. The scrambled bit sequences may be modulated to modulation symbol sequences by the modulators 10200. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 10300. Modulation symbols of each transport layer may be mapped (precoded) to corresponding antenna port(s) by the precoder 10400. Outputs z of the precoder 10400 may be obtained by multiplying outputs y of the layer mapper 10300 by an N*M precoding matrix W. Herein, N is the number of antenna ports and M is the number of transport layers. The precoder 10400 may perform precoding after performing transform precoding (e.g., DFT) for complex modulation symbols. Alternatively, the precoder 10400 may perform precoding without performing transform precoding.

The resource mappers 10500 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 10600 may generate radio signals from the mapped modulation symbols and the generated radio signals may be transmitted to other devices through each antenna. For this purpose, the signal generators 10600 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 10100 to 10600 of FIG. 31. For example, the wireless devices (e.g., 1000 and 2000 of FIG. 30 may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Utilization Example of Wireless Device to which the Present Disclosure is Applied FIG. 32 shows another example of a wireless device based on an embodiment of the present disclosure.

The wireless device may be implemented in various forms based on a use-case/service.

Referring to FIG. 32, wireless devices 1000 and 2000 may correspond to the wireless devices 1000 and 2000 of FIG. 30 and may be configured by various elements, components, units/portions, and/or modules. For example, each of the wireless devices 1000 and 2000 may include a communication unit 1100, a control unit 1200, a memory unit 130, and additional components 1400. The communication unit may include a communication circuit 1120 and transceiver(s) 1140. For example, the communication circuit 1120 may include the one or more processors 1020 and 2020 and/or the one or more memories 1040 and 2040 of FIG. 30. For example, the transceiver(s) 1140 may include the one or more transceivers 106 and 206 and/or the one or more antennas 1080 and 2080 of FIG. 30. The control unit 1200 is electrically connected to the communication unit 1100, the memory 1300, and the additional components 1400 and controls overall operation of the wireless devices. For example, the control unit 1200 may control an electric/mechanical operation of the wireless device based on programs/code/commands/information stored in the memory unit 1300. The control unit 1200 may transmit the information stored in the memory unit 1300 to the exterior (e.g., other communication devices) via the communication unit 1100 through a wireless/wired interface or store, in the memory unit 1300, information received through the wireless/wired interface from the exterior (e.g., other communication devices) via the communication unit 1100.

The additional components 1400 may be variously configured based on types of wireless devices. For example, the additional components 1400 may include at least one of a power unit/battery, input/output (I/O) unit, a driving unit, and a computing unit. The wireless device may be implemented in the form of, without being limited to, the robot (1000a of FIG. 29), the vehicles (1000b-1 and 1000b-2 of FIG. 29), the XR device (1000c of FIG. 29), the hand-held device (1000d of FIG. 29), the home appliance (1000e of FIG. 29), the IoT device (1000f of FIG. 29), a digital broadcast terminal, a hologram device, a public safety device, an MTC device, a medicine device, a fintech device (or a finance device), a security device, a climate/environment device, the AI server/device (4000 of FIG. 29), the BSs (2000 of FIG. 29), a network node, etc. The wireless device may be used in a mobile or fixed place based on a use-example/service.

In FIG. 32, the entirety of the various elements, components, units/portions, and/or modules in the wireless devices 1000 and 2000 may be connected to each other through a wired interface or at least a part thereof may be wirelessly connected through the communication unit 1100. For example, in each of the wireless devices 1000 and 2000, the control unit 1200 and the communication unit 1100 may be connected by wire and the control unit 1200 and first units (e.g., 1300 and 1400) may be wirelessly connected through the communication unit 1100. Each element, component, unit/portion, and/or module within the wireless devices 1000 and 2000 may further include one or more elements. For example, the control unit 1200 may be configured by a set of one or more processors. As an example, the control unit 1200 may be configured by a set of a communication control processor, an application processor, an Electronic Control Unit (ECU), a graphical processing unit, and a memory control processor. As another example, the memory 1300 may be configured by a Random Access Memory (RAM), a Dynamic RAM (DRAM), a Read Only Memory (ROM)), a flash memory, a volatile memory, a non-volatile memory, and/or a combination thereof.

FIG. 33 shows a hand-held device based on an embodiment of the present disclosure.

The hand-held device may include a smartphone, a smart-pad, a wearable device (e.g., a smartwatch or a smart-glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 33, a hand-held device 1000 may include an antenna unit 1080, a communication unit 1100, a control unit 1200, a memory unit 1300, a power supply unit 1400a, an interface unit 1400b, and an I/O unit 1400c. The antenna unit 108 may be configured as a part of the communication unit 1100. Blocks 1100 to 1300/1400a to 1400c correspond to the blocks 1100 to 1300/1400 of FIG. 28, respectively.

The communication unit 1100 may transmit and receive signals (e.g., data and control signals) to and from other wireless devices or BSs. The control unit 1200 may perform various operations by controlling constituent elements of the hand-held device 1000. The control unit 1200 may include an Application Processor (AP). The memory unit 1300 may store data/parameters/programs/code/commands needed to drive the hand-held device 1000. The memory unit 1300 may store input/output data/information. The power supply unit 1400a may supply power to the hand-held device 1000 and include a wired/wireless charging circuit, a battery, etc. The interface unit 1400b may support connection of the hand-held device 1000 to other external devices. The interface unit 1400b may include various ports (e.g., an audio I/O port and a video I/O port) for connection with external devices. The I/O unit 1400c may input or output video information/signals, audio information/signals, data, and/or information input by a user. The I/O unit 1400c may include a camera, a microphone, a user input unit, a display unit 1400d, a speaker, and/or a haptic module.

As an example, in the case of data communication, the I/O unit 1400c may acquire information/signals (e.g., touch, text, voice, images, or video) input by a user and the acquired information/signals may be stored in the memory unit 1300. The communication unit 1100 may convert the information/signals stored in the memory into radio signals and transmit the converted radio signals to other wireless devices directly or to a BS. The communication unit 1100 may receive radio signals from other wireless devices or the BS and then restore the received radio signals into original information/signals. The restored information/signals may be stored in the memory unit 1300 and may be output as various types (e.g., text, voice, images, video, or haptic) through the I/O unit 1400c.

FIG. 34 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 34, a vehicle or autonomous vehicle 1000 may include an antenna unit 1080, a communication unit 1100, a control unit 1200, a driving unit 1400a, a power supply unit 1400b, a sensor unit 1400c, and an autonomous driving unit 1400d. The antenna unit 1080 may be configured as a part of the communication unit 1100. The blocks 1100/1300/1400a to 1400d correspond to the blocks 1100/1300/1400 of FIG. 32, respectively.

The communication unit 1100 may transmit and receive signals (e.g., data and control signals) to and from external devices such as other vehicles, BSs (e.g., gNBs and road side units), and servers. The control unit 1200 may perform various operations by controlling elements of the vehicle or the autonomous vehicle 1000. The control unit 1200 may include an Electronic Control Unit (ECU). The driving unit 1400a may cause the vehicle or the autonomous vehicle 1000 to drive on a road. The driving unit 1400a may include an engine, a motor, a powertrain, a wheel, a brake, a steering device, etc. The power supply unit 1400b may supply power to the vehicle or the autonomous vehicle 1000 and include a wired/wireless charging circuit, a battery, etc. The sensor unit 1400c may acquire a vehicle state, ambient environment information, user information, etc. The sensor unit 1400c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 1400d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 1100 may receive map data, traffic information data, etc. from an external server. The autonomous driving unit 1400d may generate an autonomous driving path and a driving plan from the obtained data. The control unit 1200 may control the driving unit 1400a such that the vehicle or the autonomous vehicle 1000 may move along the autonomous driving path based on the driving plan (e.g., speed/direction control). In the middle of autonomous driving, the communication unit 1100 may aperiodically/periodically acquire recent traffic information data from the external server and acquire surrounding traffic information data from neighboring vehicles. In the middle of autonomous driving, the sensor unit 1400c may obtain a vehicle state and/or surrounding environment information. The autonomous driving unit 1400d may update the autonomous driving path and the driving plan based on the newly obtained data/information. The communication unit 1100 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

FIG. 35 shows a vehicle based on an embodiment of the present disclosure. The vehicle may be implemented as a transport means, an aerial vehicle, a ship, etc.

Referring to FIG. 35, a vehicle 1000 may include a communication unit 1100, a control unit 1200, a memory unit 1300, an I/O unit 1400a, and a positioning unit 1400b. Herein, the blocks 1100 to 1300/1400a and 1400b correspond to blocks 1100 to 1300/1400 of FIG. 32.

The communication unit 1100 may transmit and receive signals (e.g., data and control signals) to and from external devices such as other vehicles or BSs. The control unit 1200 may perform various operations by controlling constituent elements of the vehicle 1000. The memory unit 1300 may store data/parameters/programs/code/commands for supporting various functions of the vehicle 1000. The I/O unit 140a may output an AR/VR object based on information within the memory unit 1300. The I/O unit 140a may include an HUD. The positioning unit 1400b may acquire information about the position of the vehicle 1000. The position information may include information about an absolute position of the vehicle 1000, information about the position of the vehicle 1000 within a traveling lane, acceleration information, and information about the position of the vehicle 1000 from a neighboring vehicle. The positioning unit 1400b may include a GPS and various sensors.

As an example, the communication unit 1100 of the vehicle 1000 may receive map information and traffic information from an external server and store the received information in the memory unit 1300. The positioning unit 1400b may obtain the vehicle position information through the GPS and various sensors and store the obtained information in the memory unit 1300. The control unit 1200 may generate a virtual object based on the map information, traffic information, and vehicle position information and the I/O unit 1400a may display the generated virtual object in a window in the vehicle (14100 and 14200). The control unit 1200 may determine whether the vehicle 1000 normally drives within a traveling lane, based on the vehicle position information. If the vehicle 1000 abnormally exits from the traveling lane, the control unit 1200 may display a warning on the window in the vehicle through the I/O unit 1400a. In addition, the control unit 1200 may broadcast a warning message regarding driving abnormity to neighboring vehicles through the communication unit 1100. Based on situation, the control unit 1200 may transmit the vehicle position information and the information about driving/vehicle abnormality to related organizations.

FIG. 36 shows an XR device based on an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 36, an XR device 1000a may include a communication unit 1100, a control unit 1200, a memory unit 1300, an I/O unit 1400a, a sensor unit 1400b, and a power supply unit 1400c. Herein, the blocks 1100 to 1300/1400a to 1400c correspond to the blocks 1100 to 1300/1400 of FIG. 32, respectively.

The communication unit 1100 may transmit and receive signals (e.g., media data and control signals) to and from external devices such as other wireless devices, hand-held devices, or media servers. The media data may include video, images, and sound. The control unit 1200 may perform various operations by controlling constituent elements of the XR device 1000a. For example, the control unit 1200 may be configured to control and/or perform procedures such as video/image acquisition, (video/image) encoding, and metadata generation and processing. The memory unit 1300 may store data/parameters/programs/code/commands needed to drive the XR device 1000a/generate XR object. The I/O unit 1400a may obtain control information and data from the exterior and output the generated XR object. The I/O unit 1400a may include a camera, a microphone, a user input unit, a display unit, a speaker, and/or a haptic module. The sensor unit 1400b may obtain an XR device state, surrounding environment information, user information, etc. The sensor unit 1400b may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 1400c may supply power to the XR device 1000a and include a wired/wireless charging circuit, a battery, etc.

For example, the memory unit 1300 of the XR device 1000a may include information (e.g., data) needed to generate the XR object (e.g., an AR/VR/MR object). The I/O unit 1400a may receive a command for manipulating the XR device 1000a from a user and the control unit 1200 may drive the XR device 1000a based on a driving command of a user. For example, when a user desires to watch a film or news through the XR device 1000a, the control unit 1200 transmits content request information to another device (e.g., a hand-held device 1000b) or a media server through the communication unit 1300. The communication unit 1300 may download/stream content such as films or news from another device (e.g., the hand-held device 1000b) or the media server to the memory unit 1300. The control unit 1200 may control and/or perform procedures such as video/image acquisition, (video/image) encoding, and metadata generation/processing with respect to the content and generate/output the XR object based on information about a surrounding space or a real object obtained through the I/O unit 1400a/sensor unit 1400b.

The XR device 1000a may be wirelessly connected to the hand-held device 1000b through the communication unit 1100 and the operation of the XR device 1000a may be controlled by the hand-held device 1000b. For example, the hand-held device 1000b may operate as a controller of the XR device 1000a. To this end, the XR device 1000a may obtain information about a 3D position of the hand-held device 1000b and generate and output an XR object corresponding to the hand-held device 1000b.

FIG. 37 shows a robot based on an embodiment of the present disclosure. The robot may be categorized into an industrial robot, a medical robot, a household robot, a military robot, etc., based on a used purpose or field.

Referring to FIG. 37, a robot 1000 may include a communication unit 1100, a control unit 1200, a memory unit 1300, an I/O unit 1400a, a sensor unit 1400b, and a driving unit 1400c. Herein, the blocks 1100 to 1300/1400a to 1400c correspond to the blocks 1100 to 1300/1400 of FIG. 32, respectively.

The communication unit 1100 may transmit and receive signals (e.g., driving information and control signals) to and from external devices such as other wireless devices, other robots, or control servers. The control unit 1200 may perform various operations by controlling constituent elements of the robot 1000. The memory unit 1300 may store data/parameters/programs/code/commands for supporting various functions of the robot 1000. The I/O unit 140a may obtain information from the exterior of the robot 1000 and output information to the exterior of the robot 1000. The I/O unit 140a may include a camera, a microphone, a user input unit, a display unit, a speaker, and/or a haptic module. The sensor unit 1400b may obtain internal information of the robot 1000, surrounding environment information, user information, etc. The sensor unit 1400b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 1400c may perform various physical operations such as movement of robot joints. In addition, the driving unit 1400c may cause the robot 1000 to travel on the road or to fly. The driving unit 1400c may include an actuator, a motor, a wheel, a brake, a propeller, etc.

FIG. 38 shows an AI device based on an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 38, an AI device 1000 may include a communication unit 1100, a control unit 1200, a memory unit 1300, an I/O unit 1400a/1400b, a learning processor unit 1400c, and a sensor unit 1400d. The blocks 1100 to 1300/1400a to 1400d correspond to blocks 1100 to 1300/1400 of FIG. 32, respectively.

The communication unit 1100 may transmit and receive wired/radio signals (e.g., sensor information, user input, learning models, or control signals) to and from external devices such as other AI devices (e.g., 1000x, 2000, or 4000 of FIG. 29) or an AI server (e.g., 4000 of FIG. 29) using wired/wireless communication technology. To this end, the communication unit 1100 may transmit information within the memory unit 1300 to an external device and transmit a signal received from the external device to the memory unit 1300.

The control unit 1200 may determine at least one feasible operation of the AI device 1000, based on information which is determined or generated using a data analysis algorithm or a machine learning algorithm. The control unit 1200 may perform an operation determined by controlling constituent elements of the AI device 1000. For example, the control unit 1200 may request, search, receive, or use data of the learning processor unit 1400*c* or the memory unit 1300 and control the constituent elements of the AI device 1000 to perform a predicted operation or an operation determined to be preferred among at least one feasible operation. The control unit 1200 may collect history information including the operation contents of the AI device 1000 and operation feedback by a user and store the collected information in the memory unit 1300 or the learning processor unit 1400*c* or transmit the collected information to an external device such as an AI server (4000 of FIG. 29). The collected history information may be used to update a learning model.

The memory unit 1300 may store data for supporting various functions of the AI device 1000. For example, the memory unit 1300 may store data obtained from the input unit 1400*a*, data obtained from the communication unit 1100, output data of the learning processor unit 1400*c*, and data obtained from the sensor unit 1400. The memory unit 1300 may store control information and/or software code needed to operate/drive the control unit 1200.

The input unit 1400*a* may acquire various types of data from the exterior of the AI device 1000. For example, the input unit 1400*a* may acquire learning data for model learning, and input data to which the learning model is to be applied. The input unit 1400*a* may include a camera, a microphone, and/or a user input unit. The output unit 1400*b* may generate output related to a visual, auditory, or tactile sense. The output unit 1400*b* may include a display unit, a speaker, and/or a haptic module. The sensing unit 1400 may obtain at least one of internal information of the AI device 1000, surrounding environment information of the AI device 1000, and user information, using various sensors. The sensor unit 1400 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 1400*c* may learn a model consisting of artificial neural networks, using learning data. The learning processor unit 1400*c* may perform AI processing together with the learning processor unit of the AI server (4000 of FIG. 29). The learning processor unit 1400*c* may process information received from an external device through the communication unit 1100 and/or information stored in the memory unit 1300. In addition, an output value of the learning processor unit 1400*c* may be transmitted to the external device through the communication unit 1100 and may be stored in the memory unit 1300.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although a method of transmitting and receiving data in a wireless communication system according to the present disclosure has been described focusing on examples applying to 3GPP LTE/LTE-A system, 5G system (New RAT system), and 6G/Beyond 6G system, the present disclosure can be applied to various wireless communication systems other than these systems.

What is claimed is:

1. A method of receiving, by a user equipment (UE), downlink data in a wireless communication system, the method comprising:

transmitting, to a base station, capability information including (i) first information indicating a decoding level of the UE and (ii) second information indicating whether a machine learning is possible;

receiving decoding level information from the base station based on the first information; and receiving the downlink data from the base station based on the decoding level information and the second information, wherein receiving the downlink data comprises:

based on the decoding level information indicating a use of a machine learning based code and the second information indicating that the machine learning is possible, generating the machine learning based code based on the machine learning and channel information;

transmitting information on the machine learning based code to the base station; and receiving the downlink data from the base station based on the machine learning based code.

2. The method of claim 1, wherein generating the machine learning based code comprises:

generating n codes based on the machine learning;

generating n pieces of data based on the n codes and the channel information; and selecting the machine learning based code based on a block error rate (BLER) of the n pieces of data.

3. The method of claim 1, wherein receiving the downlink data comprises:

based on the decoding level information indicating the use of a machine learning based code and the second information indicating that the machine learning is not possible, transmitting channel information to the base station; and receiving information on the machine learning based code from the base station.

4. The method of claim 1, wherein receiving the downlink data comprises:

based on the decoding level information indicating a use of a non-machine learning based code, receiving the downlink data from the base station based on the non-machine learning based code.

5. The method of claim 4, wherein the non-machine learning based code is a low-density parity check (LDPC) code or a polar code.

6. The method of claim 1, further comprising:

receiving a request for the capability information from the base station.

7. A user equipment (UE) receiving downlink data in a wireless communication system, the UE comprising:

one or more transceivers;

one or more processors operatively connected to the one or more transceivers; and one or more memories operatively connected to the one or more processors and configured to store instruction performing operations, wherein the operations comprise:

transmitting, to a base station, capability information including (i) first information indicating a decoding level of the UE and (ii) second information indicating whether a machine learning is possible;

receiving decoding level information from the base station based on the first information; and receiving the downlink data from the base station based on the decoding level information and the second information, wherein receiving the downlink data comprises:

based on the decoding level information indicating a use of a machine learning based code and the second information indicating that the machine learning is possible, generating the machine learning based code based on the machine learning and channel information;

transmitting information on the machine learning based code to the base station; and receiving the downlink data from the base station based on the machine learning based code.

8. The UE of claim 7, wherein generating the machine learning based code comprises:

generating n codes based on the machine learning;

generating n pieces of data based on the n codes and the channel information; and selecting the machine learning based code based on a block error rate (BLER) of the n pieces of data.

9. The UE of claim 7, wherein receiving the downlink data comprises:

based on the decoding level information indicating a use of the machine learning based code and the second information indicating that the machine learning is not possible, transmitting channel information to the base station; and receiving information on the machine learning based code from the base station.

10. The UE of claim 7, wherein receiving the downlink data comprises:

based on the decoding level information indicating a use of a non-machine learning based code, receiving the downlink data from the base station based on the non-machine learning based code.

11. The UE of claim 10, wherein the non-machine learning based code is a low-density parity check (LDPC) code or a polar code.

12. The UE of claim 7, wherein the operations further comprise:

receiving a request for the capability information from the base station.

13. A method of receiving, by a base station, downlink data in a wireless communication system, the method comprising:

receiving, from a user equipment (UE), capability information including (i) first information indicating a decoding level of the UE and (ii) second information indicating whether a machine learning is possible;

transmitting decoding level information to the UE based on the first information; and transmitting the downlink data to the UE based on the decoding level information and the second information, wherein transmitting the downlink data comprises:

based on the decoding level information indicating a use of a machine learning based code and the second information indicating that the machine learning is possible, receiving information on machine learning based code based on the machine learning and channel information from the UE; and transmitting the downlink data to the UE based on the machine learning based code.

* * * * *